US011288777B2

(12) United States Patent
Aoki et al.

(10) Patent No.: US 11,288,777 B2
(45) Date of Patent: Mar. 29, 2022

(54) IMAGE PROCESSING DEVICE, IMAGE PROCESSING METHOD, AND PROGRAM

(71) Applicant: Sony Corporation, Tokyo (JP)

(72) Inventors: Suguru Aoki, Tokyo (JP); Ryuta Satoh, Kanagawa (JP); Atsushi Ito, Kanagawa (JP); Hideki Oyaizu, Tokyo (JP); Takeshi Uemori, Tokyo (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 16/642,392

(22) PCT Filed: Aug. 30, 2018

(86) PCT No.: PCT/JP2018/032077
§ 371 (c)(1),
(2) Date: Feb. 27, 2020

(87) PCT Pub. No.: WO2019/049763
PCT Pub. Date: Mar. 14, 2019

(65) Prior Publication Data
US 2020/0193570 A1    Jun. 18, 2020

(30) Foreign Application Priority Data

Sep. 5, 2017   (JP) .............................. JP2017-170035

(51) Int. Cl.
*G06T 5/00* (2006.01)
*G06T 5/50* (2006.01)

(52) U.S. Cl.
CPC ................ *G06T 5/003* (2013.01); *G06T 5/50* (2013.01); *G06T 2207/10024* (2013.01); *G06T 2207/10048* (2013.01); *G06T 2207/20201* (2013.01)

(58) Field of Classification Search
CPC . G06T 5/003; G06T 5/50; G06T 2207/10024; G06T 2207/10048; G06T 2207/20201; G06T 2207/30252
See application file for complete search history.

(56) References Cited

U.S. PATENT DOCUMENTS 8,867,856 B2 * 10/2014 Wang ...................... G06T 5/003
                                                      382/254
9,235,876 B2 *  1/2016 Hogasten ............. H04N 5/3658
(Continued)

FOREIGN PATENT DOCUMENTS

CN         103544681 A      1/2014
CN         103544681 B      6/2017
(Continued)

OTHER PUBLICATIONS

U.S. Appl. No. 16/642,389, filed Feb. 27, 2020, Aoki et al.
(Continued)

*Primary Examiner* — Phuoc Tran
(74) *Attorney, Agent, or Firm* — Wolf, Greenfield & Sacks, P.C.

(57) ABSTRACT

Image processing methods and apparatus are described. The image processing method comprises receiving input of a visible-ray image and an infrared-ray image obtained by photographing a same subject, estimating, based on the visible-ray image, the infrared-ray image and motion information, a blur estimate associated with the visible-ray image, and generating, based on the estimated blur estimate, a corrected visible-ray image.

18 Claims, 32 Drawing Sheets

(56) References Cited

U.S. PATENT DOCUMENTS

| | | |
|---|---|---|
| 2010/0246989 A1 | 9/2010 | Agrawal et al. |
| 2013/0120601 A1 | 5/2013 | Han |
| 2020/0193569 A1 | 6/2020 | Aoki et al. |

FOREIGN PATENT DOCUMENTS

| | | |
|---|---|---|
| EP | 2 189 939 A2 | 5/2010 |
| JP | 2002-203240 A | 7/2002 |
| JP | 2003-209735 A | 7/2003 |
| JP | 2008-176735 A | 7/2008 |
| JP | 2009-111596 A | 5/2009 |
| JP | 2013-175003 A | 9/2013 |
| JP | 2014-157452 A | 8/2014 |
| JP | 2015-064890 A | 4/2015 |
| WO | 2016/194177 A | 12/2016 |

OTHER PUBLICATIONS

International Search Report and Written Opinion dated Nov. 6, 2018 in connection with International Application No. PCT/JP2018/032077.

Matsui et al., Image Enhancement of Low-Light Scenes with Near-Infrared Flash Images. Lecture Notes in Computer Science. Sep. 23, 2009. pp. 213-223.

Yamashita et al., RGB-NIR imaging with exposure bracketing for joint denoising and deblurring of low-light color images. 2017 IEEE International Conference on Acoustics, Speech, and Signal Processing (ICASSP). Mar. 2017. pp. 6055-6059.

International Search Report and Written Opinion dated Nov. 19, 2018 in connection with International Application No. PCT/JP2018/032076.

International Preliminary Report on Patentability dated Mar. 19, 2020 in connection with International Application No. PCT/JP2018/032076.

International Preliminary Report on Patentability dated Mar. 19, 2020 in connection with International Application No. PCT/JP2018/032077.

Yue et al., Deblur a blurred RGB image with a sharp NIR image through local linear mapping. 2014 IEEE International Conference on Multimedia and Expo (ICME). Jul. 14, 2014. 6 pages. DOI:10.1109/ICME.2014.6890310.

* cited by examiner

FIG. 4
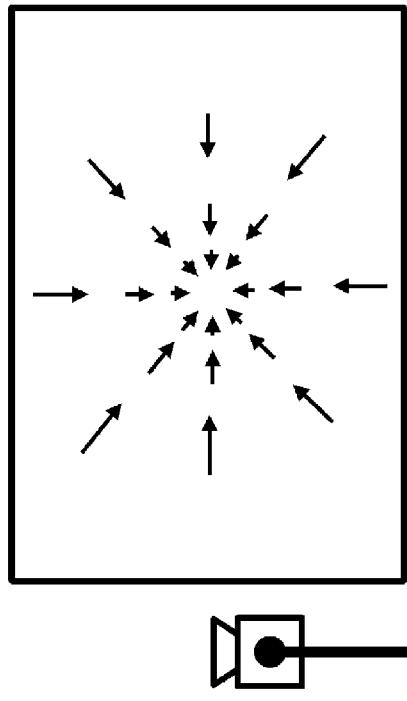
(2) CAMERA MOVES STRAIGHT BACKWARD
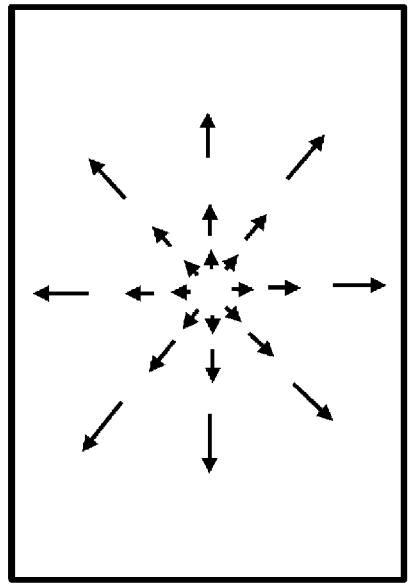
(1) CAMERA MOVES STRAIGHT FORWARD
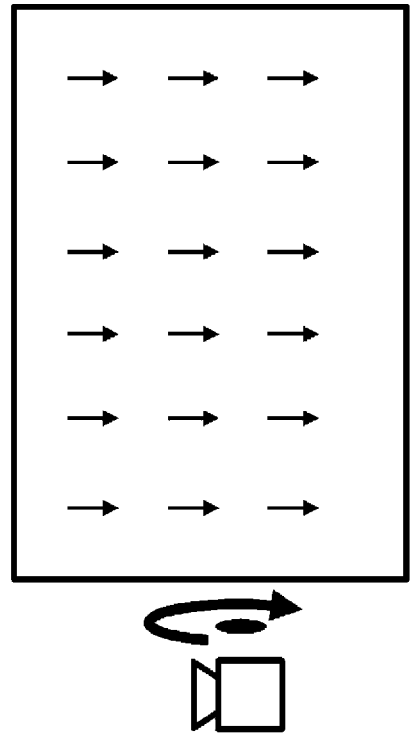
(4) CAMERA ROTATES UPWARD
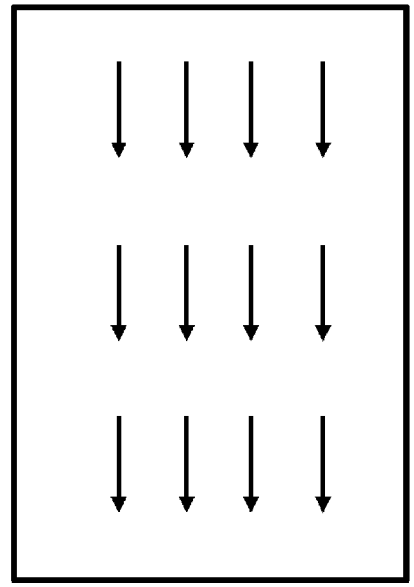
(3) CAMERA ROTATES TO RIGHT FIG. 5
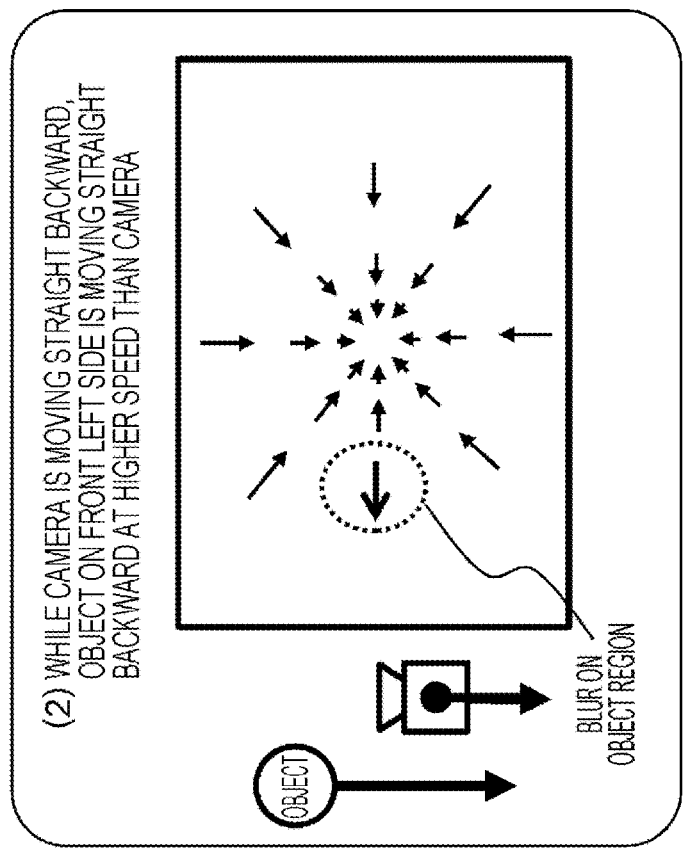
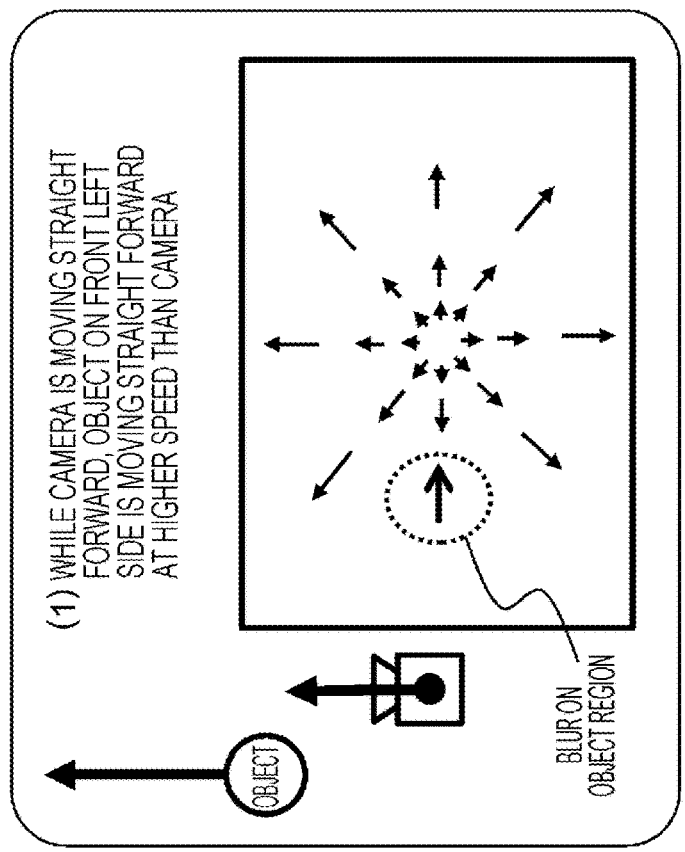

FIG. 10
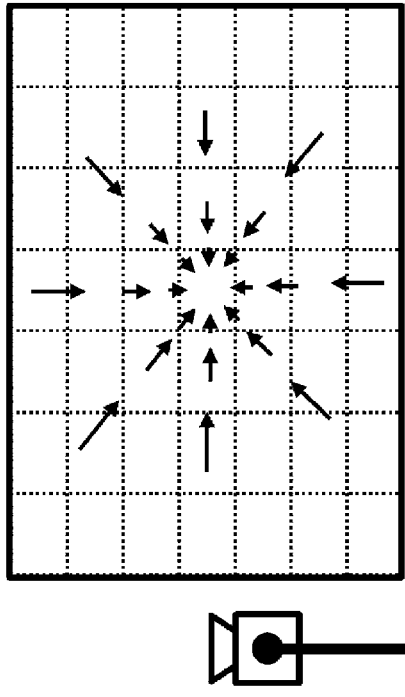
(2) CAMERA MOTION BLUR (Ec) MAP WHEN CAMERA MOVES STRAIGHT BACKWARD
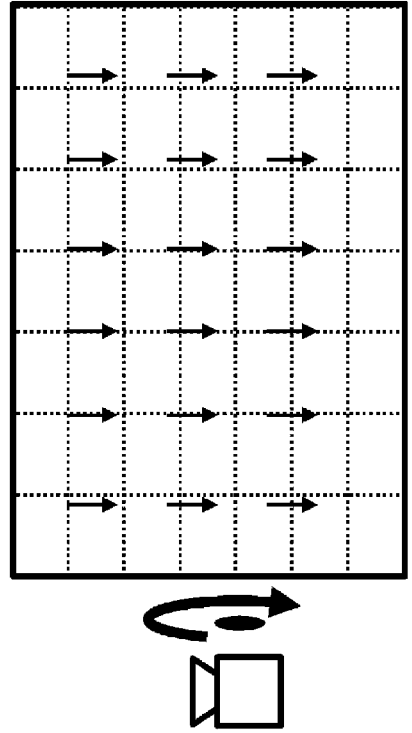
(4) CAMERA MOTION BLUR (Ec) MAP WHEN CAMERA ROTATES UPWARD
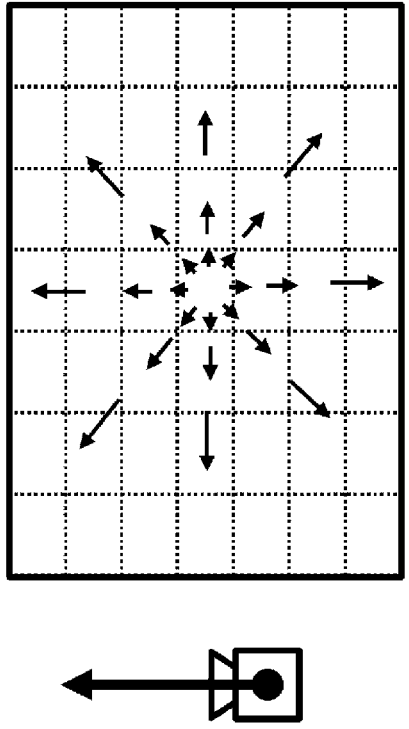
(1) CAMERA MOTION BLUR (Ec) MAP WHEN CAMERA MOVES STRAIGHT FORWARD
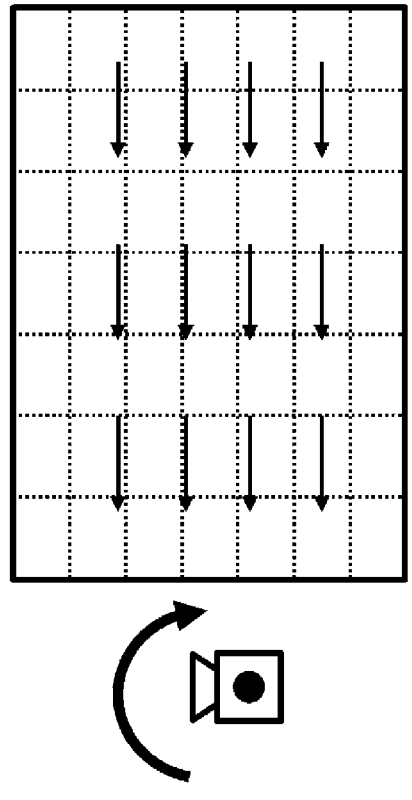
(3) CAMERA MOTION BLUR (Ec) MAP WHEN CAMERA ROTATES TO RIGHT FIG. 16
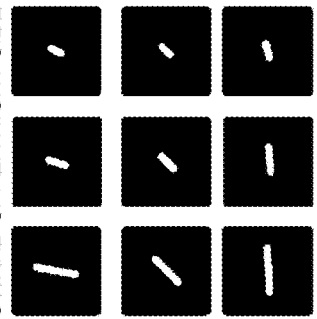
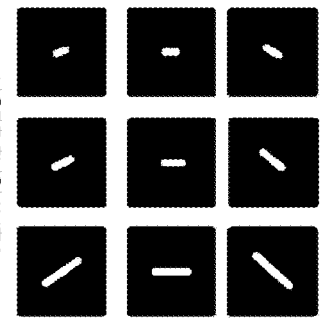
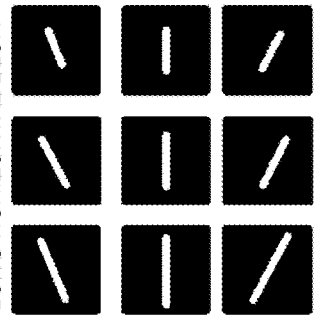
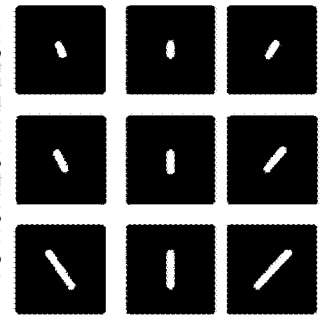
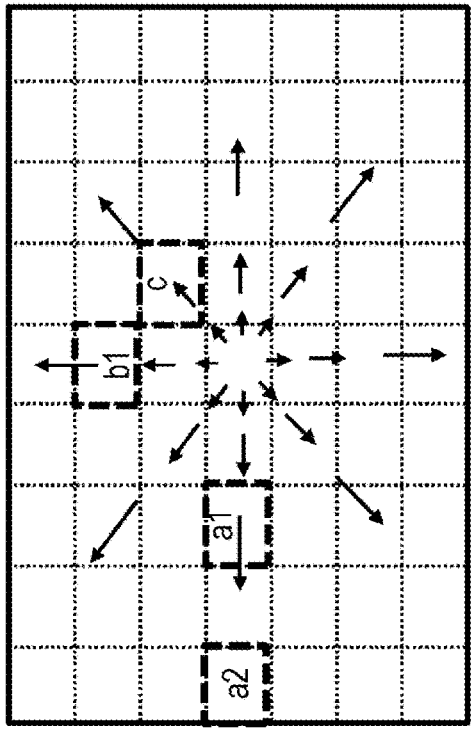

IMAGE PROCESSING DEVICE, IMAGE PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2018/032077, filed in the Japanese Patent Office as a Receiving Office on Aug. 30, 2018, which claims priority to Japanese Patent Application Number JP2017-170035, filed in the Japanese Patent Office on Sep. 5, 2017, each of which is hereby incorporated by reference in its entirety.

TECHNICAL FIELD

The present disclosure relates to an image processing device, an image processing method, and a program. Specifically, the present disclosure relates to an image processing device, an image processing method, and a program for inputting camera motion information together with a visible light image and an infrared image to reduce a blur (defocusing) on the visible light image.

BACKGROUND ART

In the case of capturing a visible light image in dark environment such as the night-time, an exposure time needs to be long, and as a result, a blur as defocusing due to camera motion or object motion is easily generated.

For example, there is, as a related technology for solving such a problem, a technique disclosed in Patent Literature 1 (JP 2003-209735 A).

Patent Literature 1 discloses the technology of analyzing image motion by means of multiple images continuously captured by a visible light camera, thereby correcting defocusing on the basis of such a motion analysis result.

However, in the above-described configuration described in Patent Literature 1, the multiple continuously-captured images are necessary, and there is a problem that processing cannot be executed for a stationary image. Moreover, the processing of analyzing the image motion from the multiple continuously-captured images is necessary, and therefore, there is a problem that immediate processing for each image cannot be performed.

Further, the above-described configuration described in Patent Literature 1 discloses defocusing correction for the images captured by a fixed camera, and fails to disclose processing in the case of a moving camera. For example, there is a problem that an effect is less exerted for defocusing reduction in the case of a moving camera such as an in-vehicle camera.

CITATION LIST

Patent Literature

PTL 1: JP 2003-209735 A

SUMMARY

Technical Problem

The present disclosure has been, for example, made in view of the above-described problems, and is intended to provide an image processing device, an image processing method, and a program for accomplishing elimination or reduction of a blur (defocusing) on a visible light image by means of the visible light image and an infrared image without the need for use of multiple continuously-captured images.

Further, the present disclosure is, for example, intended to provide an image processing device, an image processing method, and a program for accomplishing effective elimination or reduction of a blur (defocusing) on a visible light image by processing considering camera motion even in the case of a moving camera such as an in-vehicle camera.

Solution to Problem

According to the present disclosure, an image processing device is provided. The image processing device comprises image processing circuitry configured to receive input of a visible-ray image and an infrared-ray image obtained by photographing a same subject, estimate, based on the visible-ray image, the infrared-ray image and motion information, a blur estimate associated with the visible-ray image, and generate, based on the estimated blur estimate, a corrected visible-ray image.

According to the present disclosure, an image processing method performed in an image processing device is provided. The image processing method comprises receiving input of a visible-ray image and an infrared-ray image obtained by photographing a same subject, estimating, based on the visible-ray image, the infrared-ray image and motion information, a blur estimate associated with the visible-ray image, and generating, based on the estimated blur estimate, a corrected visible-ray image.

According to the present disclosure, a non-transitory computer readable medium is provided. The non-transitory computer readable medium is encoded with a plurality of instructions that, when executed by image processing circuitry of an image processing device, perform an image processing method. The image processing method comprises receiving input of a visible-ray image and an infrared-ray image obtained by photographing a same subject, estimating, based on the visible-ray image, the infrared-ray image and motion information, a blur estimate associated with the visible-ray image, and generating, based on the estimated blur estimate, a corrected visible-ray image.

Note that the program of the present disclosure is, for example, a program which can be provided by a storage medium or a communication medium configured to provide various program codes in a computer readable form to an information processing device or a computer system which can execute the program codes. Such a program is provided in the computer readable form to implement processing according to the program on the information processing device or the computer system.

Other objects, features, and advantageous effects of the present disclosure will be obvious from more detailed description based on embodiments of the present disclosure and the attached drawings as described later. Note that a system in the present specification is a logical configuration set of multiple devices, and is not limited to each device configuration in the same housing.

Advantageous Effects of Invention

According to the configuration of one embodiment of the present disclosure, the device and method for executing the image quality improvement processing of removing or reducing the blur (defocusing) on the visible light image are implemented.

Specifically, the visible light image and the far-infrared image captured by simultaneous photographing of the same object and the camera motion information are input. The camera motion-based blur as the blur (defocusing) on the visible light image due to the camera motion is estimated. The visible light image, the far-infrared image, and the camera motion-based blur are utilized to estimate the integrated filter as the filter for generating the blur corresponding to the integrated blur of the visible light image-based blur and the camera motion-based blur. The opposite characteristic filter with the characteristics opposite to those of the estimated integrated filter is applied to the visible light image to generate the corrected visible light image whose blur has been removed or reduced.

By these types of processing, the device and method for executing the image quality improvement processing of removing or reducing the blur (defocusing) on the visible light image are implemented.

Note that the advantageous effects described in the present specification have been set forth merely as examples, and are not limited. Moreover, additional advantageous effects may be provided.

BRIEF DESCRIPTION OF DRAWINGS

FIG. 4 illustrates diagrams for describing a blur on the captured image due to camera motion.

FIG. 5 illustrates diagrams for describing the blur on the captured image due to the camera motion and influence of object motion.

FIG. 10 illustrates diagrams for describing a camera motion blur map.

FIG. 16 illustrates diagrams for describing data stored in a filter bank pool and an example of a filter bank selection processing based on camera motion.

DESCRIPTION OF EMBODIMENTS

Figure 1:
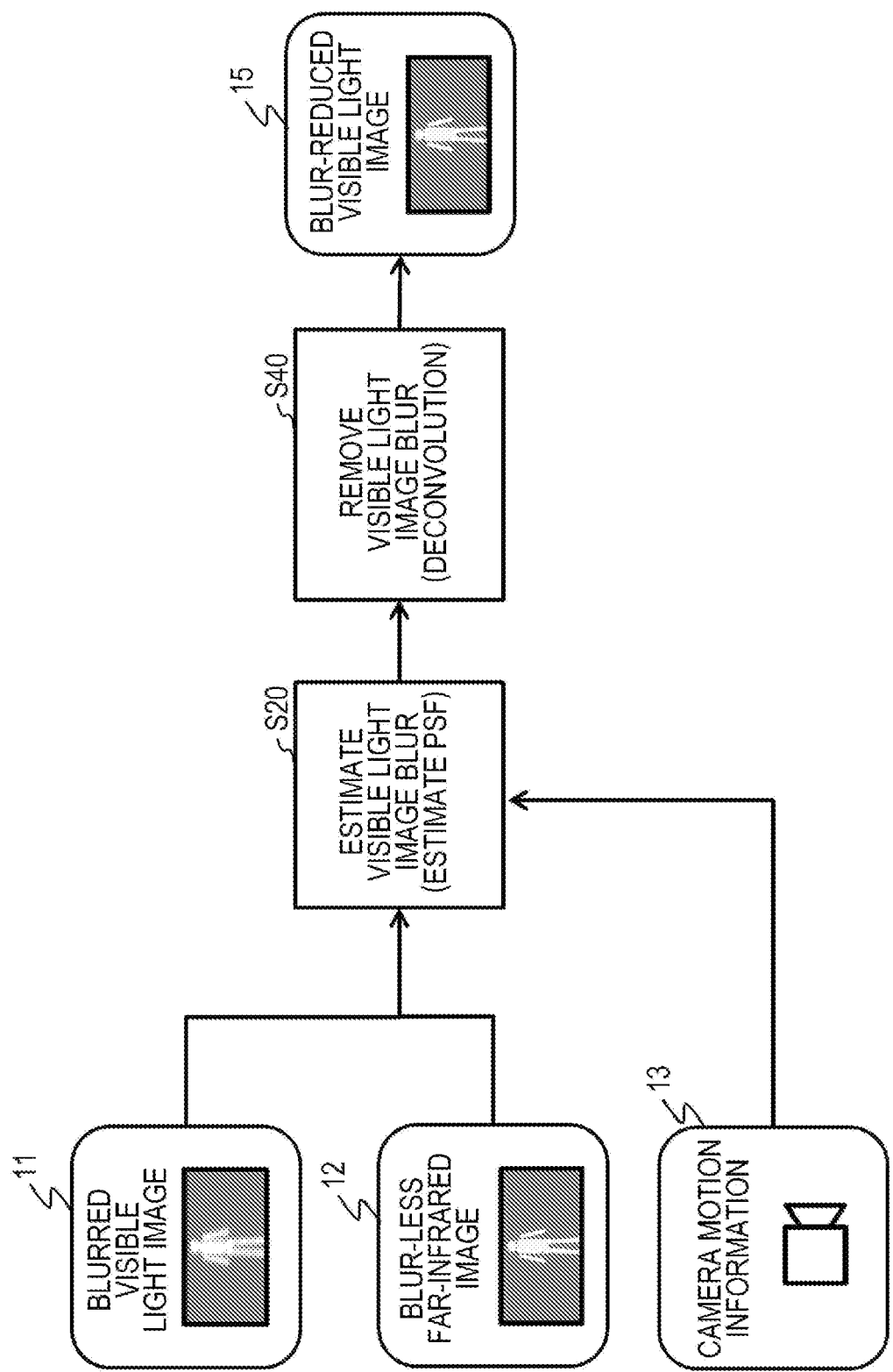
FIG. 1 illustrates a diagram for describing the outline of processing executed by an image processing device of the present disclosure.

Hereinafter, details of an image processing device, an image processing method, and a program according to an embodiment of the present disclosure will be described with reference to the drawings. Note that description will be made in accordance with the following contents:
1. Outline of configuration and processing of image processing device of present disclosure
2. Specific examples of blur generated due to camera motion
3. Example of camera attachment to vehicle
4. Outline of configuration and processing of image processing device of present disclosure 5. (First Embodiment) Configuration and processing of image processing device corresponding to configuration A
6. (Second Embodiment) Configuration and processing of image processing device corresponding to configuration B
7. (Third Embodiment) Configuration and processing of image processing device corresponding to configuration A+C
8. (Fourth Embodiment) Configuration and processing of image processing device corresponding to configuration B+C
9. Hardware configuration example of image processing device
10. Configuration example of vehicle control system including image processing device of present disclosure in vehicle
11. Summary of configuration of present disclosure

1. Outline of Configuration and Processing of Image Processing Device of Present Disclosure First, the outline of the configuration and processing of the image processing device of the present disclosure will be described with reference to FIG. 1 and subsequent figures.

FIG. 1 is a diagram for describing the outline of the processing executed by the image processing device of the present disclosure.

The image processing device of the present disclosure is configured to execute the processing of receiving a visible light image and an infrared image captured by photographing of the same object and receiving camera motion information of cameras having captured these images, thereby reducing a blur (defocusing) on the visible light image.

In the case of capturing the visible light image in dark environment such as the night-time, an exposure time needs to be long, and as a result, a blur due to camera motion or object motion is easily generated.

The image processing device of the present disclosure utilizes a far-infrared image captured by simultaneous photographing of the same object to reduce the blur on the visible light image captured under such environment, for example.

The infrared image is an image for which a pixel value is set according to heat generated from the object, and allows detection of a human body temperature, for example. Thus, e.g., a person or the like generating heat in the dark or the like can be photographed, and the infrared image is utilized for a security camera and the like. Of infrared light, far-infrared light with a long wavelength exhibits high sensitivity to heat. Thus, even in photographing with a short exposure time, the object generating heat, such as a person, can be relatively clearly photographed.

In the case of capturing the visible light image in the dark, such as the night-time, the exposure time needs to be long, and the blur (defocusing) spreads in association with the camera or object motion.

However, the far-infrared image can be clearly captured for the object generating heat, such as a person, for example, even when photographing is performed with a short exposure time in the dark.

The image processing device of the present disclosure utilizes a difference in characteristics between the visible light image and the far-infrared image, thereby correcting the visible light image with greater blurs. That is, correction (blur removing) processing is performed using, as a reference image, the infrared image with less blurs, and in this manner, the visible light image whose blur has been eliminated or reduced is generated.

The outline of the processing executed by the image processing device of the present disclosure will be described with reference to FIG. 1.

As illustrated in FIG. 1, the image processing device of the present disclosure receives a blurred visible light image 11 and a blur-less far-infrared image 12, these images being simultaneously captured by photographing of the same object.

Further, camera motion information 13 on cameras having captured these images is also input.

The image processing device of the present disclosure first utilizes, at a step S20, the two input images and the camera motion information to perform visible light image blur estimation.

Specifically, a point spread function (PSF) as a function indicating an image defocusing amount is estimated, for example.

The PSF is a function indicating the degree of spread about a pixel value of a certain pixel position, i.e., the defocusing amount or a defocusing form.

At the step S20, filters corresponding to various point spread functions (PSFs), i.e., filters for generating blurs (defocusing), are applied to the blur-less far-infrared image 12, thereby generating an intentionally-blurred far-infrared image. Such a filter-applied far-infrared image and the blurred visible light image 11 are compared with each other (a correlation is calculated).

On the basis of such comparison processing (correlation calculation), the filter corresponding to the point spread function (PSF) for generating a blur (defocusing) similar to that of the blurred visible light image 11 is selected.

Note that the filter to be selected at the step S20 corresponds to a filter for generating the blurred visible light image 11 in the case of applying such a filter to a blur-less (defocusing-less) visible light image.

However, the blur-less (defocusing-less) visible light image is not captured as a captured image, and therefore, the blur-less far-infrared image 12 is utilized as a substitute image.

That is, by such application to the blur-less far-infrared image 12, the filter for generating the blur (defocusing) similar to that on the blurred visible light image 11 is selected, or the point spread function (PSF) for generating the blur (defocusing) similar to that on the blurred visible light image 11 is calculated.

Next, the processing of removing the blur on the visible light image is performed at a step S40.

The blur removing processing is the processing of generating an inverse filter with characteristics opposite to filter characteristics indicated by the above-described point spread function: PSF=p(x, y), thereby applying the generated inverse filter to the blurred visible light image 11.

By such inverse filter application processing, the blur (defocusing) is removed from the blurred visible light image 11, and therefore, a blur-reduced visible light image 15 is generated.

Note that as the visible light image blur removing processing of the step S40, filter processing, which is called "deconvolution processing," in a frequency domain is applicable.

When the point spread function of the blurred visible light image 11 is (PSF)=p(x, y), the blurred visible light image 11 is b(x, y), and a blur-less proper visible light image is s(x, y), in a case where each Fourier transform is P(u, v), B(u, v), S(u, v), the following relational expressions are satisfied:

$$b(x,y)=p(x,y)*s(x,y)$$

$$B(u,v)=P(u,v) \times S(U,v)$$

where "*" indicates convolution operation.

$$B(u,v)=FT[b(x,y)]$$

$$P(u,v)=FT[p(x,y)]$$

$$S(u,v)=FT[s(x,y)]$$

Further, when the Fourier transform is FT[ ], the above-described relational expressions are satisfied.

The processing of calculating the blur-less proper visible light image: s(x, y) is the processing (=similar to the processing of calculating S(u, v) from B(u, v)) of calculating the blur-less proper visible light image: s(x, y) from the blurred visible light image 11: b(x, y). A filter for performing such processing is called a "deconvolution filter," and the processing of applying such a filter is called "deconvolution processing."

The deconvolution filter is an inverse filter with characteristics opposite to filter characteristics indicated by PSF=p (x, y).

As described above, at the step S40, the inverse filter with the characteristics opposite to the filter characteristics indicated by PSF=p(x, y) indicating the blur form of the blurred visible light image 11 estimated at the step S20 is generated, and the generated inverse filter is applied to the blurred visible light image 11.

That is, the "deconvolution processing" is executed to generate, from the blurred visible light image 11, the blur-reduced visible light image 15 whose blur (defocusing) has been removed.

Next, the visible light image and the infrared image will be described with reference to FIG. 2.

Figure 2:
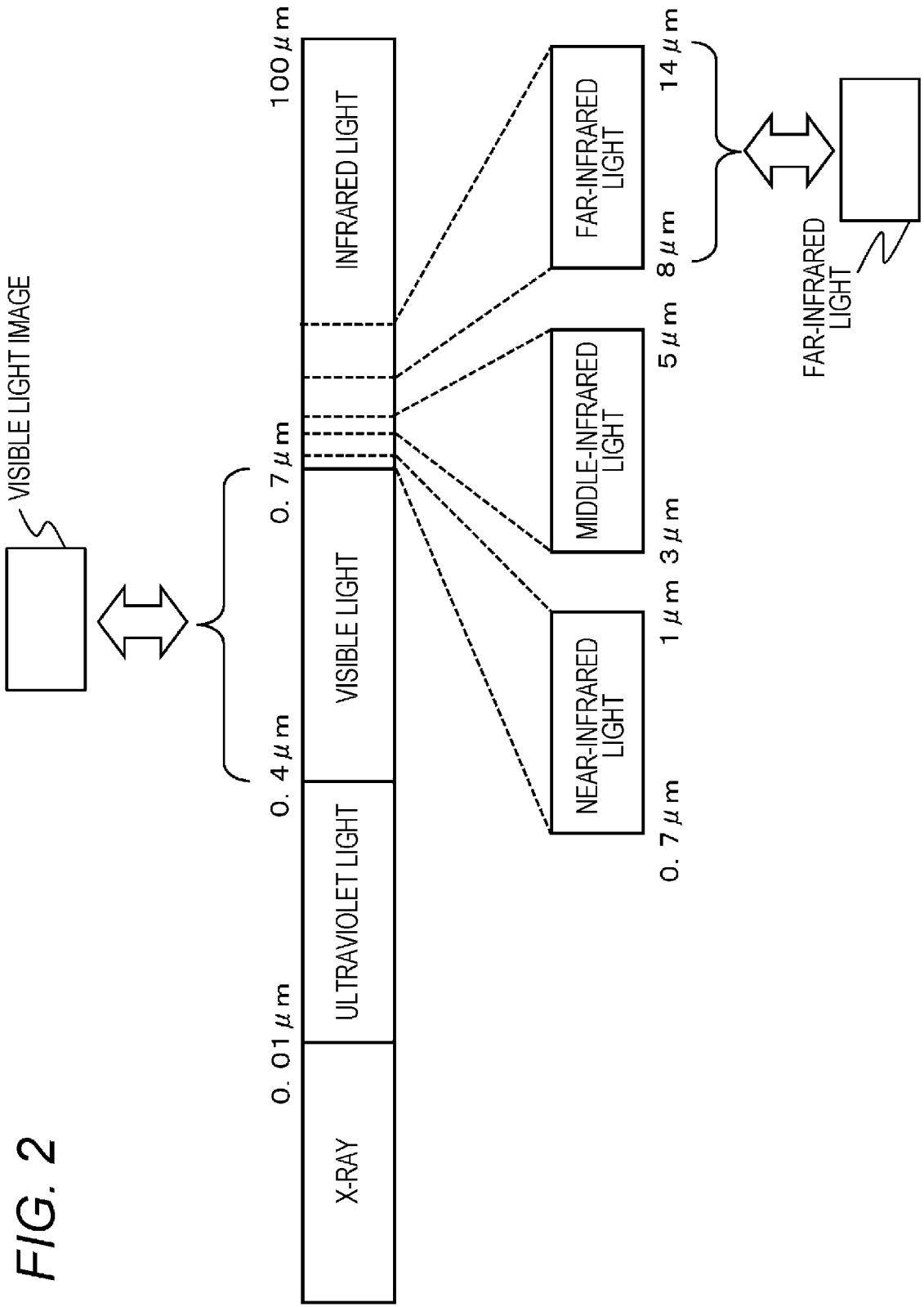
FIG. 2 illustrates a diagram for describing a correspondence between the type of captured image and a light wavelength.

As illustrated in FIG. 2, the visible light image is an image with a wavelength range of about 0.4 μm to 0.7 μm, and is a color image captured by a typical camera, such as a RGB image.

On the other hand, the infrared image is an image having long-wavelength light with a wavelength of equal to or greater than 0.7 μm. An infrared image camera configured to capture the infrared image can photograph, e.g., a person or the like generating heat in the dark or the like, and is utilized for a security camera and the like.

Note that as illustrated in FIG. 2, the infrared light is divided into:
near-infrared light with a wavelength of about 0.7 to 1 μm;
middle-infrared light with a wavelength of about 3 to 5 μm; and
far-infrared light with a wavelength of about 8 to 14 μm.

In the embodiments described below, an image processing example utilizing a far-infrared image as a captured image with far-infrared light having a wavelength of about 8 to 14 μm will be mainly described.

Note that the processing of the present disclosure is not limited to the far-infrared image, and is also applicable to processing utilizing other infrared images.

As described earlier, in the case of capturing the visible light image in the dark environment such as the night-time, the exposure time needs to be long, and as a result, the blur due to the camera motion or the object motion is easily generated. On the other hand, the far-infrared image can be clearly captured for the object generating heat, such as a person, even upon photographing with a short exposure time.

Figure 3:
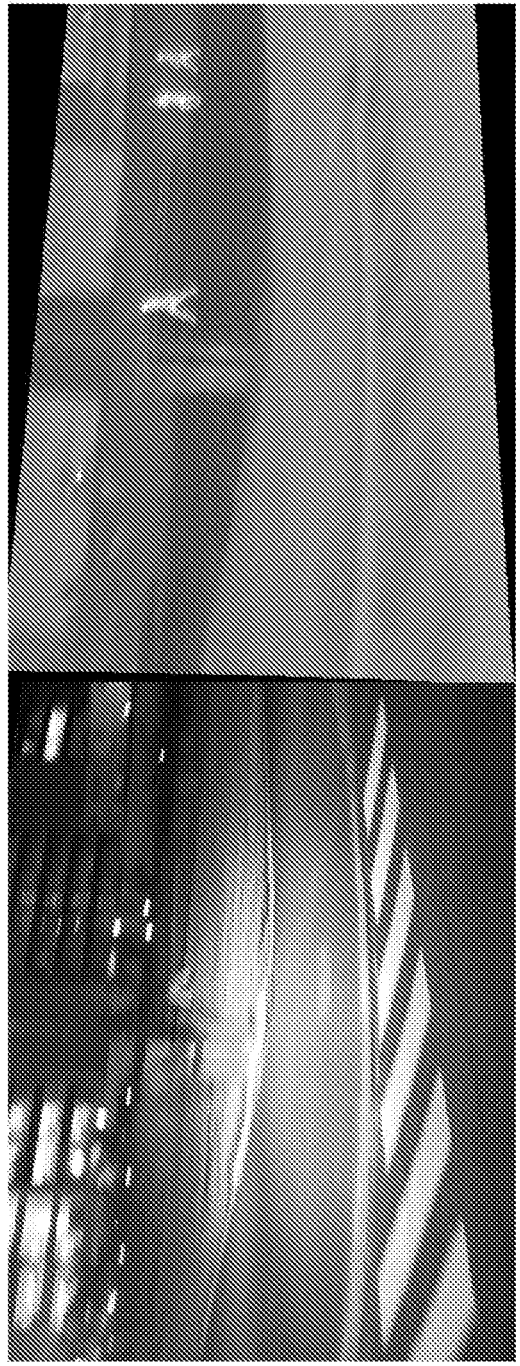
FIG. 3 illustrates views for describing examples of a visible light image and a far-infrared image.

Specific captured image examples will be illustrated in FIG. 3.

FIG. 3 illustrates the examples of the visible light image and the far-infrared image as the captured images upon photographing at an intersection during the night-time. These two images are captured images in dark environment, and long exposure is performed for the visible light image.

When (1) the visible light image and (2) the far-infrared image are compared with each other, (1) the visible light image shows great blurs (defocusing), and shows almost no recognizable person appearances. However, (2) the far-infrared image clearly shows the person appearances.

This is because the exposure time for the far-infrared image is short and almost no blurs (defocusing) are generated.

As described above, the image processing device of the present disclosure uses, as the reference image, the far-infrared image with almost no blurs to correct the blurred visible light image, thereby generating the visible light image whose blur has been removed or reduced.

2. Specific Examples of Blur Generated Due to Camera Motion

Next, specific examples of the blur generated due to motion of the camera configured to capture the image will be described with reference to FIG. 4 and subsequent figures.

The configuration of the present disclosure implements, for example, a configuration in which a visible light image camera and a far-infrared image camera are mounted on a vehicle to generate a blur-less visible light image from images captured by these cameras and provide the blur-less visible light image to a driver.

The vehicle moves at high speed, and therefore, the images are captured while the cameras are also moving at high speed. Thus, the captured images are blurred (defocused) according to the camera motion.

FIG. 4 illustrates diagrams for describing blur forms corresponding to various types of camera motion, and the direction and size of the blur generated on the captured image in association with the following four types of camera motion are indicated by a vector:
(1) the camera moves straight forward;
(2) the camera moves straight backward;
(3) the camera rotates to the right; and
(4) the camera rotates upward.

For example, in the case of "(1) the camera moves straight forward," the blur is generated as if the image is in a fluid motion in a direction from a center portion to a peripheral portion of the captured image as illustrated in FIG. 4(1). The size of the blur is smaller at the center of the image, and becomes greater toward the periphery of the image.

Moreover, in the case of "(2) the camera moves straight backward," the blur is generated as if the image is in a fluid motion in a direction from the peripheral portion to the center portion of the captured image as illustrated in FIG. 4(2). The size of the blur is smaller at the center of the image, and becomes greater toward the periphery of the image.

Further, in the case of "(3) the camera rotates to the right," the blur is generated as if the image is in a fluid motion in a direction from the right to the left of the captured image as illustrated in the figure. The size of the blur is substantially uniform across the image.

In addition, in the case of "(4) the camera rotates upward," the blur is generated as if the image is in a fluid motion in a direction from the top to the bottom of the captured image as illustrated in the figure. The size of the blur is substantially uniform across the image.

As described above, the captured image is blurred (defocused) according to the camera motion.

Note that the setting example of the vector of each image as illustrated in FIG. 4 shows a vector indicating the direction and size of the blur in a case where no moving object is present on the image captured by the camera.

In a case where a moving object is present on the image captured by the camera, the vector indicating the direction and size of the blur varies according to the object motion.

FIG. 5 illustrates diagrams of examples of the vector indicating the direction and size of the blur in a case where the camera is moving and the object on the image captured by the camera is also moving.

FIG. 5 illustrates the following two image examples:

(1) while the camera is moving straight forward, the object on the front left side is moving forward at higher speed than the camera; and (2) while the camera is moving straight backward, the object on the front left side is moving backward at higher speed than the camera.

The example of FIG. 5(1) corresponds, for example, to a situation where a motorbike is passing at high speed on the left front side of an in-vehicle camera.

The direction and size of the blur in a case where the camera is moving straight forward and no moving object is present are set as described earlier with reference to FIG. 4(1). However, in a case where the moving object is present, a setting illustrated in FIG. 5(1) is made.

A dashed frame illustrated in FIG. 5(1) corresponds to a vector indicating the direction and size of the blur generated due to the object moving forward at higher speed than the camera.

Such a vector points in a direction opposite to those of vectors in other regions.

Moreover, the example of FIG. 5(2) is an example of an image captured by an in-vehicle camera for backward photographing, and corresponds to a situation where a motorbike is approaching at high speed from the back left side of a vehicle, for example.

The direction and size of the blur in a case where the camera is moving straight backward and no moving object is present are set as described earlier with reference to FIG. 4(2). However, in a case where the moving object is present, a setting illustrated in FIG. 5(2) is made.

A dashed frame illustrated in FIG. 5(2) corresponds to a vector indicating the direction and size of the blur generated due to the object moving backward at higher speed than the camera.

Such a vector points in a direction opposite to those of vectors in other regions.

As described above, in a case where the camera is moving and the object on the image captured by the camera is also moving, the direction and size of the blur are determined according to these types of motion.

Thus, for eliminating or reducing the blur with high accuracy, the processing needs to be performed considering the camera motion or the object motion.

3. Example of Camera Attachment to Vehicle

Next, an example of the image processing device configured to perform the processing by means of the input images captured by the cameras attached to the vehicle will be described as one configuration example of the image processing device of the present disclosure.

As described above, one configuration example of the image processing device of the present disclosure implements, for example, a configuration in which images captured by a visible light image camera and a far-infrared image camera mounted on a vehicle are input to generate a blur-less visible light image and provide the blur-less visible light image to a driver.

Figure 6:
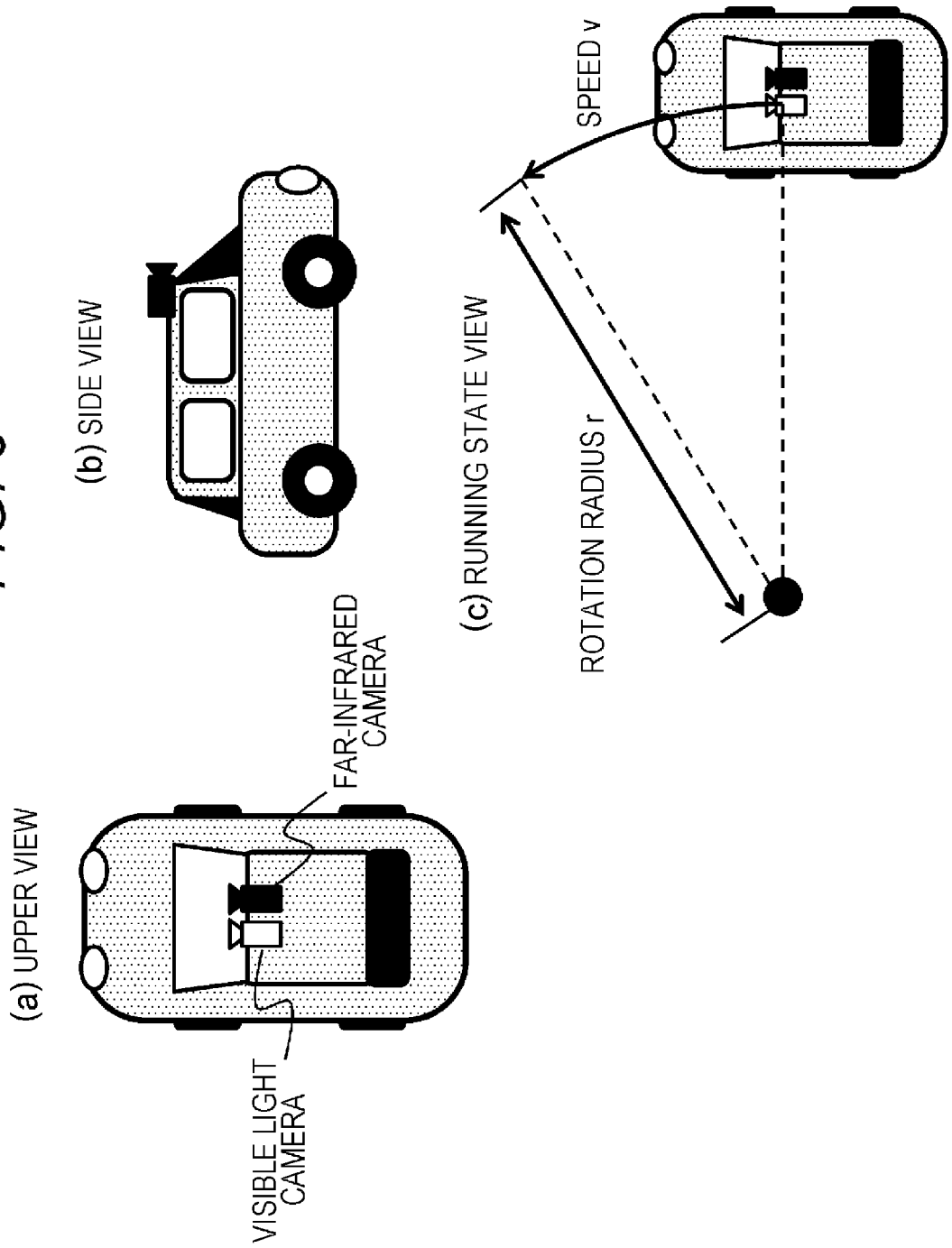
FIG. 6 illustrates views for describing an example of camera attachment to an automobile and detection of the camera motion.

FIG. 6 illustrates views of one example of camera attachment to the vehicle.

As illustrated in FIG. 6(a) as an upper view, two cameras including the visible light camera and the far-infrared camera are mounted on the vehicle. The images captured by these cameras are input to the image processing device provided inside the vehicle, and then, the processing of removing or reducing the blur (defocusing) of the visible light image is executed.

The visible light image whose blur (defocusing) has been removed or reduced is displayed on a display provided at a driver's seat. Moreover, such a visible light image is output to an automatic driving controller, and is utilized as information for automatic driving, such as obstacle detection information, for example.

Note that the example illustrated in FIG. 6 shows such a setting that the camera performs photographing only in a forward direction, but has been set forth as an example. A setting may be made such that each camera is also set for a backward or lateral direction of the vehicle to capture images in all directions.

Note that as described above, the image processing device of the present disclosure receives the visible light image and the far-infrared image, as well as receiving the camera motion information. In this manner, the image processing device implements high-accuracy blur removing processing.

For example, the camera is set to move together with the vehicle, and the camera motion information is acquired from the camera or a sensor attached to the vehicle.

The sensor includes, for example, a gyro, an IMU, an acceleration sensor, an inclination sensor, and the like.

Note that the inertial measurement unit (IMU) is a sensor configured to detect an angle, an angular speed, or an acceleration in a triaxial direction.

As illustrated in FIG. 6(c), the sensor detects a camera movement direction, a camera movement speed, a camera rotation radius, and the like, for example, and inputs, as the camera motion information, these types of information to a data processor of the image processing device.

4. Outline of Configuration and Processing of Image Processing Device of Present Disclosure Next, the outline of the configuration and processing of the image processing device of the present disclosure will be described with reference to FIG. 7 and subsequent figures.

As described earlier with reference to FIG. 1, the image processing device of the present disclosure receives the visible light image and the far-infrared image captured by simultaneous photographing of the same object and the camera motion information of the cameras having captured these images, thereby executing the processing of eliminating or reducing the blur of the visible light image.

Multiple configuration examples of the image processing device configured to execute such processing will be described with reference to FIGS. 7 and 8.

Figure 7:
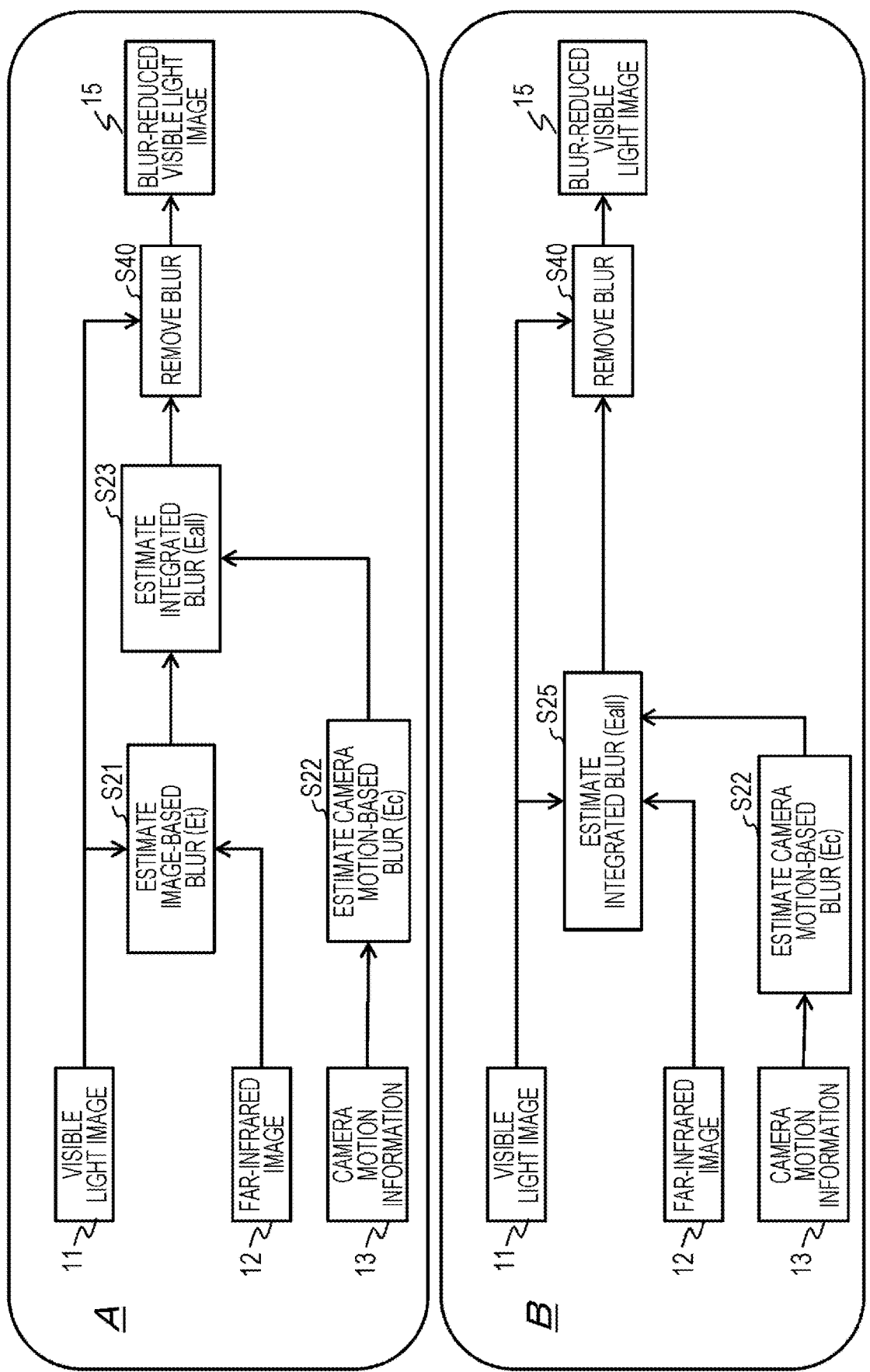
FIG. 7 illustrates diagrams for describing configuration and processing examples of the image processing device of the present disclosure.
Figure 8:
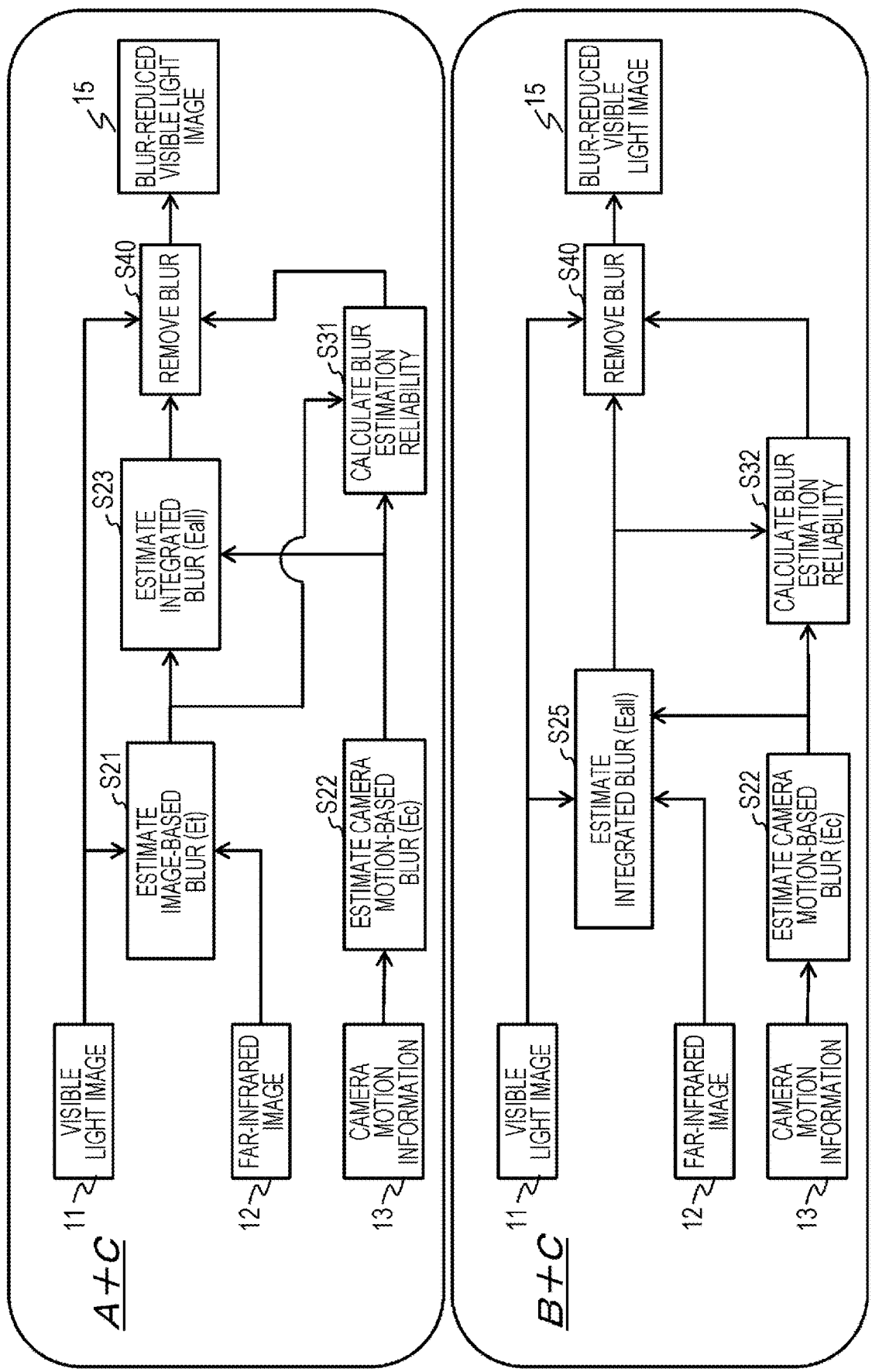
FIG. 8 illustrates a diagram for describing configuration and processing examples of the image processing device of the present disclosure.

FIGS. 7 and 8 illustrate the following multiple configuration examples of the image processing device of the present disclosure:

(Configuration A) a configuration example where camera motion-based blur estimation information based on the camera motion information is, after image-based blur estimation using the visible light image and the far-infrared image, utilized to execute final integrated blur estimation;

(Configuration B) a configuration example where image-based blur estimation using the visible light image and the far-infrared image and camera motion-based blur estimation based on the camera motion information are executed in combination to execute integrated blur estimation;

(Configuration A+C) the configuration A+a configuration example where the degree of reliability of a filter (blur) estimation result is calculated to perform the blur removing processing according to the degree of reliability; and (Configuration B+C) the configuration B+a configuration example where the degree of reliability of the filter (blur) estimation result is calculated to perform the blur removing processing according to the degree of reliability.

The image processing device of the present disclosure includes various configuration examples as illustrated in FIGS. 5 and 6.

Specific configuration and processing of each of these configuration examples will be described later, but the outline of the processing according to these four types of configurations will be first described.

(Configuration A) The configuration example where the camera motion-based blur estimation information based on the camera motion information is, after image-based blur estimation using the visible light image and the far-infrared image, utilized to execute final integrated blur estimation.

In this configuration A, two processing steps described with reference to FIG. 1, i.e., the blur estimation processing of the step S20 and the blur removing processing of the step S40, are performed.

Note that in the configuration A illustrated in FIG. 7, the blur estimation processing of the step S20 described with reference to FIG. 1 includes the following three steps:

(Step S21) estimation of image-based blur (Et);

(Step S22) estimation of camera motion-based blur (Ec); and (Step S23) estimation of integrated blur (Eall).

The meaning of each reference character used in FIG. 7 and other drawings and the following description will be described:

Et: an image-based blur as a visible light image blur estimated on the basis of the visible light image and the far-infrared image, specifically defocusing form information such as a point spread function (PSF);

Ec: a camera motion-based blur as a visible light image blur estimated on the basis of motion of the camera having captured the image (the visible light image and the far-infrared image), specifically defocusing form information such as a PSF; and Eall: an integrated blur as an integrated visible light image blur of the image-based blur (Et) and the camera motion-based blur (Ec), specifically defocusing form information such as a PSF.

Further, a filter for generating an image blur (defocusing) similar to the image-based blur (Et) or a filter coefficient forming the filter is taken as an image-based filter (Etf), a filter for generating an image blur (defocusing) similar to the camera motion-based blur (Ec) or a filter coefficient forming the filter is taken as a camera motion-based filter (Ecf), and a filter for generating an image blur (defocusing) similar to the integrated blur (Eall) or a filter coefficient forming the filter is taken as an integrated filter (Eallf).

Note that each blur and each filter can be acquired/calculated/applied for each unit block as a divided image region.

Moreover, from a single blur form, a single filter for generating such a blur is uniquely determined.

Thus, the processing of comparing the image-based filter (Etf) in a certain form and the camera motion-based blur (Ec) to determining whether or not the blur form generated by application of the image-based filter (Etf) is coincident with or similar to the camera motion-based blur (Ec) can be performed, for example. That is, the processing of determining the degree of similarity between the blur and the filter is also performed.

In the embodiments described later, such processing is also performed.

The processing executed in the configuration A illustrated in FIG. 7 will be described.

First, at the step S21, the blurred visible light image 11 and the blur-less far-infrared image 12 captured by simultaneous photographing of the same object are input, and then, are compared with each other. In this manner, the processing of estimating the image-based blur (Et) on the blurred visible light image 11 is performed.

Specifically, the filters corresponding to various point spread functions (PSFs), i.e., the filters for generating the blurs (defocusing), are applied to the blur-less far-infrared image 12, thereby generating the intentionally-blurred far-infrared image. Such a filter-applied far-infrared image and the blurred visible light image 11 are compared with each other (the correlation is calculated).

On the basis of such comparison processing (correlation calculation), the filter corresponding to the point spread function (PSF) for generating the blur (defocusing) similar to that of the blurred visible light image 11 is selected.

That is, various filters are applied to the blur-less far-infrared image 12 to generate the blur, and comparison with the blurred visible light image 11 is performed. In this manner, the filter for generating the blur (defocusing) similar to the blur form of the blurred visible light image 11 is selected, or the point spread function (PSF) for generating the blur (defocusing) similar to the blur form of the blurred visible light image 11 is calculated.

Note that filter selection is executed for each of predetermined unit pixel blocks, for example.

Next, at the step S22, the processing of estimating the camera motion-based blur (Ec) is performed.

Specifically, the blur estimated to be generated on the captured image is estimated according to the camera motion acquired by the sensor such as an IMU, for example. For example, the vector indicating the direction and size of the blur as described earlier with reference to FIG. 4 is estimated. That is, the blur generated on the image according to various types of camera motion is estimated for each unit block of the image.

Next, at the step S23, the integrated blur (Eall) of the image-based blur (Et) estimated at the step S21 and the camera motion-based blur (Ec) estimated at the step S22 is estimated.

Such integration processing is executed for each unit block as the divided image region.

By such integration processing, the blur is estimated for each unit block of the visible light image 11, considering even the camera motion.

When the processing of these steps S21 to S23 ends, the blur removing processing of the step S40 is subsequently executed.

At the step S40, the "inverse filter" with the characteristics opposite to the filter characteristics similar to PSF characteristics indicating the blur form (Eall) of the blurred visible light image 11 estimated at the step S23 is calculated or is selected from an inverse filter bank storing various inverse filters, and then, the calculated or selected inverse filter is applied to the blurred visible light image 11.

Note that as described above, such inverse filter application processing is called the deconvolution processing. The deconvolution processing is executed to generate, from the blurred visible light image 11, the blur-reduced visible light image 15 whose blur (defocusing) has been removed.

Note that the processing of calculating or selecting and applying the inverse filter is executed for each of the predetermined unit pixel blocks.

(Configuration B) The configuration example where image-based blur estimation using the visible light image and the far-infrared image and camera motion-based blur estimation based on the camera motion information are executed in combination to execute integrated blur estimation.

Next, the configuration B will be described.

A difference between the configuration B and the configuration A described above is that the blur estimation processing of the step S20 described with reference to FIG. 1 includes the following two steps:

(Step S22) estimation of camera motion-based blur (Ec); and (Step S25) estimation of integrated blur (Eall).

First, at the step S22, the processing of estimating the camera motion-based blur (Ec) is performed.

Such processing is processing similar to the processing of the step S22 in the above-described (configuration A). That is, the blur generated on the image according to various types of camera motion is estimated for each unit block of the image.

Next, at the step S25, the processing of estimating the integrated blur (Eall) is executed.

Such processing is for performing processing utilizing the camera motion-based blur (Ec) having been already acquired at the step S22 in the processing of estimating the blur of the blurred visible light image 11 based on the blurred visible light image 11 and the blur-less far-infrared image 12 captured by simultaneous photographing of the same object.

Although specific processing will be described later, e.g., any of the following two types of processing is executed:

(1) the processing of selecting, on the basis of the camera motion-based blur (Ec) having been already acquired at the step S22, the filter to be applied to the far-infrared image, i.e., the filter for generating the blur (defocusing); and (2) the processing of correcting, on the basis of the camera motion-based blur (Ec) having been already acquired at the step S22, the value of correlation between the filter-applied far-infrared image and the blurred visible light image 11.

For example, at the step S25, any of these two types of processing is executed to execute the processing of estimating the integrated blur (Eall).

Specific processing will be described later.

At the step S40, the "inverse filter" with the characteristics opposite to the filter characteristics similar to the PSF characteristics indicating the blur form (Eall) of the blurred visible light image 11 estimated at the step S25 is calculated or is selected from the inverse filter bank storing various inverse filters, and then, the calculated or selected inverse filter is applied to the blurred visible light image 11.

(Configuration A+C) the configuration A+the configuration example where the degree of reliability of the filter (blur) estimation result is calculated to perform the blur removing processing according to the degree of reliability.

Next, the (configuration A+C) will be described.

This configuration is a configuration example where the degree of reliability of the filter (blur) estimation result is, in addition to the configuration A, calculated to perform the blur removing processing according to the degree of reliability.

The (Configuration A+C) is characterized in that the blur estimation reliability calculation processing is, as illustrated in a diagram of (A+C) of FIG. 8, executed at a step S31 before the blur removing processing at the step S40.

Other configurations are similar to those of the configuration A.

In the blur estimation reliability calculation processing at the step S31, the image-based blur estimation result (Et) of the step S21 and the camera motion-based blur estimation result (Ec) of the step S22 are compared with each other, and it is determined as a higher degree of reliability of the estimation result of the integrated blur (Eall) generated at the step S23 in the case of a higher degree of coincidence between the two blur estimation results.

The reliability information generated at the step S31 is utilized in the blur removing processing of the step S40.

That is, the strength of the inverse filter applied in the blur removing processing of the step S40 is adjusted by the reliability information calculated at the step S31.

Specifically, in a case where the degree of reliability of the estimation result of the integrated blur (Eall) generated at the step S23 is low, the processing of decreasing the strength of the inverse filter applied in the blur removing processing of the step S40 is performed. Note that calculation of the degree of reliability is executed for each of the predetermined unit pixel blocks, for example.

By such processing, the inverse filter can be applied according to the degree of reliability of the filter (blur) estimation result.

(Configuration B+C) The configuration B+the configuration example where the degree of reliability of the filter (blur) estimation result is calculated to perform the blur removing processing according to the degree of reliability.

Next, the (configuration B+C) will be described.

This configuration is a configuration example where the degree of reliability of the filter (blur) estimation result is, in addition to the configuration B, calculated to perform the blur removing processing according to the degree of reliability.

The (Configuration B+C) is characterized in that the blur estimation reliability calculation processing is, as illustrated in a diagram of (B+C) of FIG. 8, executed at a step S32 before the blur removing processing at the step S40.

Other configurations are similar to those of the configuration B.

In the blur estimation reliability calculation processing at the step S32, the camera motion-based blur estimation result (Ec) of the step S22 and the integrated blur estimation result (Eall) of the step S25 are compared with each other, and it is determined as a higher degree of reliability of the estimation result of the integrated blur (Eall) generated at the step S23 in the case of a higher degree of coincidence between the two blur estimation results.

The reliability information generated at the step S32 is utilized in the blur removing processing of the step S40.

That is, the strength of the inverse filter applied in the blur removing processing of the step S40 is adjusted by the reliability information calculated at the step S32.

Specifically, in a case where the degree of reliability of the estimation result of the integrated blur (Eall) generated at the step S23 is low, the processing of decreasing the strength of the inverse filter applied in the blur removing processing of the step S40 is performed. Note that calculation of the degree of reliability is executed for each of the predetermined unit pixel blocks, for example.

By such processing, the inverse filter can be applied according to the degree of reliability of the filter (blur) estimation result.

Note that specific configuration examples or processing examples will be described later.

5. (First Embodiment) Configuration and Processing of Image Processing Device Corresponding to Configuration A Next, specific configuration and processing of an image processing device corresponding to the configuration A described with reference to FIG. 7 will be described as a first embodiment of the image processing device of the present disclosure.

As described earlier with reference to FIG. 7, the configuration A is a configuration in which camera motion-based blur estimation information based on camera motion information is, after image-based blur estimation using a visible light image and a far-infrared image, utilized to execute final integrated blur estimation.

Note that the processing form of the integrated blur (Eall) estimation processing of the configuration A includes the following two types:

(A1) a configuration in which an integrated blur (Eall) to be applied or selected is switched between an image-based blur (Et) and a camera motion-based blur (Ec) according to the amount of object motion; and (A2) a configuration in which the weighted average of the image-based blur (Et) and the camera motion-based blur (Ec) is utilized as the integrated blur (Eall) to change a weighted average form according to the amount of object motion.

As described earlier with reference to FIG. 4, the camera motion-based blur (Ec) is for estimation of the blur form on the image on the basis of only the camera motion. In a case where an object on the captured image is in motion as described earlier with reference to FIG. 5, the blur generated on the image is set depending on the object motion.

Thus, in the case of much motion of the object on the captured image, when the camera motion-based blur (Ec) is directly applied, blur estimation is erroneously performed.

The above-described (A1), (A2) are two types of methods for solving such a problem.

Note that the amount of object motion is, for example, determined by the following input environment information:

(a) map information: map information stored in advance in a storage unit or map information input via a network determines that much object motion is present in an area with many vehicles/pedestrians, such as an urban area, and that little object motion is present in a mountain area or the like;

(b) time information: time information acquired in the image processing device or an external device or via a network determines the amount of object motion according to a period of time, and for example, determines that much object motion is present in the daytime and that little object motion is present at night;

(c) traffic information: traffic information is input via a network and it is determined as much object motion in a situation where a road is crowded and as little object motion in a situation where the road is not crowded; and (d) a position (block) on the image: the amount of object motion is defined in advance for each unit region (each unit block) on the image, and for example, it is determined as much object motion for the blocks in the horizontal direction and as little object motion for the blocks in an upper-to-lower direction.

The image processing device with the configuration A receives, for example, the above-described environment information (a) to (d), thereby executing the integrated blur (Eall) estimation processing.

In the above-described configuration (A1), the above-described environment information (a) to (d) is, for example, input to determine the amount of object motion. In a case where it is determined that the object motion is equal to or greater than a given threshold, the image-based blur (Et) is applied as the integrated blur (Eall). In a case where the object motion is less than the threshold, the camera motion-based blur (Ec) is selected.

Moreover, in the above-described configuration (A2), the above-described environment information (a) to (d) is, for example, input to determine the amount of object motion. The form of the weighted average of the image-based blur (Et) and the camera motion-based blur (Ec) is changed according to the determined amount of object motion, and a weighted average result is taken as the integrated blur (Eall).

Hereinafter, the configuration of the image processing device configured to execute these two types of processing will be sequentially described.

(A1) The configuration in which the integrated blur (Eall) to be applied or selected is switched between the image-based blur (Et) and the camera motion-based blur (Ec) according to the amount of object motion;

the above-described configuration (A1) will be first described with reference to FIG. 9.

Figure 9:
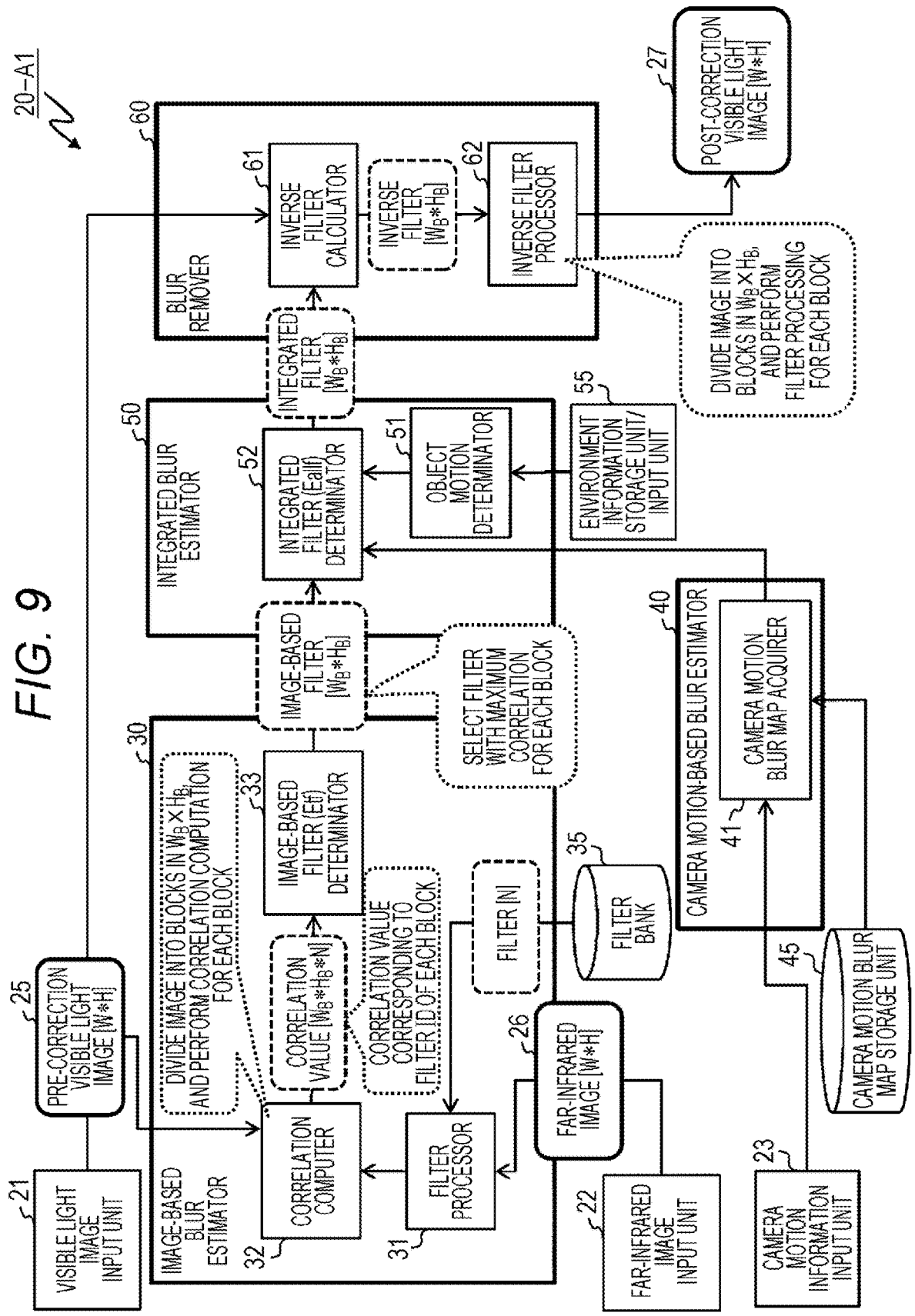
FIG. 9 illustrates a diagram for describing configuration and processing examples of an image processing device of a first embodiment of the present disclosure.

FIG. 9 is a diagram for describing the configuration and processing of the image processing device corresponding to the configuration A1.

The image processing device A1, 20-A1 illustrated in FIG. 9 has a visible light image input unit 21, a far-infrared image input unit 22, a camera motion information input unit 23, an image-based blur estimator 30, a camera motion-based blur estimator 40, an integrated blur estimator 50, a blur remover 60, a filter bank 35, a camera motion blur map storage unit 45, and an environment information storage unit/input unit 55.

Further, the image-based blur estimator 30 has a filter processor 31, a correlation computer 32, and an image-based filter (Etf) determinator 33.

The camera motion-based blur estimator 40 has a camera motion blur map acquirer 41.

The integrated blur estimator 50 has an object motion determinator 51 and an integrated filter (Eallf) determinator 52.

Moreover, the blur remover 60 has an inverse filter calculator 61 and an inverse filter processor 62.

The visible light image input unit 21 inputs a pre-correction visible light image 25 to the image-based blur estimator 30 and the blur remover 60.

Moreover, the far-infrared image input unit 22 inputs a far-infrared image 26 to the image-based blur estimator 30.

Further, the camera motion information input unit 23 inputs the camera motion information acquired by a motion sensor such as an IMU, for example, to the camera motion-based blur estimator 40.

The pre-correction visible light image 25 and the far-infrared image 26 input from the visible light image input unit 21 and the far-infrared image input unit 22 are images captured by simultaneous photographing of the same object.

These images are, for example, images captured in the dark, and the pre-correction visible light image 25 input from the visible light image input unit 21 is blurred (defocused) due to long exposure.

On the other hand, the far-infrared image 26 input from the far-infrared image input unit 22 is an image exposed for a short period of time, and is an image with little blur (defocusing).

Note that any of the pre-correction visible light image 25 and the far-infrared image 26 is an image with W×H pixels, i.e., W pixels in a crosswise direction and H pixels in a lengthwise direction. In the figure, the pre-correction visible light image 25 and the far-infrared image 26 are illustrated as a pre-correction visible light image [W*H] 25 and a far-infrared image [W*H] 26.

Moreover, [$W_B$*$H_B$] illustrated in the figure indicates a single block region as a divided image region.

The number of blocks per image frame is N.

Next, the processing executed by the image-based blur estimator 30 will be described.

The filter processor 31 of the image-based blur estimator 30 sequentially applies, to the far-infrared image 26, various filters (blur (defocusing) generation filters) stored in the filter bank 35. That is, various forms of blur are intentionally generated on the far-infrared image 26.

In the filter bank 35, many blur generation filters for different blur (defocusing) sizes and directions are stored. That is, many filters corresponding to various PSFs are stored.

A far-infrared image intentionally blurred by application of the filters to the far-infrared image 26 by the filter processor 31 of the image-based blur estimator 30 is output to the correlation computer 32.

The correlation computer 32 calculates a correlation between the far-infrared image intentionally blurred by filter application and the pre-correction visible light image 25.

Note that the filter application processing and the correlation calculation processing executed by the filter processor 31 and the correlation computer 32 are executed for each corresponding unit block of the N block regions of the pre-correction visible light image 25 and the N block regions of the far-infrared image 26.

The filter processor 31 sequentially applies, for each of the N blocks of the far-infrared image 26, various filters (blur (defocusing) generation filters) stored in the filter bank 35.

For each of the N blocks of the far-infrared image 26, the correlation computer 32 calculates the correlation between a result obtained by sequential application of various filters (blur (defocusing) generation filters) stored in the filter bank 35 and the pre-correction visible light image 25, and outputs the correlation value corresponding to each filter for each of the N blocks to the image-based filter (Etf) determinator 33.

For each block, the image-based filter (Etf) determinator 33 selects, from the input data from the correlation computer 32, i.e., the correlation values corresponding to each filter for each of the N blocks, a filter corresponding to a block with the highest correlation.

The N filters selected for each of the N blocks by the image-based filter (Etf) determinator 33 are input to the integrated filter (Eallf) determinator 52 of the integrated blur estimator 50.

The integrated filter (Eallf) determinator 52 of the integrated blur estimator 50 receives the image-based filter (Etf) corresponding to the block with the highest correlation from the image-based filter (Etf) determinator 33, and further receives a camera motion blur map corresponding to the camera motion from the camera motion blur map acquirer 41 of the camera motion-based blur estimator 40.

The camera motion blur map acquirer 41 of the camera motion-based blur estimator 40 acquires, on the basis of the camera motion information input from the camera motion information input unit 23, a single camera motion blur map from blur maps stored corresponding to various types of camera motion in the camera motion blur map storage unit 45, and inputs such a camera motion blur map to the integrated filter (Eallf) determinator 52 of the integrated blur estimator 50.

Examples of the blur maps stored corresponding to various types of camera motion in the camera motion blur map storage unit 45 are illustrated in FIG. 10.

FIG. 10 illustrates diagrams of settings of a vector indicating the direction and size of the blur generated on the captured image according to the camera motion similar to that described earlier with reference to FIG. 4.

Each image is divided into blocks with a predetermined size. Note that although illustrated in a simple manner in the figure, the vector indicating the direction and size of the blur is set for each unit block.

Data with the above-described settings of the vector indicating the direction and size of the blur according to the camera motion for each unit block as the divided image region will be referred to as a camera motion blur map.

Note that the block is the same block as the block for which the correlation calculation processing in the correlation computer 32 of the image-based blur estimator 30 is executed, and is also a unit of integrated filter (Eall) generated in the integrated blur estimator 50.

FIG. 10 illustrates the examples of the blur maps corresponding to the following four types of camera motion:

(1) a camera motion blur map in the case of moving a camera straight forward;

(2) a camera motion blur map in the case of moving the camera straight backward;

(3) a camera motion blur map in the case of rotating the camera to the right; and (4) a camera motion blur map in the case of rotating the camera upward.

Note that in addition to above, blur maps corresponding to various types of camera motion are also stored in the camera motion blur map storage unit 45.

The camera motion blur map acquirer 41 of the camera motion-based blur estimator 40 selects, on the basis of the camera motion information input from the camera motion information input unit 23, a blur map corresponding to a camera motion setting coincident with or closest to the detected camera motion, and inputs the selected blur map to the integrated filter (Eallf) determinator 52 of the integrated blur estimator 50.

The integrated filter (Eallf) determinator 52 of the integrated blur estimator 50 determines, on the basis of object motion amount determination information input from the object motion determinator 51, i.e., determination information regarding the amount of object motion, whether the integrated filter (Eallf) is set to the image-based filter (Etf) or the camera motion-based filter (Ecf) based on the camera motion-based blur (Ec).

Note that such determination processing is executed for each unit block.

The object motion determinator 51 acquires the environment information from the environment information storage unit/input unit 55, and for each block of the image, determines whether the block includes much object motion or little object motion.

As described earlier, the environment information includes, for example, the map information, the time information, the traffic information, and the information regarding the block position on the image.

For each unit block, the object motion determinator 51 executes a pre-defined algorithm to determine, on the basis of various types of environment information described above, whether the block includes much object motion or little object motion, and outputs such block-by-block determination information to the integrated filter (Eallf) determinator 52.

The integrated filter (Eallf) determinator 52 performs the following processing on the basis of the block-by-block determination information input from the object motion determinator 51, i.e., the determination information regarding whether the block includes much object motion or little object motion.

For the block with much object motion, the image-based filter (Etf) input from the image-based blur estimator 30 is set as the integrated filter (Eallf).

On the other hand, for the block with little object motion, the camera motion-based filter (Ecf) determined on the basis of the block-by-block camera motion-based blur (Ec) included in the camera motion blur map input from the camera motion-based blur estimator 40 is set as the integrated filter (Eallf).

As described above, the integrated filter (Eallf) determinator 52 performs, for each unit block, the filter selection processing of taking any of the image-based filter (Etf) and the camera motion-based filter (Ecf) as the integrated filter (Eallf).

The block-by-block integrated filter (Eallf) determined by the integrated filter (Eallf) determinator 52 is input to the inverse filter calculator 61 of the blur remover 60.

The inverse filter calculator 61 of the blur remover 60 receives the block-by-block integrated filter (Eallf) determined by the integrated filter (Eallf) determinator 52, thereby generating an inverse filter with characteristics opposite to those of each block-by-block integrated filter (Eallf).

That is, the inverse filter calculator 61 generates a deconvolution filter, and outputs the deconvolution filter to the inverse filter processor 62.

The deconvolution filter is a filter with characteristics opposite to those of each block-by-block integrated filter (Eallf).

The inverse filter processor 62 of the blur remover 60 receives the inverse filter corresponding to each block from the inverse filter calculator 61, and applies the input inverse filter to a corresponding block of the pre-correction visible light image 25 input from the visible light image input unit 21.

That is, the inverse filter processor 62 applies, to the corresponding block of the pre-correction visible light image 25, the inverse filter with the characteristics opposite to those of any of the image-based filter (Etf) or the camera motion-based filter (Ecf) as the block-by-block filter determined by the integrated filter (Eallf) determinator 52 of the integrated blur estimator 50.

When the inverse filter application processing is completed for all of the N blocks of the pre-correction visible light image 25 input from the visible light image input unit 21, the resultant image is output as a post-correction visible light image 27.

By these types of processing, the post-correction visible light image 27 whose blur (defocusing) has been removed or reduced is generated from the pre-correction visible light image 25, and is output.

(A2) The configuration in which the weighted average of the image-based blur (Et) and the camera motion-based blur (Ec) is utilized as the integrated blur (Eall) to change the weighted average form according to the amount of object motion:

the above-described configuration (A2) will be described next with reference to FIG. 11.

Figure 11:
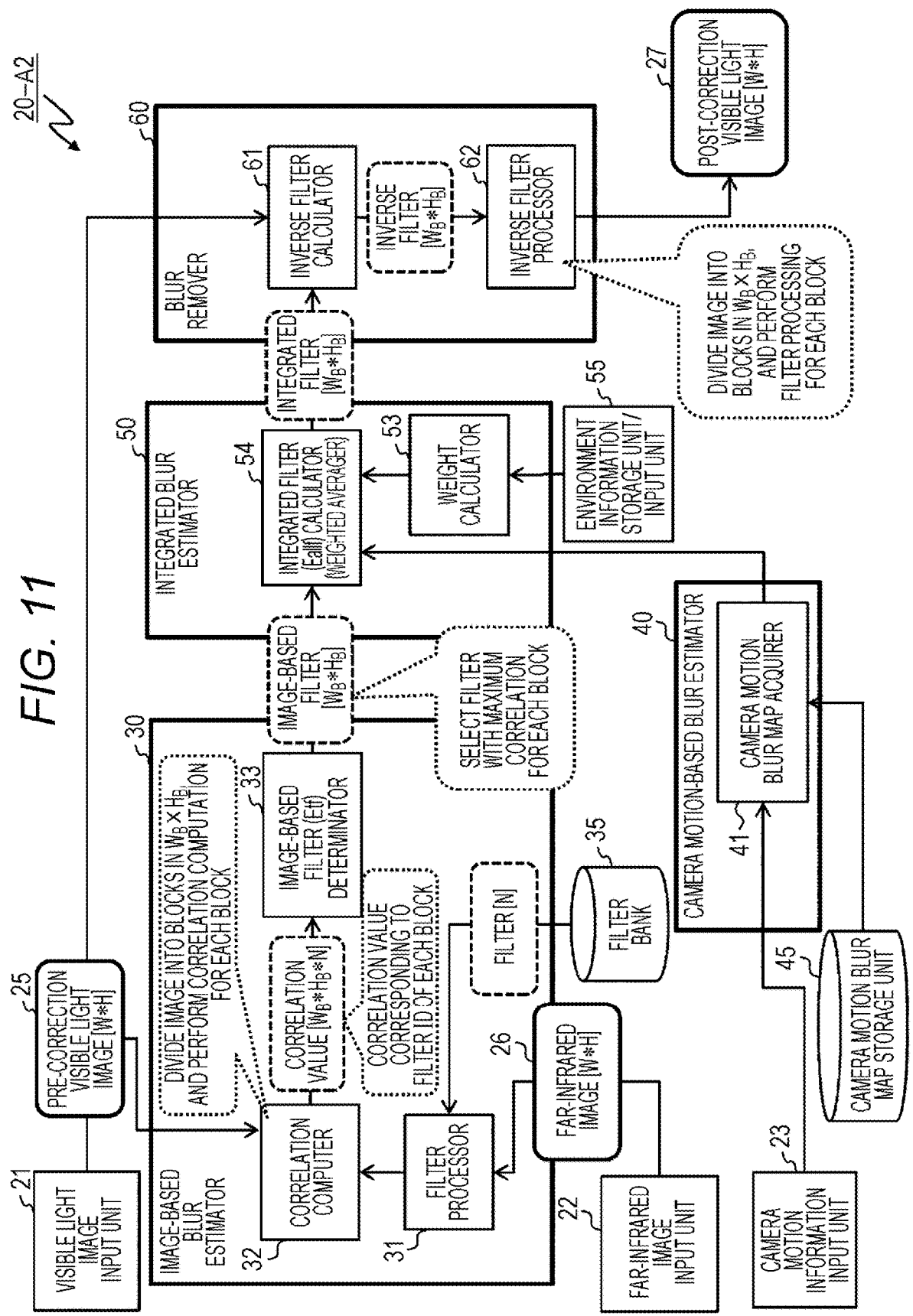
FIG. 11 illustrates a diagram for describing configuration and processing examples of the image processing device of the first embodiment of the present disclosure.

FIG. 11 is a diagram for describing the configuration and processing of the image processing device corresponding to the configuration A2.

The image processing device A2, 20-A2 illustrated in FIG. 11 has the visible light image input unit 21, the far-infrared image input unit 22, the camera motion information input unit 23, the image-based blur estimator 30, the camera motion-based blur estimator 40, the integrated blur estimator 50, the blur remover 60, the filter bank 35, the camera motion blur map storage unit 45, and the environment information storage unit/input unit 55.

Further, the image-based blur estimator 30 has the filter processor 31, the correlation computer 32, and the image-based filter (Etf) determinator 33.

The camera motion-based estimator 40 has the camera motion blur map acquirer 41.

The integrated blur estimator 50 has a weight calculator 53 and an integrated filter (Eallf) calculator 54.

Moreover, the blur remover 60 has the inverse filter calculator 61 and the inverse filter processor 62.

A difference from the image processing device A1, 20-A1 corresponding to the configuration A1 described earlier with reference to FIG. 9 is only the configuration of the integrated blur estimator 50, i.e., a point that the integrated blur estimator 50 has the weight calculator 53 and the integrated filter (Eallf) calculator 54.

Other configurations are similar to those of the image processing device A1, 20-A1 corresponding to the configuration A1 described earlier with reference to FIG. 9, and similar processing is also applied.

Hereinafter, the processing of the weight calculator 53 and the integrated filter (Eallf) calculator 54 of the integrated blur estimator 50 in the image processing device A2, 20-A2 illustrated in FIG. 11 will be described.

The integrated filter (Eallf) calculator 54 of the integrated blur estimator 50 receives the image-based filter (Etf) corresponding to the block with the highest correlation from the image-based filter (Etf) determinator 33, and further receives the camera motion blur map corresponding to the camera motion from the camera motion blur map acquirer 41 of the camera motion-based blur estimator 40.

The camera motion blur map acquirer 41 of the camera motion-based blur estimator 40 acquires, on the basis of the camera motion information input from the camera motion information input unit 23, a single camera motion blur map from the blur maps stored corresponding to various types of camera motion in the camera motion blur map storage unit 45, and inputs such a camera motion blur map to the integrated filter (Eallf) calculator 54 of the integrated blur estimator 50.

The integrated filter (Eallf) calculator 54 calculates, from the block-by-block camera motion blur (Ec) acquired from the camera motion blur map, the camera motion filter (Ecf) as a filter corresponding to such a blur, i.e., a filter for generating such a blur.

Further, the integrated filter (Eallf) calculator 54 uses weight information input from the weight calculator 53 to perform weighted averaging for the image-based filter (Etf) and the camera motion-based filter (Ecf), thereby calculating the integrated filter (Eallf).

Specifically, the integrated filter (Eallf) is, using, e.g., weight coefficients α, β, calculated according to the following calculation expression:

$$Eallf=\alpha(Etf)+\beta(Ecf)$$

Note that the above-described expression corresponds to the expression for calculating a filter coefficient of each filter.

Moreover, the processing of calculating the integrated filter (Eallf) is executed for each unit block.

The weight coefficients α, β are values of 0 to 1, and are input from the weight calculator 53.

The weight calculator 53 acquires the environment information from the environment information storage unit/input unit 55, and calculates the weight coefficients α, β for each block of the image.

As described earlier, the environment information includes, for example, the map information, the time information, the traffic information, and the information regarding the block position on the image.

The weight calculator 53 executes a pre-defined algorithm to calculate, on the basis of various types of environment information as described above, the weight coefficients α, β for each unit block.

Specifically, for the block with much object motion, the weight coefficient α is set to a greater value. That is, the weight coefficient is set so that the integrated filter (Eallf) with a setting of a high contribution rate of the image-based filter (Etf) can be calculated.

On the other hand, for the block with little object motion, the weight coefficient β is set to a greater value. That is, the weight coefficient is set so that the integrated filter (Eallf) with a setting of a high contribution rate of the camera motion-based filter (Ecf) can be calculated.

The integrated filter (Eallf) calculator 54 uses the block-by-block weight information input from the weight calculator 53, i.e., each of the above-described block-by-block weight coefficients α, β, to perform weighted averaging for the image-based filter (Etf) and the camera motion-based filter (Ecf), thereby calculating the integrated filter (Eallf).

As a result, for the block with much object motion, the integrated filter (Eallf) with a high contribution rate of the image-based filter (Etf) input from the image-based blur estimator 30 is calculated.

On the other hand, for the block with little object motion, the integrated filter (Eallf) with a high contribution rate of the camera motion-based filter (Ecf) determined on the basis of the block-by-block camera motion-based blur (Ec) included in the camera motion blur map input from the camera motion-based blur estimator 40 is calculated.

As described above, the integrated filter (Eallf) calculator 54 calculates, for each unit block, the weighted average of the image-based filter (Etf) and the camera motion-based filter (Ecf), thereby performing the processing of calculating the integrated filter (Eallf).

The block-by-block integrated filter (Eallf) calculated by the integrated filter (Eallf) calculator 54 is input to the inverse filter calculator 61 of the blur remover 60.

The inverse filter calculator 61 of the blur remover 60 receives the block-by-block integrated filter (Eallf) determined by the integrated filter (Eallf) determinator 52, thereby generating the inverse filter with the characteristics opposite to those of each block-by-block integrated filter (Eallf).

The inverse filter processor 62 of the blur remover 60 receives the inverse filter corresponding to each block from the inverse filter calculator 61, and applies the input inverse filter to the corresponding block of the pre-correction visible light image 25 input from the visible light image input unit 21.

By these types of processing, the post-correction visible light image 27 whose blur (defocusing) has been removed or reduced is generated from the pre-correction visible light image 25, and is output.

Next, a sequence of the processing executed by the image processing device corresponding to the configuration A described with reference to FIGS. 9 and 11 will be described with reference to flowcharts illustrated in FIG. 12 and subsequent figures.

Figure 12:
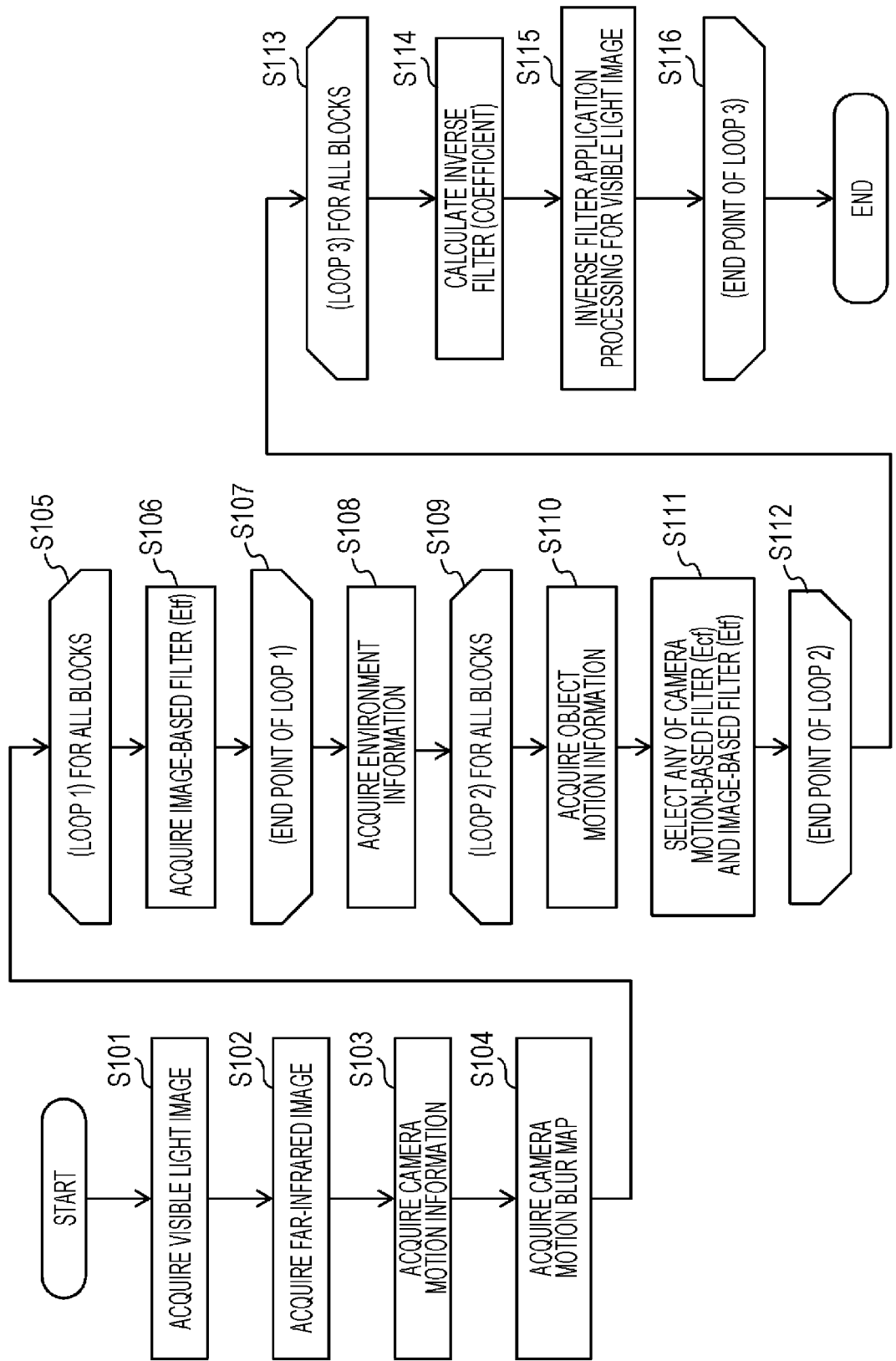
FIG. 12 illustrates a flowchart for describing a sequence of processing executed by the image processing device of the first embodiment of the present disclosure.

Note that the processing according to the flowcharts illustrated in FIG. 12 and subsequent figures is, for example, processing executable according to a program stored in the storage unit of the image processing device, and can be executed under the control of a controller (the data processor) including a CPU with a program execution function and the like.

First, a sequence of the processing executed by the image processing device-A1 configured such that (A1) the integrated blur (Eall) to be applied or selected is switched between the image-based blur (Et) and the camera motion-based blur (Ec) according to the amount of object motion as described with reference to FIG. 9 will be described with reference to the flowchart of FIG. 12.

Hereinafter, processing of each step of a flow illustrated in FIG. 12 will be sequentially described.

(Step S101)

First, at a step S101, the visible light image as a correction target is acquired.

This processing is performed by the visible light image input unit 21 in the image processing device illustrated in FIG. 9. Specifically, this processing is the processing of acquiring an image captured by a visible light image camera, for example.

(Step S102)

Next, at a step S102, the far-infrared image to be utilized as a reference image is acquired.

This processing is executed by the far-infrared image input unit 22 in the image processing device illustrated in FIG. 9. Specifically, this processing is the processing of acquiring an image captured by a far-infrared image camera, for example.

Note that the visible light image and the far-infrared image acquired at the step S101 and the step S102 are images captured by simultaneous photographing of the same object.

These images are, for example, images captured in the dark, and the visible light image is blurred (defocused) due to long exposure. On the other hand, the far-infrared image is an image exposed for a short period of time, and is an image with little blur (defocusing).

(Step S103)

Next, at a step S103, the camera motion information is acquired.

This processing is performed by the camera motion information input unit 23 in the image processing device illustrated in FIG. 9. Specifically, the camera motion information is acquired and input by the sensor such as an IMU, for example.

(Step S104)

Next, at a step S104, the camera motion blur map is acquired on the basis of the camera motion information input at the step S103.

This processing is processing executed by the camera motion blur map acquirer 41 of the camera motion-based blur estimator 40 in the image processing device illustrated in FIG. 9.

The camera motion blur map acquirer 41 of the camera motion-based blur estimator 40 acquires, on the basis of the camera motion information input from the camera motion information input unit 23, a single camera motion blur map from the blur maps stored corresponding to various types of camera motion in the camera motion blur map storage unit 45, and inputs the camera motion blur map to the integrated filter (Eallf) determinator 52 of the integrated blur estimator 50.

(Step S105)

Processing from a subsequent step S105 to a step S107 is loop processing (loop 1) sequentially and repeatedly executed for all blocks as the divided regions set for the visible light image and the far-infrared image.

Note that the number of blocks is N.

(Step S106)

At the step S106, the image-based filter (Etf) is acquired for each unit block.

This processing is processing executed by the image-based blur estimator 30 in the image processing device illustrated in FIG. 9.

Details of the processing of the step S106 will be described with reference to a flow illustrated in FIG. 13.

For this processing of acquiring the image-based filter (Etf) for each unit block at the step S106, the visible light image acquired at the step S101 and the far-infrared image acquired at the step S102 are utilized. Thus, FIG. 13 also illustrates the step S101 and the step S102.

Figure 13:
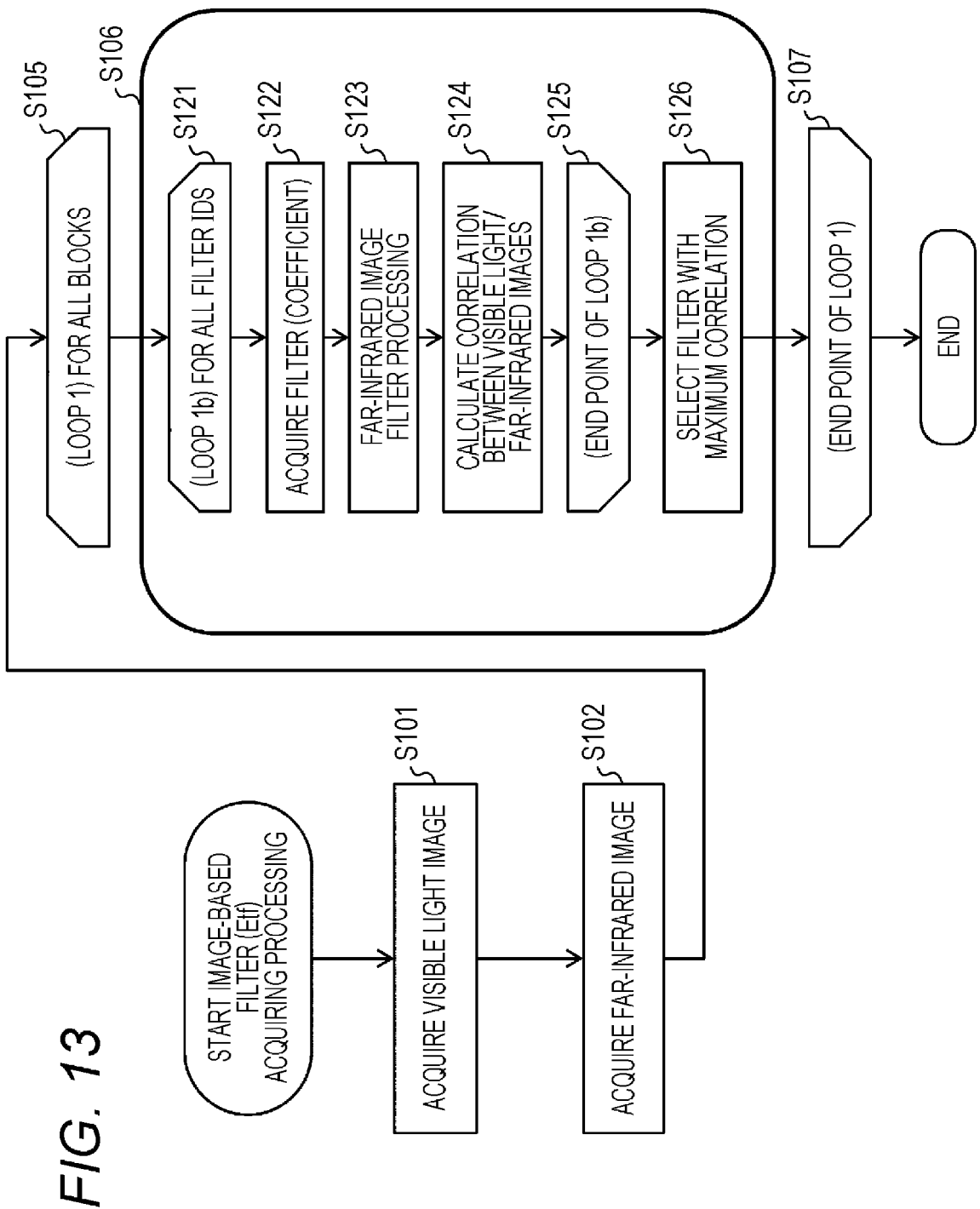
FIG. 13 illustrates a flowchart for describing a sequence of the processing executed by the image processing device of the first embodiment of the present disclosure.

The detailed processing of the step S106 is processing of steps S121 to S126 illustrated in FIG. 13.

Hereinafter, this processing will be sequentially described.

(Step S121)

The processing from the step S121 to the step S125 is loop processing (loop 1b) sequentially and repeatedly executed for all filter IDs corresponding to all filters stored in the filter bank 35.

(Step S122)

At the step S122, the filter (coefficient) is acquired.

The processing of the steps S122 to S123 is processing executed by the filter processor 31 of the image-based blur estimator 30 illustrated in FIG. 9. The filter processor 31 sequentially acquires, from the filter bank 35, the filter (filter (defocusing) generation filter) to be applied to each block of the far-infrared image. Note that data sequentially acquired from the filter bank 35 may be any of the filter itself or the filter coefficient as data forming the filter.

(Step S123)

Next, at the step S123, the filter acquired at the step S122 is applied to a single block of the far-infrared image, i.e., a block currently selected as a processing target.

This processing is filter processing for intentionally blurring the far-infrared image.

(Step S124)

Next, at the step S124, the correlation value between the block of the far-infrared image as a filter application result at the step S123 and a corresponding block of the visible light image.

This processing is processing executed by the correlation computer 32 of the image-based blur estimator 30 illustrated in FIG. 9.

The correlation computer 32 calculates the correlation between the far-infrared image intentionally blurred by filter application and the visible light image.

(Step S125)

The step S125 is an end point of the loop 1b of the steps S121 to S125.

That is, the processing of the steps S122 to S124 is sequentially and repeatedly executed for all filter IDs corresponding to all filters stored in the filter bank 35.

(Step S126)

When the processing of the loop 1b of the steps S121 to S125 for a single block is completed, the processing proceeds to the step S126.

That is, for a single block, when the processing of calculating the correlation values corresponding to all filters stored in the filter bank 35 ends, the processing proceeds to the step S126.

The processing of the step S126 is processing executed by the image-based filter (Etf) determinator 33 of the image-based blur estimator 30 illustrated in FIG. 9.

At the step S126, the image-based filter (Etf) determinator 33 selects, for the block for which the processing of the loop 1b of the steps S121 to S125 has completed, a filter ID with the highest correlation value among the correlation values corresponding to all filters stored in the filter bank 35.

The processing of the step S106 of the flow illustrated in FIG. 12 includes the processing of these steps S121 to S126.

Referring back to FIG. 12, processing after the processing of the step S106 will be described.

(Step S107)

The step S107 is an end point of the loop 1 of the steps S105 to S107.

That is, the processing of the step S106 is sequentially and repeatedly executed for all blocks as the divided regions set for the visible light image and the far-infrared image.

When this loop processing (loop 1) is completed, the image-based filter (Etf) with the highest correlation value is determined for all of the N blocks.

(Step S108)

Next, at a step S108, the environment information upon capturing of the image is acquired.

This processing is executed utilizing the environment information storage unit/input unit 55 of the image processing device illustrated in FIG. 9.

As described earlier, the environment information includes, for example, the map information, the time information, the traffic information, and the information regarding the block position on the image.

(Step S109)

Processing from a subsequent step S109 to a step S112 is loop processing (loop 2) sequentially and repeatedly executed for all blocks as the divided regions set for the visible light image and the far-infrared image.

Note that the number of blocks is N.

(Step S110)

The processing of the steps S110 to S111 is processing executed by the integrated blur estimator 50 illustrated in FIG. 9.

First, at the step S110, the object motion determinator 51 of the integrated blur estimator 50 executes the pre-defined algorithm to determine whether the block includes much object motion or little object motion for each unit block on the basis of various types of environment information as described above. The determination information for each unit block is output to the integrated filter (Eallf) determinator 52.

(Step S111)

Next, at the step S111, the integrated filter (Eallf) determinator 52 performs, for each unit block, the filter selection processing of taking any of the image-based filter (Etf) and the camera motion-based filter (Ecf) as the integrated filter (Eallf).

Specifically, for the block with much object motion, the image-based filter (Etf) input from the image-based blur estimator 30 is set as the integrated filter (Eallf).

On the other hand, for the block with little object motion, the camera motion-based filter (Ecf) determined on the basis of the block-by-block camera motion-based blur (Ec) included in the camera motion blur map input from the camera motion-based blur estimator 40 is set as the integrated filter (Eallf).

(Step S112)

The step S112 is an end point of the loop 2 of the steps S109 to S112.

That is, the processing of the steps S110 to S111 is sequentially and repeatedly executed for all blocks as the divided regions set for the visible light image and the far-infrared image.

When this loop processing (loop 2) is completed, the integrated filter (Eallf) is determined for all of the N blocks.

(Step S113)

Processing from a subsequent step S113 to a step S116 is loop processing (loop 3) sequentially and repeatedly executed for all blocks as the divided regions set for the visible light image and the far-infrared image.

Note that the number of blocks is N.

(Step S114)

The processing of the steps S114 to S115 is processing executed by the blur remover 60 illustrated in FIG. 9.

First, at the step S114, the inverse filter calculator 61 of the blur remover 60 receives the block-by-block integrated filter (Eallf) determined by the integrated filter (Eallf) determinator 52, thereby calculating the inverse filter with the characteristics opposite to those of each block-by-block integrated filter (Eallf).

(Step S115)

Next, at the step S115, the inverse filter processor 62 of the blur remover 60 applies the inverse filter calculated at the step S114 to the processing target block of the visible light image.

(Step S116)

The step S116 is an end point of the loop 3 of the steps S113 to S116.

That is, the processing of the steps S114 to S115 is sequentially and repeatedly executed for all blocks as the divided regions set for the visible light image as a correction target image.

When the inverse filter application processing is completed for all of the N blocks of the visible light image, the resultant image is output as the post-correction visible light image.

By these types of processing, the post-correction visible light image 27 whose blur (defocusing) has been removed or reduced as illustrated in FIG. 9 is generated from the visible light image as the input image at the step S101, i.e., the pre-correction visible light image 25 illustrated in FIG. 9, and is output.

Next, a sequence of the processing executed by the image processing device-A2 configured such that (A2) the weighted average of the image-based blur (Et) and the camera motion-based blur (Ec) is utilized as the integrated blur (Eall) to change the weighted average form according to the amount of object motion as described with reference to FIG. 11 will be described with reference to a flowchart of FIG. 14.

Figure 14:
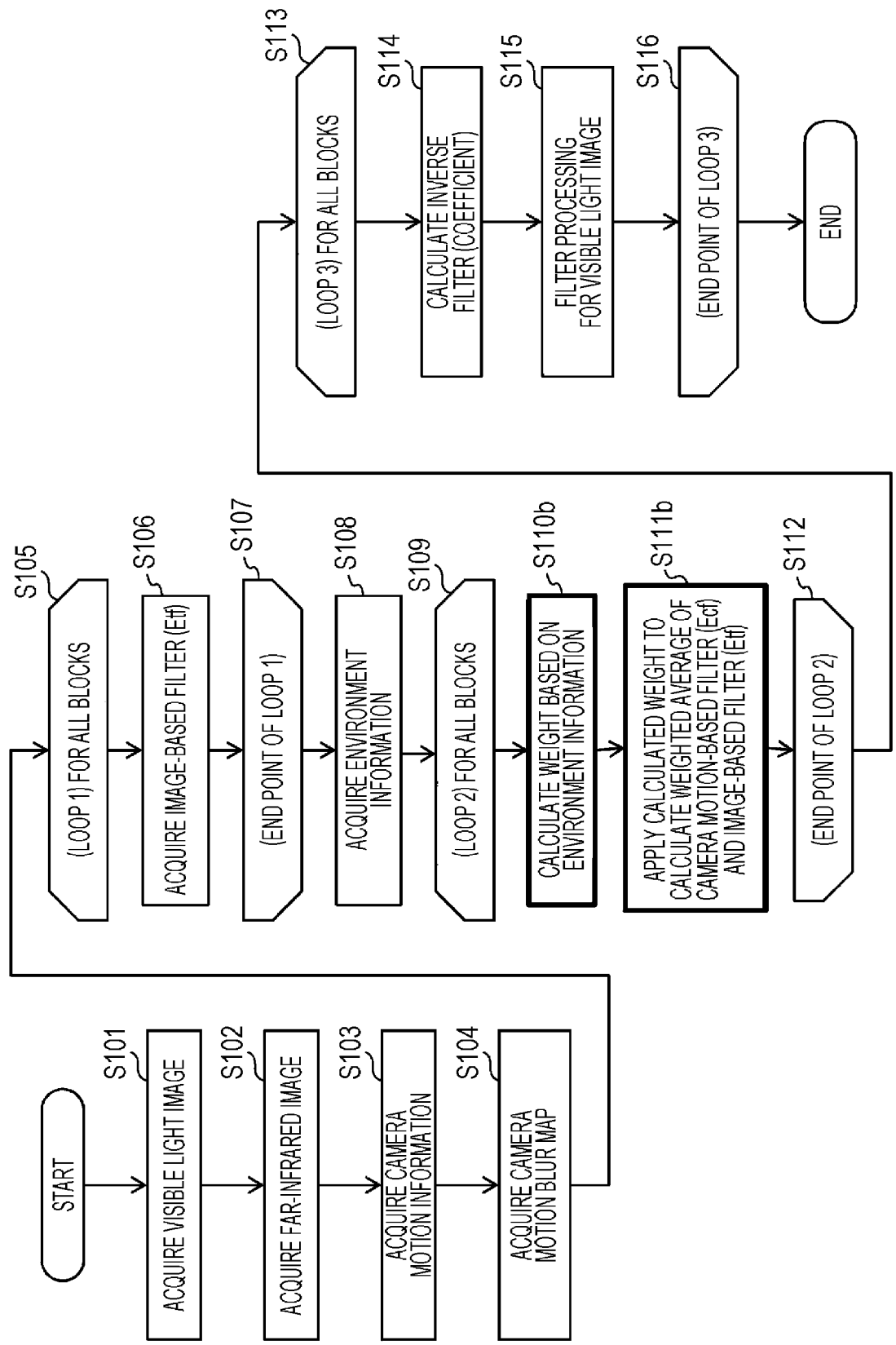
FIG. 14 illustrates a flowchart for describing a sequence of the processing executed by the image processing device of the first embodiment of the present disclosure.

Note that a difference between a flow illustrated in FIG. 14 and the flow illustrated in FIG. 12 for describing the processing corresponding to the configuration A1 is only steps S110b to S111b of the flow illustrated in FIG. 14. That is, the difference is that the step S110 of the flow illustrated in FIG. 12 is substituted with the step S110b of the flow illustrated in FIG. 14 and the step S111 of the flow illustrated in FIG. 12 is substituted with the step S111b of the flow illustrated in FIG. 14.

Other types of processing are processing similar to each type of processing of the flow illustrated in FIG. 12, and therefore, description thereof will not be repeated. Hereinafter, the processing of the above-described steps S110b to S111b will be described.

(Step S110b)

The processing from the subsequent step S109 to the step S112 is the loop processing (loop 2) sequentially and repeatedly executed for all blocks as the divided regions set for the visible light image and the far-infrared image.

Note that the number of blocks is N.

The processing of the steps S110b to S111b is processing executed by the integrated blur estimator 50 illustrated in FIG. 11.

First, at the step S110b, the weight calculator 53 of the integrated blur estimator 50 acquires the environment information from the environment information storage unit/input unit 55, and calculates the weight information for each block of the image.

As described earlier, the environment information includes, for example, the map information, the time information, the traffic information, and the information regarding the block position on the image.

For example, the expression for calculating the weighted average of the image-based filter (Etf) and the camera motion-based filter (Ecf), i.e., the expression for calculating the integrated filter (Eallf) by means of the following weight coefficients α, β, is $$Eallf = \alpha(Etf) + \beta(Ecf).$$

The weight information is each value of the weight coefficients α, β in the above-described expression.

The weight calculator 53 of the integrated blur estimator 50 executes the pre-defined algorithm to calculate the weight coefficients α, β for each unit block on the basis of various types of environment information as described above.

Specifically, for the block with much object motion, the weight coefficient α is set to a greater value.

On the other hand, for the block with little object motion, the weight coefficient β is set to a greater value.

(Step S111b)

Next, at the step S111b, the integrated filter (Eallf) calculator 54 uses the block-by-block weight information input from the weight calculator 53, i.e., the weight coefficients α, β for each unit block as described above, to perform weighted averaging for the image-based filter (Etf) and the camera motion-based filter (Ecf), thereby calculating the integrated filter (Eallf).

Specifically, for the block with much object motion, the integrated filter (Eallf) with the setting of a high contribution rate of the image-based filter (Etf) is calculated.

On the other hand, for the block with little object motion, the integrated filter (Eallf) with the setting of a high contribution rate of the camera motion-based filter (Ecf) is calculated.

At the steps S109 to S112, the processing of the steps S110b to S111b is sequentially and repeatedly executed for all blocks as the divided regions set for the visible light image and the far-infrared image.

When this loop processing (loop 2) is completed, the integrated filter (Eallf) is determined for all of the N blocks.

At the steps subsequent to the step S113, calculation of the inverse filter of the integrated filter (Eallf) and application processing of the integrated filter (Eallf) to the correction target visible light image are performed in the blur remover 60.

By these types of processing, the post-correction visible light image 27 whose blur (defocusing) has been removed or reduced as illustrated in FIG. 11 is generated from the visible light image as the input image at the step S101, i.e., the pre-correction visible light image 25 illustrated in FIG. 11, and is output.

6. (Second Embodiment) Configuration and Processing of Image Processing Device Corresponding to Configuration B Next, specific configuration and processing of an image processing device corresponding to the configuration B described with reference to FIG. 7 will be described as a second embodiment of the image processing device of the present disclosure.

As described earlier with reference to FIG. 7, the configuration B is a configuration in which image-based blur estimation using a visible light image and a far-infrared image and camera motion-based blur estimation based on camera motion information are executed in combination to execute integrated blur estimation.

Note that any of the following two types of processing is executed in the processing of generating an integrated blur (Eall) in the configuration B:

(B1) the processing of selecting a filter to be applied to the far-infrared image, i.e., a filter for generating a blur (defocusing), on the basis of a camera motion-based blur (Ec); and (B2) the processing of correcting a correlation value between a filter-applied far-infrared image and the blurred visible light image on the basis of the camera motion-based blur (Ec).

(B1) The processing of selecting the filter to be applied to the far-infrared image, i.e., the filter for generating the blur (defocusing), on the basis of the camera motion-based blur (Ec):

the configuration of the image processing device-B1 configured to execute the above-described processing will be first described with reference to FIG. 15.

Figure 15:
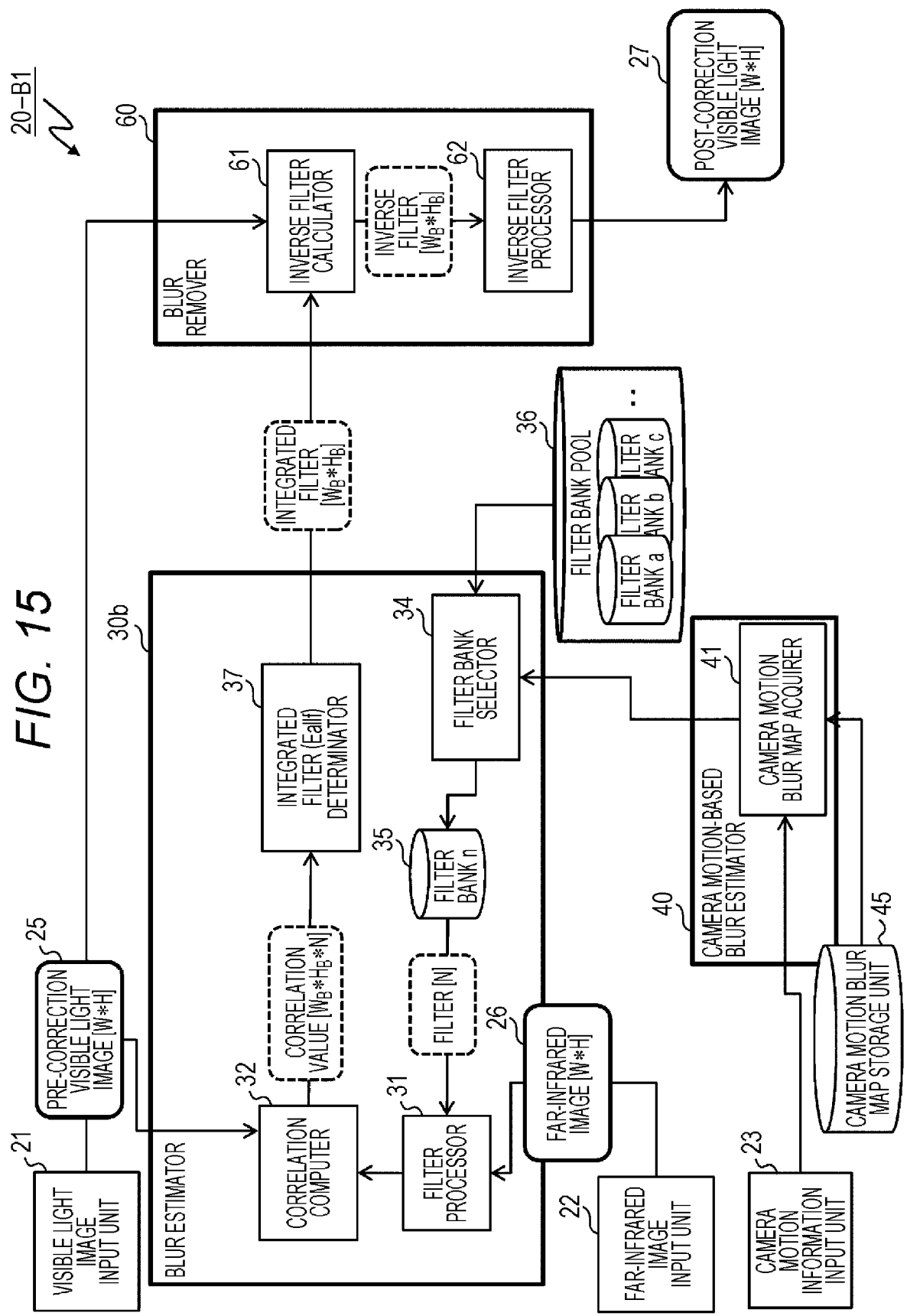
FIG. 15 illustrates a diagram for describing configuration and processing examples of an image processing device of a second embodiment of the present disclosure.

FIG. 15 is a diagram for describing the configuration and processing of the image processing device-B1.

The image processing device B1, 20-B1 illustrated in FIG. 15 has a visible light image input unit 21, a far-infrared image input unit 22, a camera motion information input unit 23, a blur estimator 30b, a camera motion-based blur estimator 40, a blur remover 60, a filter bank pool 36, and a camera motion blur map storage unit 45.

Further, the blur estimator 30b has a filter processor 31, a correlation computer 32, a filter bank selector 34, and an integrated filter (Eallf) determinator 37.

The camera motion-based blur estimator 40 has a camera motion blur map acquirer 41.

Moreover, the blur remover 60 has an inverse filter calculator 61 and an inverse filter processor 62.

The visible light image input unit 21 inputs a pre-correction visible light image 25 to the blur estimator 30b and the blur remover 60.

Moreover, the far-infrared image input unit 22 inputs a far-infrared image 26 to the blur estimator 30b.

Further, the camera motion information input unit 23 inputs camera motion information acquired by a motion sensor such as an IMU, for example, to the camera motion-based blur estimator 40.

The pre-correction visible light image 25 and the far-infrared image 26 input from the visible light image input unit 21 and the far-infrared image input unit 22 are images captured by simultaneous photographing of the same object.

These images are, for example, images captured in the dark, and the pre-correction visible light image 25 input from the visible light image input unit 21 is blurred (defocused) due to long exposure.

On the other hand, the far-infrared image 26 input from the far-infrared image input unit 22 is an image exposed for a short period of time, and is an image with little blur (defocusing).

Note that any of the pre-correction visible light image 25 and the far-infrared image 26 is an image with W×H pixels, i.e., W pixels in a crosswise direction and H pixels in a lengthwise direction. In the figure, the pre-correction visible light image 25 and the far-infrared image 26 are illustrated as a pre-correction visible light image [W*H] 25 and a far-infrared image [W*H] 26.

Moreover, [$W_B*H_B$] illustrated in the figure indicates a single block region as a divided image region.

The number of blocks per image frame is N.

Next, the processing executed by the blur estimator 30b will be described.

The filter processor 31 of the blur estimator 30b sequentially applies, to the far-infrared image 26, various filters (blur (defocusing) generation filters) stored in the filter bank 35 selected from the filter bank pool 36 by the filter bank selector 34. That is, various forms of blur are intentionally generated on the far-infrared image 26.

In the filter bank 35, multiple different blur (defocusing) generation filters for sizes and directions within specific ranges are stored. That is, many filters corresponding to various PSFs are stored.

The filter bank 35 is one filter bank selected from the filter bank pool 36 by the filter bank selector 34.

The filter bank selector 34 receives a camera motion blur map corresponding to camera motion from the camera motion blur map acquirer 41 of the camera motion-based blur estimator 40, and selects, from the filter bank pool 36, a filter bank storing filters corresponding to blurs with directions and sizes similar to those of a blur set to the input camera motion blur map.

Note that such filter bank selection processing is executed for each unit block as the divided image region.

Examples of the filter banks stored in the filter bank pool 36 and an example of the processing of selecting the filter bank based on the camera motion blur map will be described with reference to FIG. 16.

FIG. 16(1) illustrates the examples of the filter banks stored in the filter bank pool 36.

The filter banks stored in the filter bank pool 36 include, for example, the following filter banks as illustrated in FIG. 16(1):

(a1) a filter bank corresponding to a horizontal blur;
(a2) a filter bank corresponding to a long horizontal blur;
(b1) a filter bank corresponding to a vertical blur; and
(c) a filter bank corresponding to a blur in a diagonal direction toward the upper right side.

As described above, many filter banks storing multiple filters corresponding to multiple blurs with similar settings, i.e., multiple filters with similar coefficient settings for generating similar blurs, are stored in the filter bank pool 36.

The filter bank selector 34 receives the camera motion blur map corresponding to the camera motion from the camera motion blur map acquirer 41 of the camera motion-based blur estimator 40, and selects, from the filter bank pool 36, the filter bank storing the filters corresponding to the blurs with the directions and sizes similar to those of the blur set to the input camera motion blur map.

FIG. 16(2) is the example of the camera motion blur map corresponding to the camera motion input from the camera motion blur map acquirer 41 of the camera motion-based blur estimator 40 to the filter bank selector 34.

This camera motion blur map is a blur map acquired on the basis of determination that a camera is moving straight forward.

The filter bank selector 34 receives the camera motion blur map, and for each block of the input camera motion blur map, selects the filter bank from the filter bank pool 36, the filter bank storing the filters corresponding to the blurs with the directions and the sizes similar to those of the blur set to the block.

In the examples illustrated in FIG. 16, the filter banks each selected for four blocks indicated by thick dashed frames are illustrated.

The center block at a left end portion is a block for which a camera motion-based blur (Ec) elongated in the crosswise direction is set.

The filter bank selector 34 selects, as the filter bank for this block, (a2) the filter bank corresponding to the long horizontal blur, such a filter bank storing the filters for generating blurs similar to such a horizontally-elongated blur.

The third center block from the left is a block for which a camera motion-based blur (Ec) in the crosswise direction is set.

The filter bank selector 34 selects, as the filter bank for this block, (a1) the filter bank corresponding to the horizontal blur, such a filter bank storing the filters for generating blurs similar to such a horizontal blur.

The block at the fifth position from the left and the second position from the top is a block for which a camera motion-based blur (Ec) in the lengthwise direction is set.

The filter bank selector 34 selects, as the filter bank for this block, (b1) the filter bank corresponding to the vertical blur, such a filter bank storing the filters for generating blurs similar to such a vertical blur.

The block at the fourth position from the right and the third position from the top is a block for which a camera motion-based blur (Ec) in the diagonal direction toward the upper right side is set.

The filter bank selector 34 selects, as the filter bank for this block, (c) the filter bank corresponding to the blur in the diagonal direction toward the upper right side, such a filter bank storing the filters for generating blurs similar to such a blur in the diagonal direction toward the upper right side.

As described above, the filter bank selector 34 receives the camera motion blur map corresponding to the camera motion from the camera motion blur map acquirer 41, and for each block of the input camera motion blur map, selects the filter bank from the filter bank pool 36, the filter bank storing the filters corresponding to the blurs with the directions and sizes similar to those of the blur set to the block.

The filter bank n, 35 illustrated in FIG. 15 is a filter bank selected for a certain block.

The selected filter bank 35 is input to the filter processor 31.

The filter processor 31 of the blur estimator 30b sequentially applies, to each block of the far-infrared image 26, the filters stored in the filter bank 35 selected by the filter bank selector 34.

The far-infrared image intentionally blurred by filter application is output to the correlation computer 32.

The correlation computer 32 calculates the correlation between the far-infrared image intentionally blurred by filter application and the pre-correction visible light image 25.

Note that the filter application processing and the correlation calculation processing executed by the filter processor 31 and the correlation computer 32 are executed for a corresponding unit block of the N block regions of the pre-correction visible light image 25 and the N block regions of the far-infrared image 26.

The filter processor 31 sequentially applies, for each of the N blocks of the far-infrared image 26, various filters (blur (defocusing) generation filters) stored in the filter bank 35.

For each of the N blocks of the far-infrared image 26, the correlation computer 32 calculates the correlation between a result obtained by sequential application of various filters (blur (defocusing) generation filters) stored in the filter bank 35 and the pre-correction visible light image 25, and outputs the correlation value corresponding to each filter for each of the N blocks to the integrated filter (Eallf) determinator 37.

For each block, the integrated filter (Eallf) determinator 37 selects, from the input data from the correlation computer 32, i.e., the correlation values corresponding to each filter for each of the N blocks, a filter corresponding to a block with the highest correlation.

The N filters selected for each of the N blocks by the integrated filter (Eallf) determinator 37 are input to the inverse filter calculator 61 of the blur remover 60.

The inverse filter calculator 61 of the blur remover 60 receives the block-by-block integrated filter (Eallf) determined by the integrated filter (Eallf) determinator 37, thereby generating an inverse filter with characteristics opposite to those of each block-by-block integrated filter (Eallf).

That is, a deconvolution filter is generated, and is output to the inverse filter processor 62.

The deconvolution filter is a filter with characteristics opposite to those of each block-by-block integrated filter (Eallf).

The inverse filter processor 62 of the blur remover 60 receives the inverse filter corresponding to each block from the inverse filter calculator 61, thereby applying the input inverse filter to a corresponding block of the pre-correction visible light image 25 input from the visible light image input unit 21.

That is, the inverse filter processor 62 applies, to the corresponding block of the pre-correction visible light image 25, the inverse filter with the characteristics opposite to those of the block-by-block integrated filter (Eallf) determined by the integrated filter (Eallf) determinator 37.

When the inverse filter application processing is completed for all of the N blocks of the pre-correction visible light image 25 input from the visible light image input unit 21, the resultant image is output as a post-correction visible light image 27.

By these types of processing, the post-correction visible light image 27 whose blur (defocusing) has been removed or reduced is generated from the pre-correction visible light image 25, and is output.

(B2) The processing of correcting the correlation value between the filter-applied far-infrared image and the blurred visible light image on the basis of the camera motion-based blur (Ec):

the configuration of the image processing device-B2 configured to execute the above-described processing will be described next with reference to FIG. 17.

Figure 17:
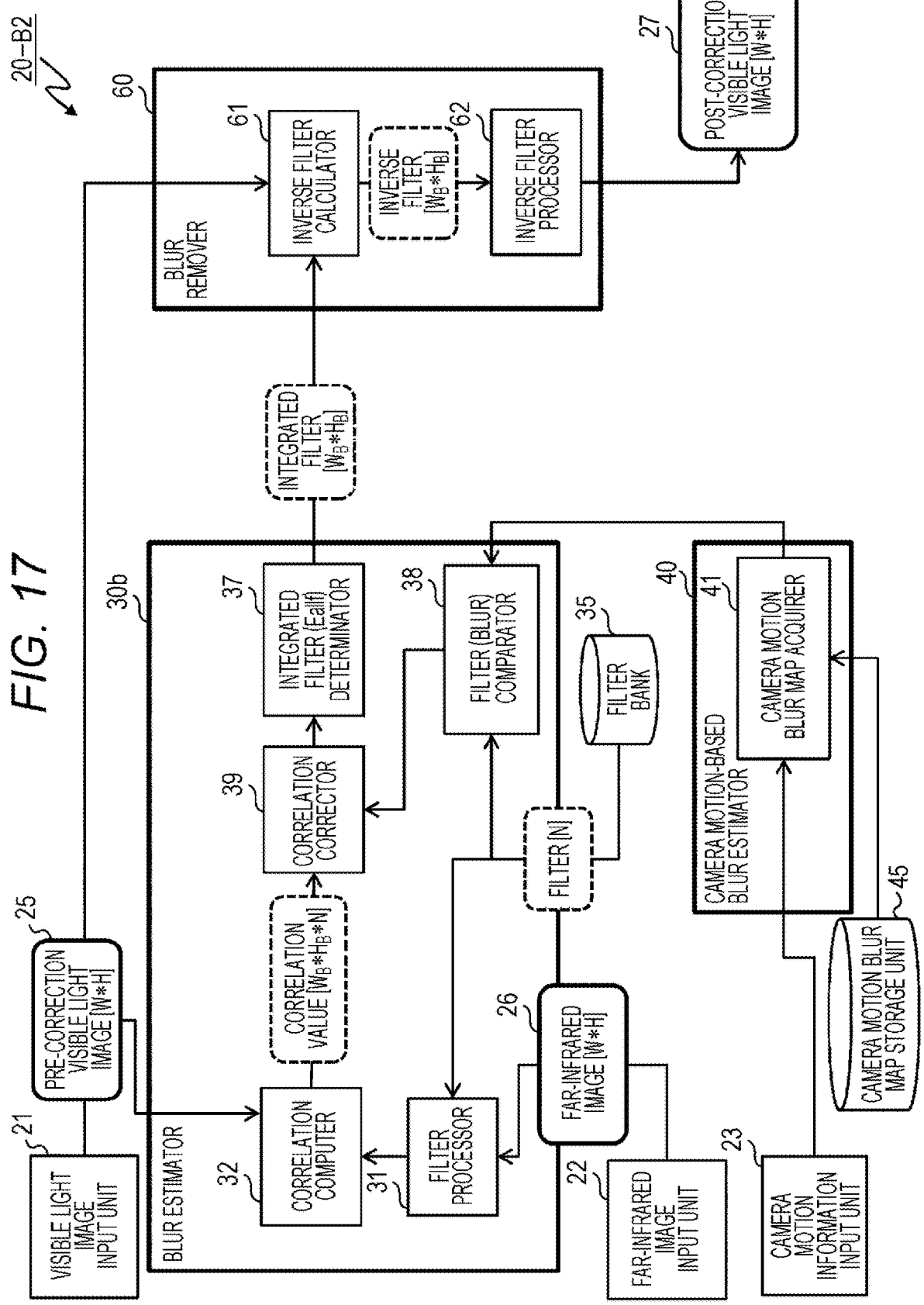
FIG. 17 illustrates a diagram for describing configuration and processing examples of the image processing device of the second embodiment of the present disclosure.

FIG. 17 is a diagram for describing the configuration and processing of the image processing device-B2.

The image processing device B2, 20-B2 illustrated in FIG. 17 has the visible light image input unit 21, the far-infrared image input unit 22, the camera motion information input unit 23, the blur estimator 30b, the camera motion-based blur estimator 40, the blur remover 60, and the camera motion blur map storage unit 45.

Further, the blur estimator 30b has the filter processor 31, the correlation computer 32, the integrated filter (Eallf) determinator 37, a filter (blur) comparator 38, and a correlation corrector 39.

The camera motion-based blur estimator 40 has the camera motion blur map acquirer 41.

Moreover, the blur remover 60 has the inverse filter calculator 61 and the inverse filter processor 62.

A difference from the image processing device B1, 20-B1 described earlier with reference to FIG. 15 is a point that no filter bank pool 36 is provided and the configuration of the blur estimator 30b.

The blur estimator 30b of the image processing device B2, 20-B2 illustrated in FIG. 17 does not have the filter bank selector 34 described earlier with reference to FIG. 15, and has the filter (blur) comparator 38 and the correlation corrector 39.

Hereinafter, processing executed by the filter (blur) comparator 38 and the correlation corrector 39 will be mainly described.

The filter (blur) comparator 38 receives each of the following types of information.

The blur (defocusing) generation filter to be applied to the far-infrared image 26 in the filter processor 31 is input from the filter bank 35.

Further, the camera motion blur map corresponding to the camera motion is input from the camera motion blur map acquirer 41 of the camera motion-based blur estimator 40.

The filter (blur) comparator 38 determines the degree of similarity between these two filters (blurs) to calculate a correction coefficient (0 to 1) according to the degree of similarity, and outputs the correction coefficient to the correlation corrector 39.

A greater (closer to 1) correction coefficient is set for a higher degree of similarity between the two filters (blurs), and a smaller (closer to 0) correction coefficient is set for a lower degree of similarity.

The correlation corrector 39 multiplies the correction coefficient input from the filter (blur) comparator 38 by the correlation value (the correlation value between the pre-correction visible light image 25 and the corresponding block of the filter-applied far-infrared image) input from the correlation computer 32, thereby calculating a corrected correlation value and outputting the corrected correlation value to the integrated filter determinator 37.

A specific example of a series of processing described above will be described with reference to FIG. 18.

Figure 18:
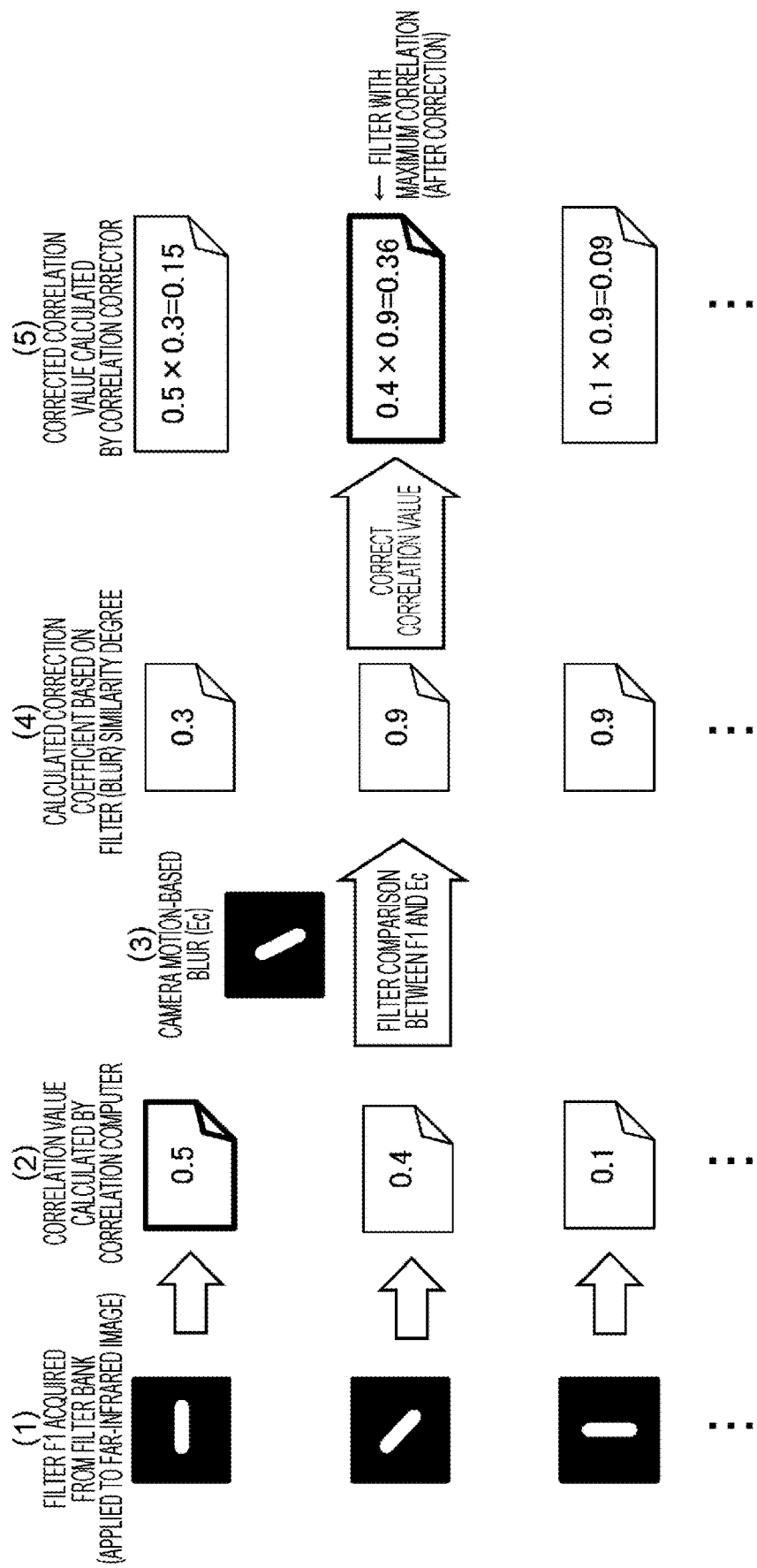
FIG. 18 illustrates diagrams for describing examples of processing executed by the image processing device of the second embodiment of the present disclosure.

FIG. 18 illustrates each of the following types of information:

(1) a filter F1 acquired from the filter bank 35;
(2) a correlation value calculated by the correlation computer 32;
(3) a camera motion-based blur;
(4) a calculated correction coefficient based on the degree of filter (blur) similarity; and
(5) a corrected correlation value calculated by the correlation corrector 39.

The filter F1 acquired from the filter bank 35 as illustrated in FIG. 18(1) is the blur (defocusing) generation filter to be applied to the far-infrared image 26 in the filter processor 31 of the blur estimator 30b illustrated in FIG. 17.

The filter (blur) comparator 38 receives such a filter.

Although only three types are illustrated in FIG. 18, many filters are, in addition to above, sequentially applied to the far-infrared image 26 in the filter processor 31.

Note that such filter application processing is executed for each unit block.

The correlation value calculated by the correlation computer 32 as illustrated in FIG. 18(2) is the correlation value calculated in the correlation computer 32 of the blur estimator 30b illustrated in FIG. 17.

That is, such a correlation value is the correlation value between the pre-correction visible light image 25 and the corresponding block of the filter-applied far-infrared image.
Correlation Value=0.5;
Correlation Value=0.4; and
Correlation Value=0.1:
the figure illustrates an example where these correlation values are calculated in this order from the top as three types of correlation values corresponding to each of three types of filters applied to the far-infrared image 26.

The camera motion-based blur in FIG. 18(3) is the blur acquired from the camera motion blur map input from the camera motion blur map acquirer 41 of the camera motion-based blur estimator 40 and corresponding to the camera motion.

Such a blur is the camera motion-based blur for the block corresponding to a correlation value calculation target block in the correlation computer 32, and is acquired from the camera motion blur map.

In the example illustrated in FIG. 18(3), the camera motion-based blur (Ec) extending in a diagonal direction toward the lower right side is shown.

The filter (blur) comparator 38 compares the two filters (blurs) of the filter F1 acquired from the filter bank 35 as illustrated in FIG. 18(1) and the camera motion-based blur (Ec) as illustrated in FIG. 18(3).

Note that the filter F1 is the blur generation filter, and it is determined whether or not the blur generated by the filter F1 acquired from the filter bank 35 as illustrated in FIG. 18(1) is similar to the camera motion-based blur (Ec) illustrated in FIG. 18(3).

The filter (blur) comparator 38 determines the degree of similarity between these two filters (blurs), thereby calculating the correction coefficient (0 to 1) according to the degree of similarity and outputting the correction coefficient to the correlation corrector 39.

The correction coefficient calculated based on the degree of filter (blur) similarity as illustrated in FIG. 18(4) is the above-described correction coefficient.
Correlation Coefficient=0.3;
Correlation Coefficient=0.9; and
Correlation Coefficient=0.9:
the example illustrated in FIG. 18 shows an example where these correlation coefficients are calculated in this order from the top as three types of correlation coefficients corresponding to each of three types of filters applied to the far-infrared image 26.

A greater (closer to 1) correction coefficient is set for a higher degree of similarity between the two filters (blurs).

In the example illustrated in FIG. 18, the camera motion-based blur (Ec) illustrated in FIG. 18(3) is the blur in the diagonal direction toward the lower right side.

Of the three types of filters illustrated as the filter F1 acquired from the filter bank 35 in FIG. 18(1), the first filter corresponding to a blur in a crosswise direction is determined as having a low degree of similarity to the camera motion-based blur (Ec) in the diagonal direction toward the lower right side, and therefore, Correlation Coefficient=0.3 is calculated.

On the other hand, the filter corresponding to the second blur in the direction toward the lower right side and the filter corresponding to the third blur in a lengthwise direction are determined as having a high degree of similarity to the camera motion-based blur (Ec) in the diagonal direction toward the lower right side as illustrated in FIG. 18(3), and Correlation Coefficient=0.9 is calculated.

The filter (blur) comparator 38 outputs these correction coefficients to the correlation corrector 39.

The correlation corrector 39 multiplies the correction coefficient input from the filter (blur) comparator 38 by the correlation value input from the correlation computer 32, i.e., the correlation value calculated by the correlation computer 32 as illustrated in FIG. 18(2), thereby calculating the corrected correlation value.

Such a corrected correlation value is as illustrated in FIG. 18(5).

Corrected Correlation Value=0.5×0.3=0.15;
Corrected Correlation Value=0.4×0.9=0.36; and
Corrected Correlation Value=0.1×0.9=0.09:

the example illustrated in FIG. 18(5) shows an example where these corrected correlation values are calculated in this order from the top as three types of corrected correlation values corresponding to each of three types of filters applied to the far-infrared image 26.

The corrected correlation values calculated by the correlation corrector 39 are output to the integrated filter determinator 37.

For each block, the integrated filter determinator 37 selects, from the input data from the correlation corrector 39, i.e., the corrected correlation values corresponding to each filter for each of the N blocks, a filter corresponding to a block with the highest correlation.

The N filters selected for each of the N blocks by the integrated filter (Eallf) determinator 37 are input to the inverse filter calculator 61 of the blur remover 60.

In the example illustrated in FIG. 18, the second entry is an entry with the highest corrected correlation value as illustrated in FIG. 18(5).

In this case, the filter for the second entry, i.e., the second filter indicated as the filter F1 acquired from the filter bank in FIG. 18(1), is determined as the integrated filter (Eallf).

The integrated filter (Eallf) determined by the integrated filter (Eallf) determinator 37 is input to the inverse filter calculator 61 of the blur remover 60.

The inverse filter calculator 61 of the blur remover 60 receives the block-by-block integrated filter (Eallf), thereby generating the inverse filter with the characteristics opposite to those of each block-by-block integrated filter (Eallf).

That is, the deconvolution filter is generated, and is output to the inverse filter processor 62.

The deconvolution filter is a filter with characteristics opposite to those of each block-by-block integrated filter (Eallf).

The inverse filter processor 62 of the blur remover 60 receives the inverse filter corresponding to each block from the inverse filter calculator 61, thereby applying the input inverse filter to the corresponding block of the pre-correction visible light image 25 input from the visible light image input unit 21.

That is, the inverse filter processor 62 applies, to the corresponding block of the pre-correction visible light image 25, the inverse filter with the characteristics opposite to those of the block-by-block integrated filter (Eallf) determined by the integrated filter (Eallf) determinator 37.

When the inverse filter application processing is completed for all of the N blocks of the pre-correction visible light image 25 input from the visible light image input unit 21, the resultant image is output as the post-correction visible light image 27.

By these types of processing, the post-correction visible light image 27 whose blur (defocusing) has been removed or reduced is generated from the pre-correction visible light image 25, and is output.

Next, a sequence of the processing executed by the image processing device corresponding to the configuration B described with reference to FIGS. 15 and 17 will be described with reference to flowcharts of FIG. 19 and subsequent figures.

(B1) The processing of selecting the filter to be applied to the far-infrared image, i.e., the filter for generating the blur (defocusing), on the basis of the camera motion-based blur (Ec):

a sequence of the processing executed by the image processing device-B1 configured to execute the above-described processing as described with reference to FIG. 15 will be first described with reference to the flowchart illustrated in FIG. 19.

Figure 19:
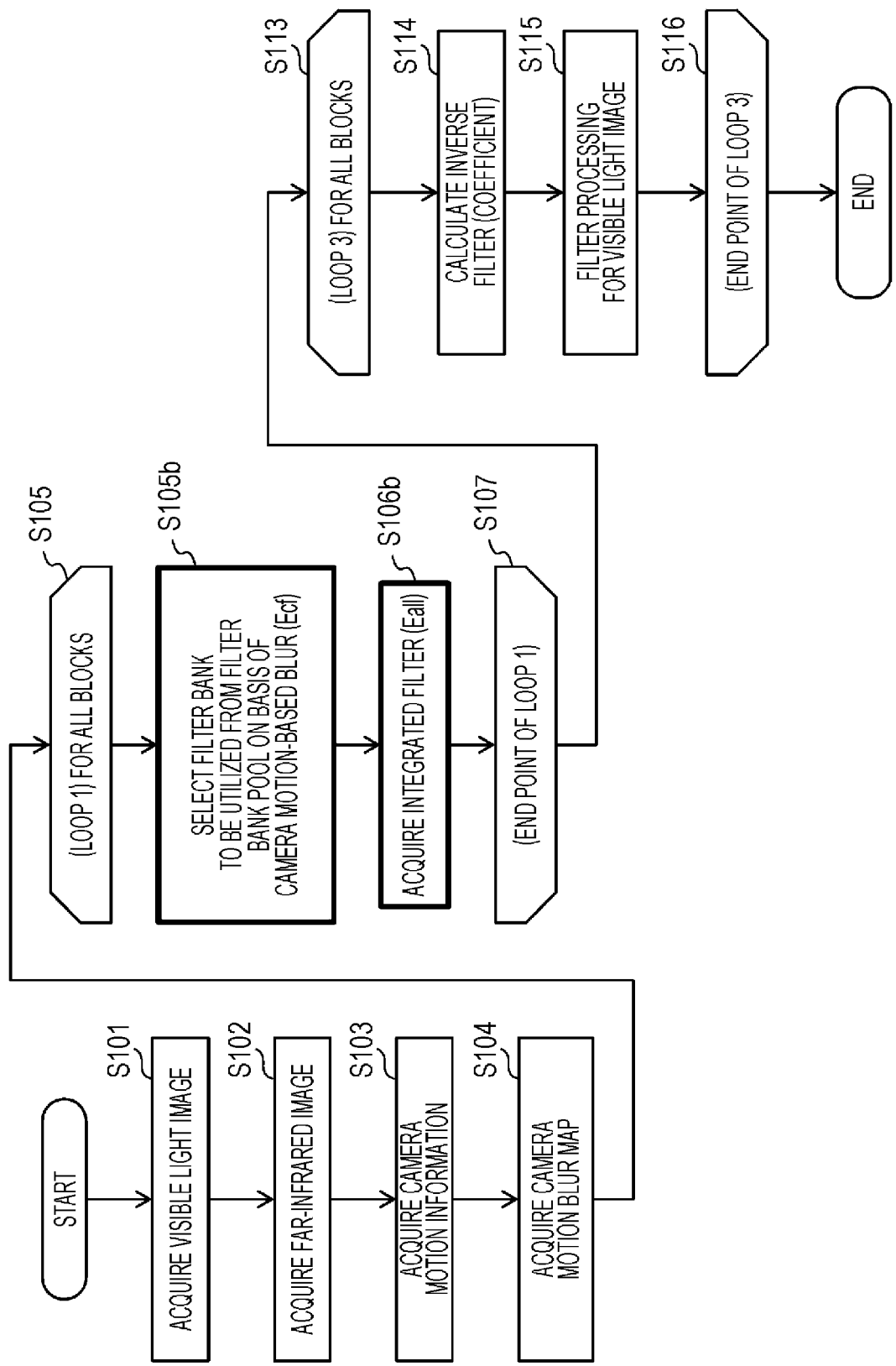
FIG. 19 illustrates a flowchart for describing a sequence of the processing executed by the image processing device of the second embodiment of the present disclosure.

Note that in a flow illustrated in FIG. 19, the same step number is used to represent the step of executing processing similar to that executed by the image processing device-A1 corresponding to the configuration A described earlier with reference to FIG. 12.

Hereinafter, the processing of each step of the flow illustrated in FIG. 19 will be sequentially described.

(Step S101)
First, at the step S101, the visible light image as a correction target is acquired.

This processing is performed by the visible light image input unit 21 in the image processing device illustrated in FIG. 15. Specifically, this processing is the processing of acquiring an image captured by a visible light image camera, for example.

(Step S102)
Next, at the step S102, the far-infrared image to be utilized as a reference image is acquired.

This processing is executed by the far-infrared image input unit 22 in the image processing device illustrated in FIG. 15. Specifically, this processing is the processing of acquiring an image captured by a far-infrared image camera, for example.

Note that the visible light image and the far-infrared image acquired at the step S101 and the step S102 are images captured by simultaneous photographing of the same object.

These images are, for example, images captured in the dark, and the visible light image is blurred (defocused) due to long exposure. On the other hand, the far-infrared image is an image exposed for a short period of time, and is an image with little blur (defocusing).

(Step S103)

Next, at the step S103, the camera motion information is acquired.

This processing is performed by the camera motion information input unit 23 in the image processing device illustrated in FIG. 15. Specifically, the camera motion information is acquired and input by the sensor such as an IMU, for example.

(Step S104)

Next, at the step S104, the camera motion blur map is acquired on the basis of the camera motion information input at the step S103.

This processing is processing executed by the camera motion blur map acquirer 41 of the camera motion-based blur estimator 40 in the image processing device illustrated in FIG. 15.

The camera motion blur map acquirer 41 of the camera motion-based blur estimator 40 acquires, on the basis of the camera motion information input from the camera motion information input unit 23, a single camera motion blur map from the blur maps stored corresponding to various types of camera motion in the camera motion blur map storage unit 45, and inputs the camera motion blur map to the filter bank selector 34 of the blur estimator 30b.

(Step S105)

The processing from the subsequent step S105 to the step S107 is the loop processing (loop 1) sequentially and repeatedly executed for all blocks as divided regions set for the visible light image and the far-infrared image.

Note that the number of blocks is N.

(Step S105b)

The processing of the step S105b is processing executed by the filter bank selector 34 of the blur estimator 30b illustrated in FIG. 15.

The filter bank selector 34 receives the camera motion blur map corresponding to the camera motion from the camera motion blur map acquirer 41 of the camera motion-based blur estimator 40, thereby selecting, from the filter bank pool 36, the filter bank storing the filters corresponding to the blurs with the directions and sizes similar to those of the blur set to the input camera motion blur map.

Note that such filter bank selection processing is executed for each unit block as the divided image region.

(Step S106b)

Next, at the step S106b, the processing of determining the integrated filter (Eallf) is executed.

Such processing of the step S106b is processing executed by the filter processor 31, the correlation computer 32, and the integrated filter determinator 37 of the blur estimator 30b illustrated in FIG. 15.

A sequence of the processing of the step S106b is the same as the processing of the step S106 described earlier with reference to FIG. 13, i.e., the processing of the steps S121 to S126 illustrated in FIG. 13.

Note that in the processing of the steps S121 to S126 described with reference to FIG. 13, the output filter is the image-based filter (Etf). However, at the step S106b of the flow of FIG. 19, the processing of selecting, as the integrated filter (Eallf), the filter with the maximum correlation value by the integrated filter determinator 37 illustrated in FIG. 15 at the step S126 illustrated in FIG. 13 is performed.

(Step S107)

The step S107 is the end point of the loop 1 of the steps S105 to S107.

That is, the processing of the steps S105b to S106b is sequentially and repeatedly executed for all blocks as the divided regions set for the visible light image and the far-infrared image.

When this loop processing (loop 1) is completed, the integrated filter (Eallf) with the highest correlation value is determined for all of the N blocks.

(Step S113)

The processing from the subsequent step S113 to the step S116 is the loop processing (loop 3) sequentially and repeatedly executed for all blocks as the divided regions set for the visible light image and the far-infrared image.

Note that the number of blocks is N.

(Step S114)

The processing of the steps S114 to S115 is processing executed by the blur remover 60 illustrated in FIG. 15.

First, at the step S114, the inverse filter calculator 61 of the blur remover 60 receives the block-by-block integrated filter (Eallf) determined by the integrated filter (Eallf) determinator 37, thereby calculating the inverse filter with the characteristics opposite to those of each block-by-block integrated filter (Eallf).

(Step S115)

Next, at the step S115, the inverse filter processor 62 of the blur remover 60 applies the inverse filter calculated at the step S114 to the processing target block of the visible light image.

(Step S116)

The step S116 is the end point of the loop 3 of the steps S113 to S116.

That is, the processing of the steps S114 to S115 is sequentially and repeatedly executed for all blocks as the divided regions set for the visible light image as the correction target image.

When the inverse filter application processing is completed for all of the N blocks of the visible light image, the resultant image is output as the post-correction visible light image.

By these types of processing, the post-correction visible light image 27 whose blur (defocusing) has been removed or reduced as illustrated in FIG. 15 is generated from the visible light image as the input image at the step S101, i.e., the pre-correction visible light image 25 illustrated in FIG. 15, and is output.

(B2) The processing of correcting the correlation value between the filter-applied far-infrared image and the blurred visible light image on the basis of the camera motion-based blur (Ec):

a sequence of the processing executed by the image processing device-B2 configured to execute the above-described processing as described with reference to FIG. 17 will be described with reference to a flowchart of FIG. 20.

Figure 20:
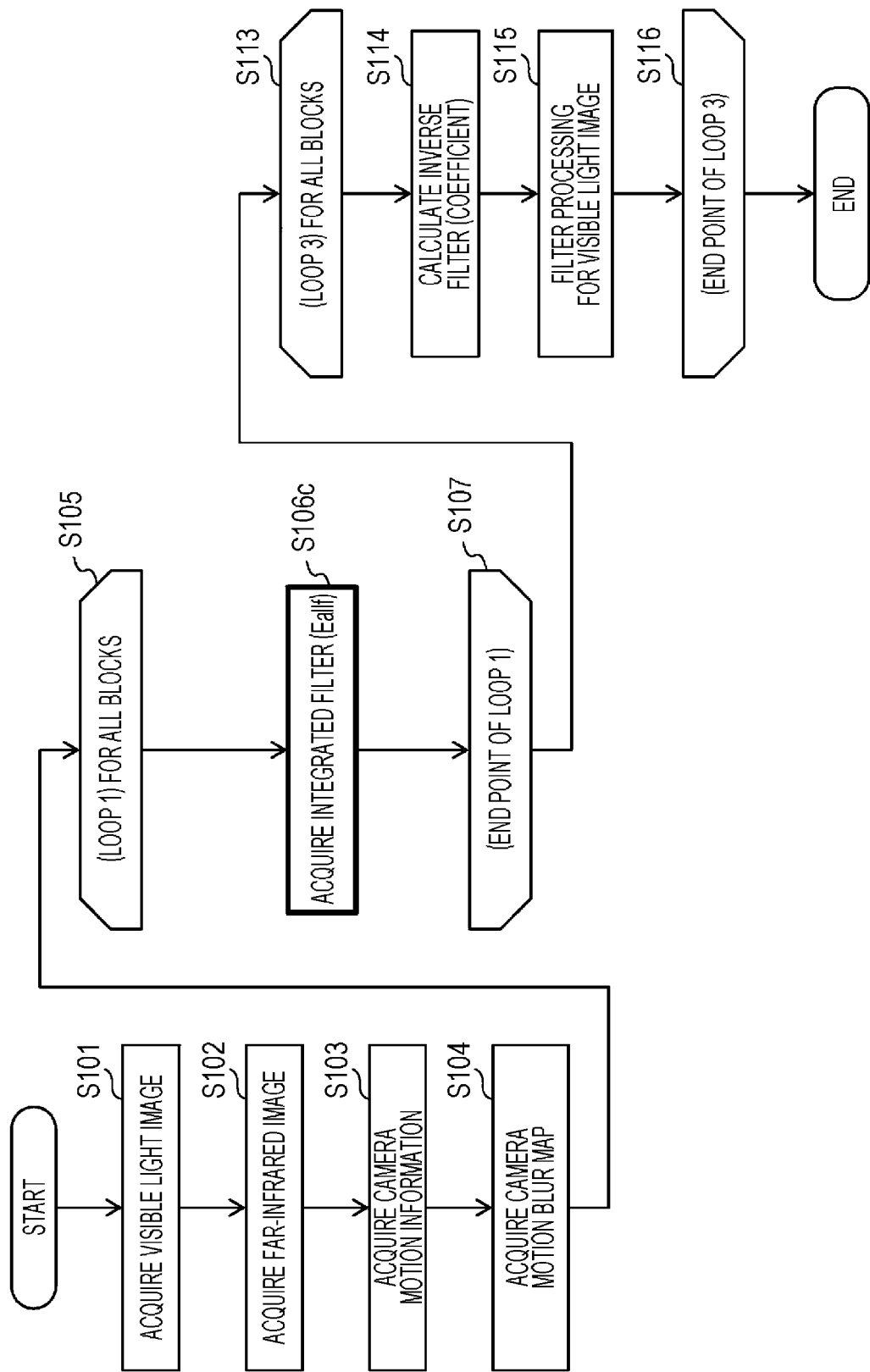
FIG. 20 illustrates a flowchart for describing a sequence of the processing executed by the image processing device of the second embodiment of the present disclosure.

A flow illustrated in FIG. 20 is different in that the processing of the steps S105b to S106b of the flow of FIG. 19 as described with reference to FIG. 19 is substituted with a step S106c illustrated in the flow of FIG. 20.

Other types of processing are similar to those described with reference to the flow illustrated in FIG. 19, and therefore, description thereof will not be repeated. The processing of the step S106c illustrated in the flow of FIG. 20 will be mainly described.

(Step S106c)

The step S106c is executed as the loop processing (loop 1) sequentially and repeatedly executed for all blocks as the divided regions set for the visible light image and the far-infrared image.

The step S106 is the processing of calculating the block-by-block integrated filter (Eallf) by the blur estimator 30b illustrated in FIG. 17.

A detailed sequence of the processing of the step S106c will be described with reference to a flow illustrated in FIG. 21.

Figure 21:
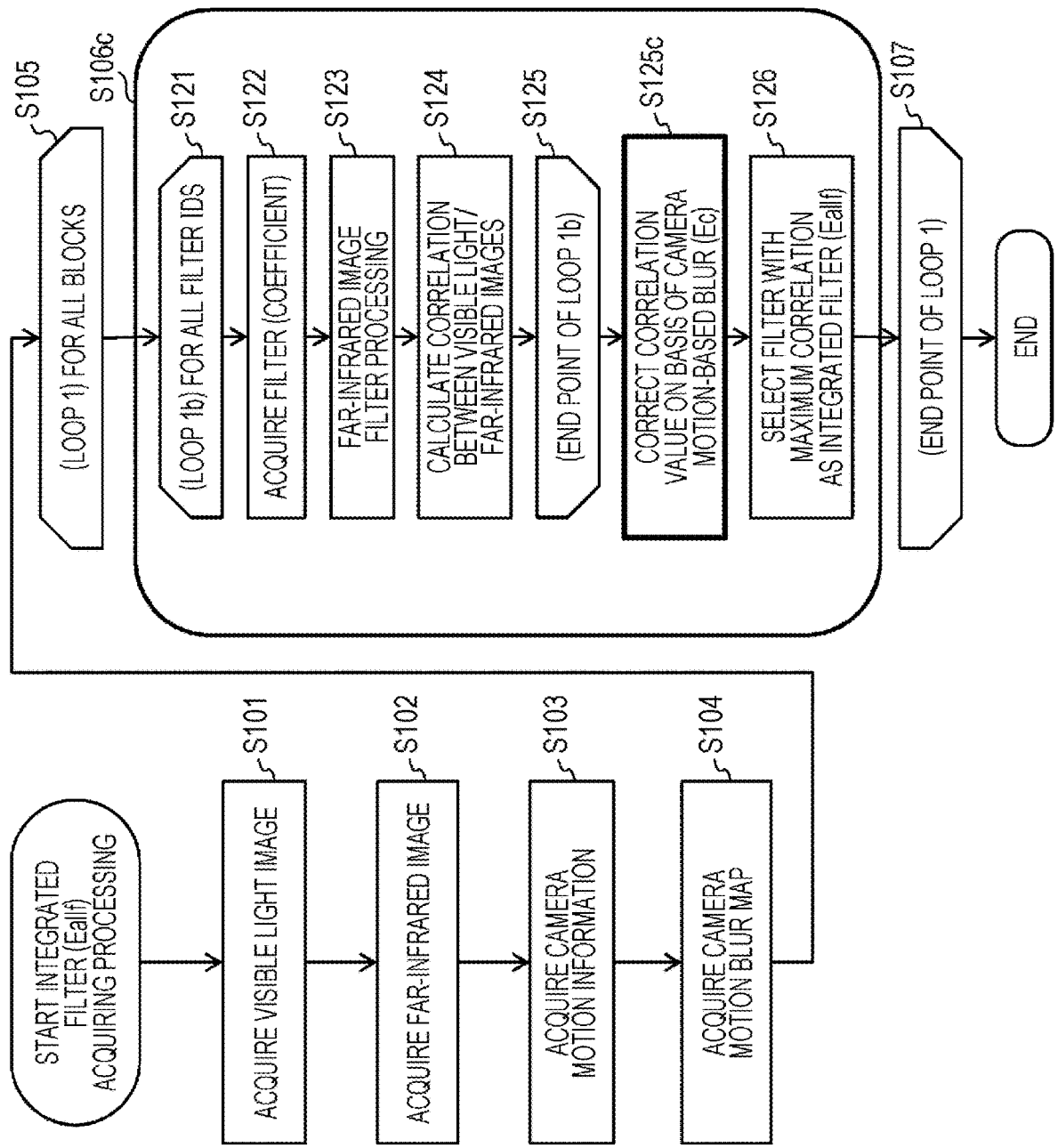
FIG. 21 illustrates a flowchart for describing a sequence of the processing executed by the image processing device of the second embodiment of the present disclosure.

For the processing of calculating each block-by-block integrated filter (Eallf) at the step S106c, the visible light image acquired at the step S101, the far-infrared image acquired at the step S102, and the camera motion blur map acquired at the steps S103 to S104 are utilized, and therefore, FIG. 21 also illustrates the steps S101 to S104.

The detailed processing of the step S106c is the processing of the steps S121 to S126 illustrated in FIG. 21.

Hereinafter, such processing will be sequentially described.

(Step S121)

The processing from the step S121 to the step S125 is the loop processing (loop 1b) sequentially and repeatedly executed for all filter IDs corresponding to all filters stored in the filter bank 35.

(Step S122)

At the step S122, the filter (coefficient) is acquired.

The processing of the steps S122 to S123 is processing executed by the filter processor 31 of the blur estimator 30b illustrated in FIG. 17. The filter processor 31 sequentially acquires, from the filter bank 35, the filter (filter (defocusing) generation filter) applied to each block of the far-infrared image.

Note that data sequentially acquired from the filter bank 35 may be any of the filter itself or the filter coefficient as data forming the filter.

(Step S123)

Next, at the step S123, the filter acquired at the step S122 is applied to a single block of the far-infrared image, i.e., a block currently selected as a processing target.

This processing is filter processing for intentionally blurring the far-infrared image.

(Step S124)

Next, at the step S124, the correlation value between the block of the far-infrared image as a filter application result at the step S123 and the corresponding block of the visible light image.

This processing is processing executed by the correlation computer 32 of the blur estimator 30b illustrated in FIG. 17.

The correlation computer 32 calculates the correlation between the far-infrared image intentionally blurred by filter application and the visible light image.

(Step S125)

The step S125 is the end point of the loop 1b of the steps S121 to S125.

That is, the processing of the steps S122 to S124 is sequentially and repeatedly executed for all filter IDs corresponding to all filters stored in the filter bank 35.

(Step S125c)

When the processing of the loop 1b of the steps S121 to S125 is completed for a single block, the processing proceeds to the step S125c.

That is, when the processing of calculating the correlation values corresponding to all filters stored in the filter bank 35 ends for a single block, the processing proceeds to the step S125c.

The processing of the step S125c is processing executed by the filter (blur) comparator 38 and the correlation corrector 39 of the blur estimator 30b illustrated in FIG. 17.

The filter (blur) comparator 38 receives each of the following types of information.

The blur (defocusing) generation filter to be applied to the far-infrared image 26 in the filter processor 31 is input from the filter bank 35.

Further, the camera motion blur map corresponding to the camera motion is input from the camera motion blur map acquirer 41 of the camera motion-based blur estimator 40.

The filter (blur) comparator 38 determines the degree of similarity between these two filters (blurs) to calculate the correction coefficient (0 to 1) according to the degree of similarity, and outputs the correction coefficient to the correlation corrector 39.

A greater (closer to 1) correction coefficient is set for a higher degree of similarity between the two filters (blurs), and a smaller (closer to 0) correction coefficient is set for a lower degree of similarity.

The correlation corrector 39 multiplies the correction coefficient input from the filter (blur) comparator 38 by the correlation value (the correlation value between the pre-correction visible light image 25 and the corresponding block of the filter-applied far-infrared image) input from the correlation computer 32, thereby calculating the corrected correlation value and outputting the corrected correlation value to the integrated filter determinator 37.

(Step S126)

The processing of the step S126 is processing executed by the integrated filter (Eallf) determinator 37 of the blur estimator 30b illustrated in FIG. 17.

At the step S126, the integrated filter (Eallf) determinator 37 determines, as the integrated filter (Eallf) corresponding to the block, the filter with the highest correlation value among the corrected correlation values calculated corresponding to the blocks by the correlation corrector 39 at the step S125b.

The integrated filter (Eallf) determined corresponding to the block by the integrated filter (Eallf) determinator 37 is input to the inverse filter calculator 61 of the blur remover 60 illustrated in FIG. 17.

(Step S107)

The step S107 is the end point of the loop 1 of the steps S105 to S107.

That is, the processing of the steps S105b to S106b is sequentially and repeatedly executed for all blocks as the divided regions set for the visible light image and the far-infrared image.

When this loop processing (the loop 1) is completed, the integrated filter (Eallf) is determined for all of the N blocks.

Next, the processing of the steps S113 to S116 illustrated in FIG. 20 is executed.

That is, the inverse filter calculator 61 of the blur remover 60 receives the block-by-block integrated filter (Eallf) determined by the integrated filter (Eallf) determinator 37, thereby calculating the inverse filter with the characteristics opposite to those of each block-by-block integrated filter (Eallf). The inverse filter processor 62 of the blur remover 60 applies the inverse filter to the processing target block of the visible light image.

When the inverse filter application processing is completed for all of the N blocks of the visible light image, the resultant image is output as the post-correction visible light image.

By these types of processing, the post-correction visible light image 27 whose blur (defocusing) has been removed or reduced as illustrated in FIG. 17 is generated from the visible light image as the input image at the step S101, i.e., the pre-correction visible light image 25 illustrated in FIG. 17, and is output.

7. (Third Embodiment) Configuration and Processing of Image Processing Device Corresponding to Configuration A+C Next, the configuration and processing of an image processing device with the configuration (A+C) described with reference to FIG. 8, i.e., an image processing device configured, with the configuration A as a basic configuration, to further calculate the degree of reliability of a filter (blur) estimation result to perform blur removing processing according to the degree of reliability, will be described as a third embodiment of the image processing device of the present disclosure.

The configuration A is a configuration in which an integrated filter (Eallf) of an image-based filter (Etf) and a camera motion-based filter (Ecf) is estimated to apply an inverse filter with characteristics opposite to those of the integrated filter (Eallf) to a blurred visible light image.

The configuration A+C described below as the third embodiment is a configuration in which the degree of reliability of the image-based filter (Etf) or the camera motion-based filter (Ecf) estimated in the configuration A is calculated for the blur removing processing according to the degree of reliability.

Note that for the configuration A, the following two types of processing forms of the processing of estimating the integrated blur (Eall) are provided as described earlier with reference to FIGS. 9 to 14:

(A1) a configuration in which the integrated blur (Eall) to be applied or selected is switched between the image-based blur (Et) and the camera motion-based blur (Ec) according to the amount of object motion; and (A2) a configuration in which the weighted average of the image-based blur (Et) and the camera motion-based blur (Ec) is utilized as the integrated blur (Eall) to change a weighted average form according to the amount of object motion.

Hereinafter, the configuration C, i.e., the configuration and processing of the image processing device configured to calculate the degree of reliability of the filter (blur) estimation result to perform the blur removing processing according to the degree of reliability, will be described in association with each of these configurations A1, A2.

Configuration A1+C; and
Configuration A2+C:

these two configuration examples and these two types of processing will be, in other words, described with reference to FIG. 22 and subsequent figures.

(A1) The configuration in which the integrated blur (Eall) to be applied or selected is switched between the image-based blur (Et) and the camera motion-based blur (Ec) according to the amount of object motion:

the configuration A1+C, i.e., the configuration of the image processing device configured to calculate the degree of reliability of the filter (blur) estimation result to perform the blur removing processing according to the degree of reliability in the above-described configuration, will be described with reference to FIG. 22.

Figure 22:
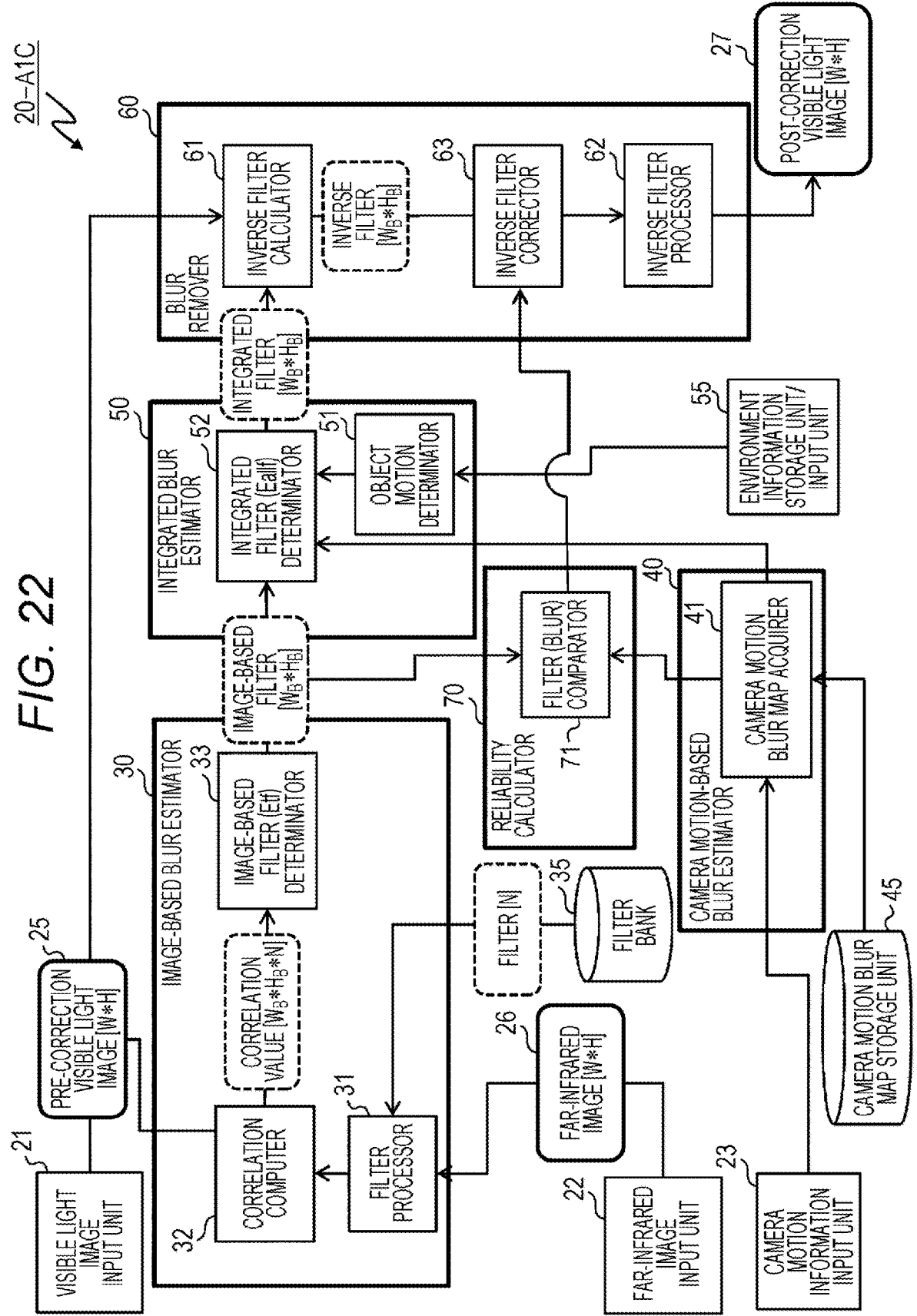
FIG. 22 illustrates a diagram for describing configuration and processing examples of an image processing device of a third embodiment of the present disclosure.

The image processing device A1+C, 20-A1C illustrated in FIG. 22 is configured such that a reliability calculator 70 is added to the configuration of the image processing device A1, 20-A1 described earlier with reference to FIG. 9 and an inverse filter corrector 63 is further added to the blur remover 60.

Other configurations are the same as those of the image processing device A1, 20-A1 illustrated in FIG. 9.

Processing executed by the reliability calculator 70 and the inverse filter corrector 63 will be described.

The reliability calculator 70 has a filter (blur) comparator 71.

The filter (blur) comparator 71 of the reliability calculator 70 receives the following two pieces of data:

(1) the image-based filter (Etf) generated by the image-based blur estimator 30; and (2) the camera motion blur map acquired by the camera motion-based blur estimator 40.

The image-based filter (Etf) generated by the image-based blur estimator 30 is a filter for each unit block as a divided image region.

The camera motion blur map acquired by the camera motion-based blur estimator 40 is data having, for each unit block, blur information corresponding to the camera motion as described earlier with reference to FIG. 10.

The filter (blur) comparator 71 of the reliability calculator 70 compares the block-by-block image-based filter (Etf) generated by the image-based blur estimator 30 and the camera motion-based blur (Ec) of the block in the camera motion blur map corresponding to such a block.

Note that the filter as a comparison target at this point is a blur generation filter. For example, a filter coefficient and a function (PSF) indicating the blur can be directly compared with each other, and such comparison allows determination on similarity between the filter and the blur.

Note that the processing of converting the camera motion-based blur (Ec) into the camera motion-based filter (Ecf) to compare the camera motion-based filter (Ecf) with the image-based filter (Etf) may be performed, or the processing of converting the image-based filter (Etf) into the image-based blur (Ec) to compare the image-based blur (Ec) with the camera motion-based blur (Ec) may be performed.

In either case, the processing of comparing the image-based blur (Et) or the image-based filter (Etf) with the camera motion-based blur (Ec) or the camera motion-based filter (Ecf) is performed between the corresponding blocks positioned at the same position on the image.

In a case where the degree of similarity between the two filters (blurs) as such a comparison processing result is high, the value of the degree of reliability is set high.

On the other hand, in a case where the degree of similarity between the two filters (blurs) is low, the value of the degree of reliability is set low.

Note that the degree of reliability is a value of Reliability Degree=0 to 1, for example.

Figure 23:
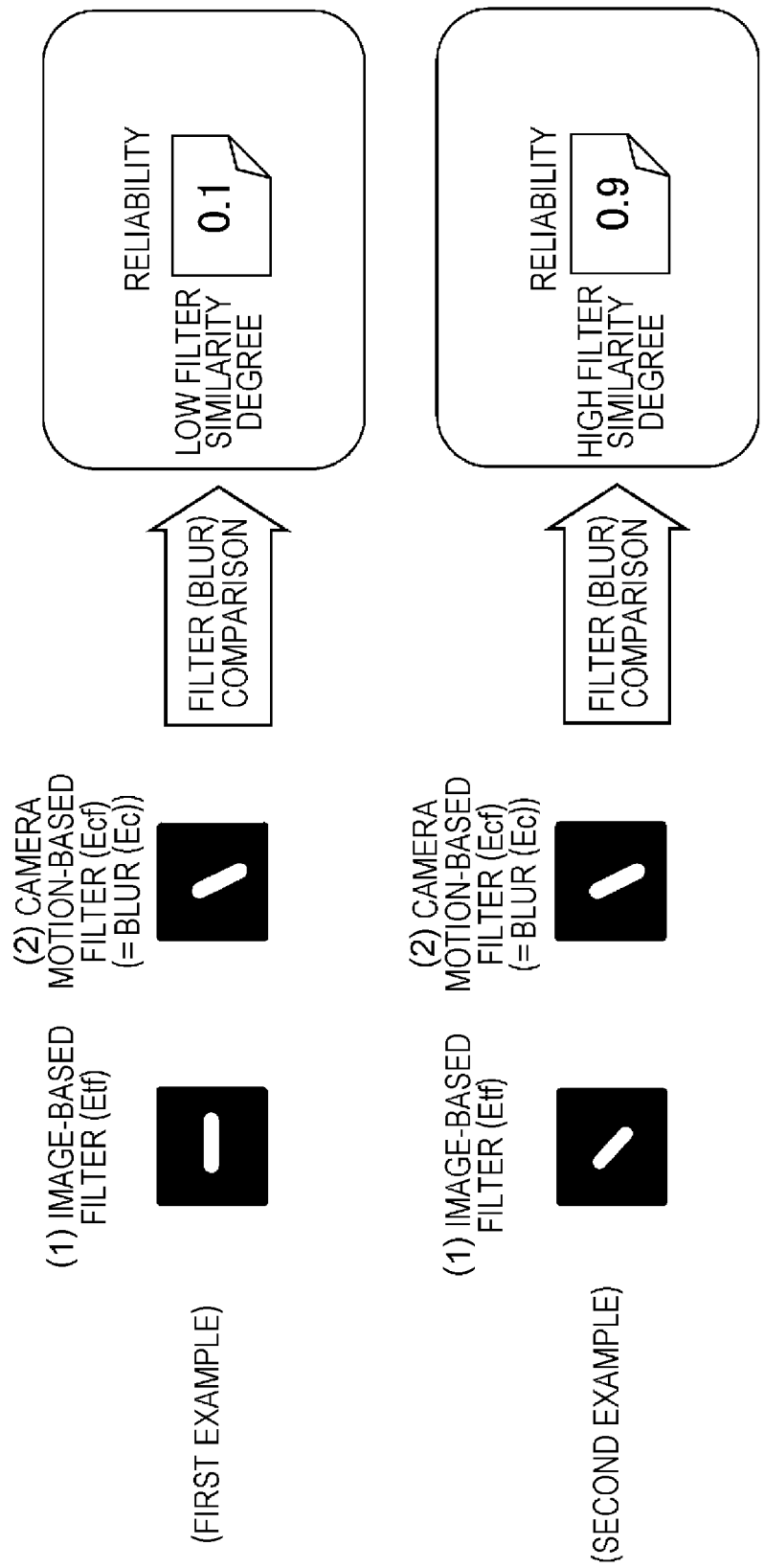
FIG. 23 illustrates diagrams for describing examples of processing executed by the image processing device of the third embodiment of the present disclosure.

FIG. 23 illustrates examples of the reliability calculation processing executed by the filter (blur) comparator 71 of the reliability calculator 70.

FIG. 23 illustrates two examples as the examples of the reliability calculation processing executed by the filter (blur) comparator 71.

(First Example) is an example where the image-based filter (blur) generated by the image-based blur estimator 30 is a horizontally-elongated filter (blur) and the camera motion-based filter (blur) acquired from the block in the camera motion blur map is a filter (blur) in a diagonal direction toward the lower right side.

In this case, it is determined that the degree of similarity between these two filters (blurs) is low, and the degree of reliability is set to a low value of 0.1, for example.

(Second Example) is an example where the image-based filter (blur) generated by the image-based blur estimator 30 is a filter (blur) in the diagonal direction toward the lower right side and the camera motion-based filter (blur) acquired from the block in the camera motion blur map is a filter (blur) in the diagonal direction toward the lower right side.

In this case, it is determined that the degree of similarity between these two filters (blurs) is high, and the degree of reliability is set to a high value of 0.9, for example.

The filter (blur) comparator 71 of the reliability calculator 70 outputs the calculated degree of reliability to the inverse filter corrector 63 of the blur remover 60.

The inverse filter corrector 63 adjusts, according to the degree of reliability input from the reliability calculator 70, the strength of the inverse filter applied in the inverse filter processor 62.

For example, in the case of a high degree of reliability input from the reliability calculator 70, the coefficient set to the inverse filter calculated by the inverse filter calculator 61 is directly utilized without a decrease in the strength of the inverse filter applied in the inverse filter processor 62. That is, the inverse filter calculated by the inverse filter calculator 61 is directly applied to the processing target block of the pre-correction visible light image 25.

On the other hand, in the case of a low degree of reliability input from the reliability calculator 70, the strength of the inverse filter applied in the inverse filter processor 62 is decreased. That is, the coefficient set to the inverse filter calculated by the inverse filter calculator 61 is adjusted to lower an inverse filter application effect.

Specifically, in a case where the degree of reliability of the correlation value calculated by the reliability calculator 70 is, for example, set as Correlation Value Reliability Degree α=1 (High Reliability) to 0 (Low Reliability), the inverse filter corrector 63 multiplies the coefficient set to the inverse filter calculated by the inverse filter calculator 61 by the degree α of reliability to generate a corrected inverse filter, thereby outputting the corrected inverse filter to the inverse filter processor 62.

The inverse filter processor 62 applies the corrected inverse filter input from the inverse filter corrector 63 to the processing target block of the pre-correction visible light image 25.

Note that the reliability calculation processing of the reliability calculator 70, the inverse filter correction processing of the inverse filter corrector 63, and the inverse filter application processing of the inverse filter processor 62 are executed as processing for each unit block.

As described above, in the present embodiment, the inverse filter application processing according to the degree of reliability of the estimated filter (blur) is implemented. The inverse filter application effect can be enhanced for the block with a high degree of reliability, and can be suppressed low for the block with a low degree of reliability. Effective blur elimination processing can be performed according to the degree of reliability.

(A2) The configuration in which the weighted average of the image-based blur (Et) and the camera motion-based blur (Ec) is utilized as the integrated blur (Eall) to change the weighted average form according to the amount of object motion:

the configuration A2+C, i.e., the configuration of the image processing device configured to calculate the degree of reliability of the filter (blur) estimation result to perform the blur removing processing according to the degree of reliability in the above-described configuration, will be described with reference to FIG. 24.

Figure 24:
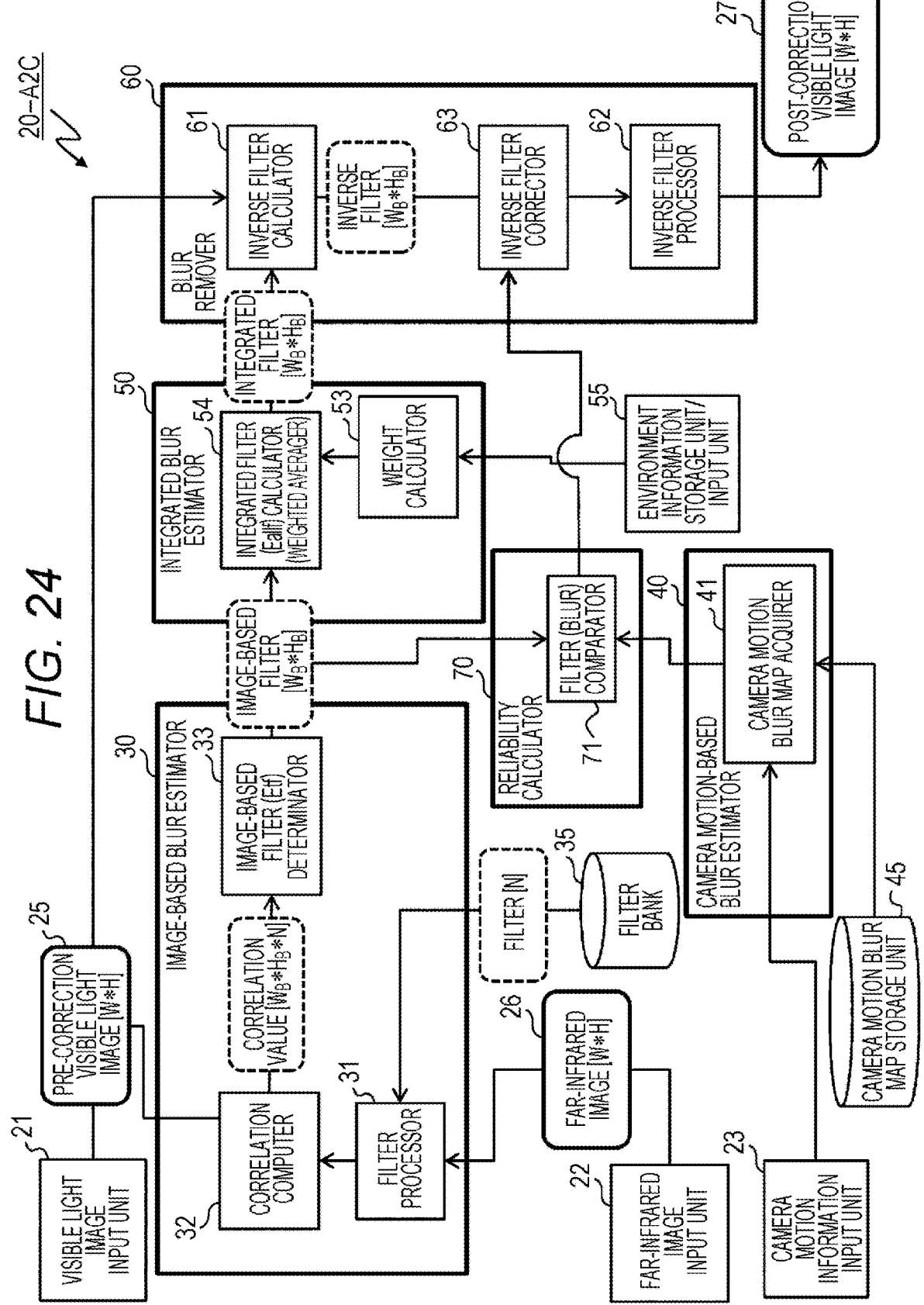
FIG. 24 illustrates a diagram for describing configuration and processing examples of the image processing device of the third embodiment of the present disclosure.

The image processing device A2+C, 20-A2C illustrated in FIG. 24 is configured such that the reliability calculator 70 is added to the configuration of the image processing device A2, 20-A2 described earlier with reference to FIG. 11 and the inverse filter corrector 63 is further added to the blur remover 60.

Other configurations are the same as those of the image processing device A2, 20-A2 illustrated in FIG. 11.

The processing executed by the reliability calculator 70 and the inverse filter corrector 63 is processing similar to that described regarding the above-described image processing device A1+C, 20-A1C with reference to FIGS. 22 and 23.

That is, the reliability calculator 70 performs, between the corresponding blocks positioned at the same position on the image, the processing of comparing the image-based blur (Et) or the image-based filter (Etf) with the camera motion-based blur (Ec) or the camera motion-based filter (Ecf).

In a case where the degree of similarity between the two filters (blurs) as the result of such comparison processing is high, the value of the degree of reliability is set high.

On the other hand, in a case where the degree of similarity is low, the value of the degree of reliability is set low.

The filter (blur) comparator 71 of the reliability calculator 70 outputs the calculated degree of reliability to the inverse filter corrector 63 of the blur remover 60.

The inverse filter corrector 63 adjusts, according to the degree of reliability input from the reliability calculator 70, the strength of the inverse filter applied in the inverse filter processor 62.

For example, in the case of a high degree of reliability input from the reliability calculator 70, the coefficient set to the inverse filter calculated by the inverse filter calculator 61 is directly utilized without a decrease in the strength of the inverse filter applied in the inverse filter processor 62. That is, the inverse filter calculated by the inverse filter calculator 61 is directly applied to the processing target block of the pre-correction visible light image 25.

On the other hand, in the case of a low degree of reliability input from the reliability calculator 70, the strength of the inverse filter applied in the inverse filter processor 62 is decreased. That is, the coefficient set to the inverse filter calculated by the inverse filter calculator 61 is adjusted to lower the inverse filter application effect.

As described above, in the present embodiment, the inverse filter application processing according to the degree of reliability of the estimated filter (blur) is implemented. The inverse filter application effect can be enhanced for the block with a high degree of reliability, and can be suppressed low for the block with a low degree of reliability. The effective blur elimination processing can be performed according to the degree of reliability.

Next, a sequence of the processing in the third embodiment described with reference to FIGS. 22 to 24, i.e., in the image processing device with the configuration (A1+C) or the configuration (A2+C), will be described with reference to flowcharts illustrated in FIG. 25 and a subsequent figure.

Figure 25:
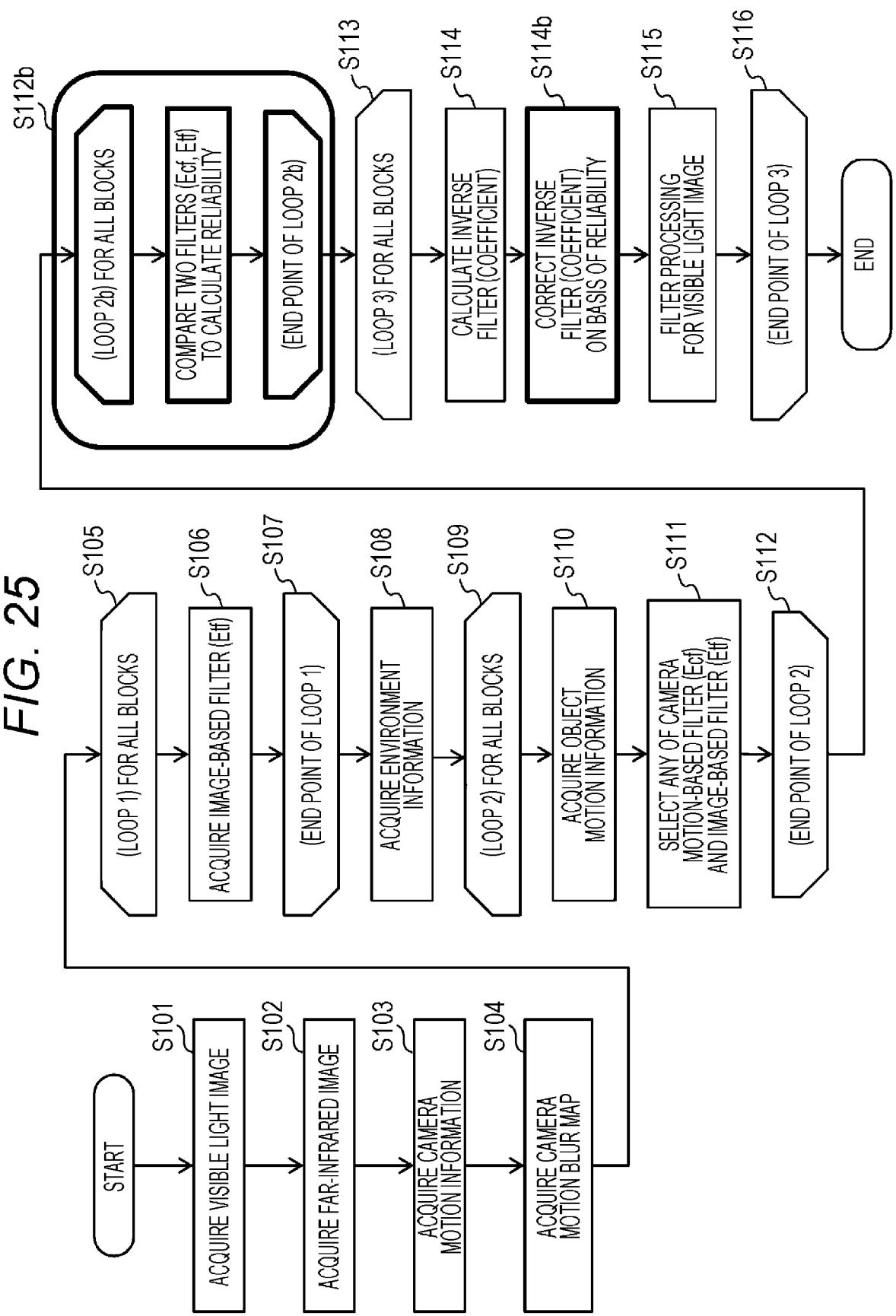
FIG. 25 illustrates a flowchart for describing a sequence of the processing executed by the image processing device of the third embodiment of the present disclosure.

(A1) The configuration in which the integrated blur (Eall) to be applied or selected is switched between the image-based blur (Et) and the camera motion-based blur (Ec) according to the amount of object motion:

the flowchart illustrated in FIG. 25 is a flowchart for describing a sequence of the processing executed by the configuration A1+C described earlier with reference to FIG. 22, i.e., the image processing device configured to calculate the degree of reliability of the filter (blur) estimation result to perform the blur removing processing according to the degree of reliability in the above-described configuration.

The flowchart illustrated in FIG. 25 is a flowchart that processing of a step S112b and a step S114b is added to the processing of the steps S101 to S116 of the processing flow executed by the image processing device corresponding to the "configuration A1" of FIG. 9 as described earlier with reference to FIG. 12.

Other processing than the step S112b and the step S114b as additional processing is similar to the processing of the steps S101 to S116 of the flow described with reference to FIG. 12, and therefore, description thereof will not be repeated. Only the processing of the step S112b and the step S114b as the additional processing will be described.

(Step S112b)

The step S112b is the reliability calculation processing, and is repeatedly executed for each unit block.

The filter (blur) comparator 71 of the reliability calculator 70 illustrated in FIG. 22 performs, between the corresponding blocks positioned at the same position on the image, the processing of comparing the image-based blur (Et) or the image-based filter (Etf) with the camera motion-based blur (Ec) or the camera motion-based filter (Ecf). In a case where the degree of similarity between the two filters (blurs) as the result of such comparison processing is high, the value of the degree of reliability is set high. In a case where the degree of similarity is low, the value of the degree of reliability is set low.

When the reliability calculation processing is completed for all blocks, the processing proceeds to the step S113.

(Step S114b)

Next, the processing of the step S114b as the processing of another additional step of the flow illustrated in FIG. 25 will be described.

The step S114b is processing executed in the inverse filter corrector 63 of the blur remover 60 illustrated in FIG. 22.

The inverse filter corrector 63 adjusts, according to the degree of reliability input from the reliability calculator 70, the strength of the inverse filter applied in the inverse filter processor 62.

For example, in the case of a high degree of reliability input from the reliability calculator 70, the coefficient set to the inverse filter calculated by the inverse filter calculator 61 is directly utilized without a decrease in the strength of the inverse filter applied in the inverse filter processor 62. That is, the inverse filter calculated by the inverse filter calculator 61 is directly applied to the processing target block of the pre-correction visible light image 25.

On the other hand, in the case of a low degree of reliability input from the reliability calculator 70, the strength of the inverse filter applied in the inverse filter processor 62 is decreased. That is, the coefficient set to the inverse filter calculated by the inverse filter calculator 61 is adjusted to lower the inverse filter application effect.

(A2) The configuration in which the weighted average of the image-based blur (Et) and the camera motion-based blur (Ec) is utilized as the integrated blur (Eall) to change the weighted average form according to the amount of object motion:

a sequence of the processing executed by the configuration A2+C described earlier with reference to FIG. 24, i.e., the image processing device configured to calculate the degree of reliability of the filter (blur) estimation result to perform the blur removing processing according to the degree of reliability in the above-described configuration, will be described with reference to the flowchart illustrated in FIG. 26.

Figure 26:
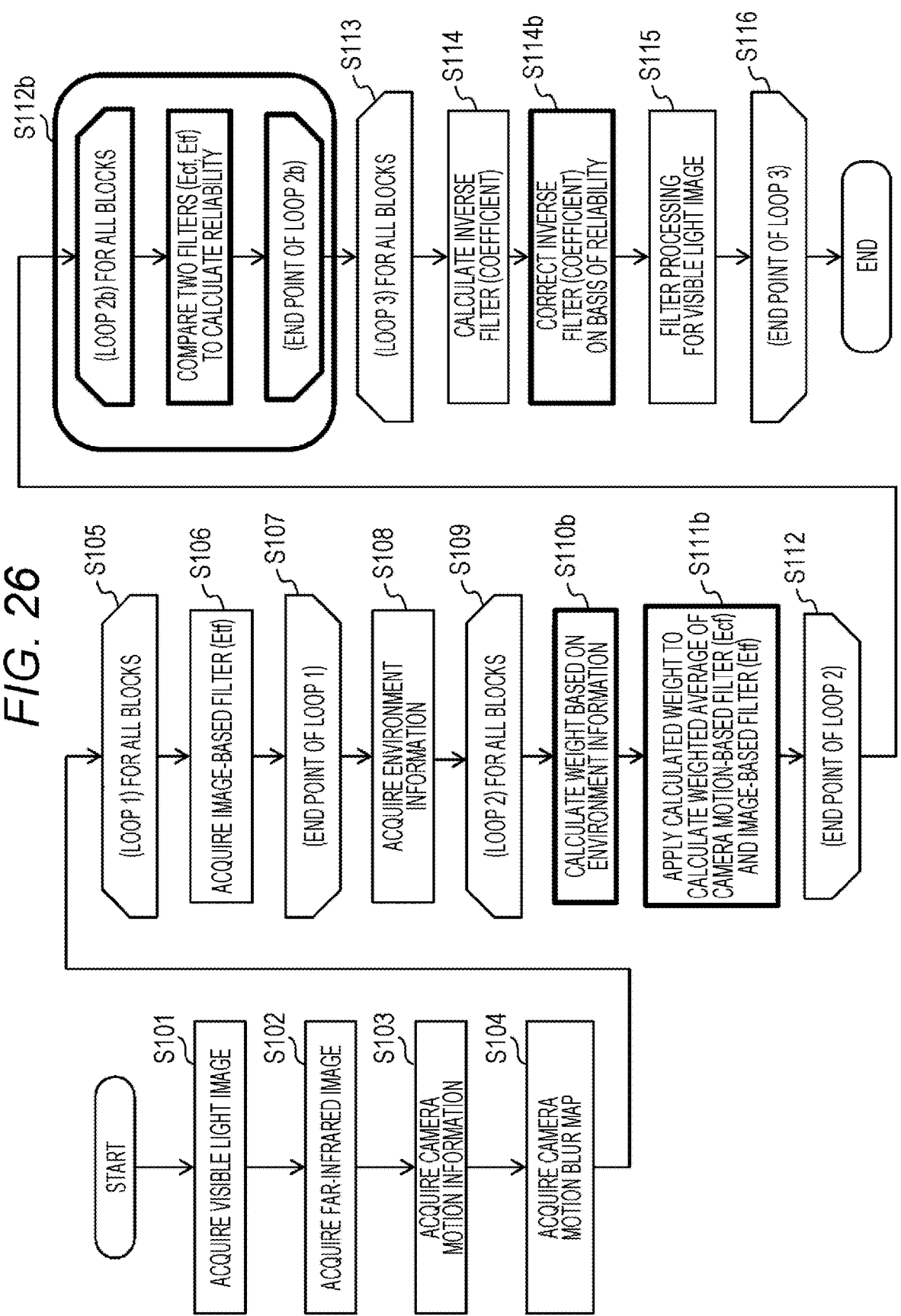
FIG. 26 illustrates a flowchart for describing a sequence of the processing executed by the image processing device of the third embodiment of the present disclosure.

The flowchart illustrated in FIG. 26 is a flowchart that the processing of the step S112b and the step S114b is added to the processing of the steps S101 to S116 of the processing flow executed by the image processing device corresponding to the "configuration A2" of FIG. 11 as described earlier with reference to FIG. 14.

Other processing than the step S112b and the step S114b as the additional processing is similar to the processing of the steps S101 to S116 of the flow described with reference to FIG. 14.

Moreover, the processing of the step S112b and the step S114b as the additional processing is processing similar to the processing of the step S112b and the step S114b as the processing of the image processing device of the configuration A1+C as described with reference to the flowchart of FIG. 25.

That is, at the step S112b, the degree of reliability is calculated on the basis of the degree of similarity between the image-based filter (blur) and the camera motion-based filter (blur).

Further, at the step S114b, the inverse filter correction processing of controlling the applied strength of the inverse filter according to the degree of reliability is performed.

By these types of processing, the inverse filter application processing according to the degree of reliability of the estimated filter (blur) is implemented. The inverse filter application effect can be enhanced for the block with a high degree of reliability, and can be suppressed low for the block with a low degree of reliability. The effective blur elimination processing can be performed according to the degree of reliability.

8. (Fourth Embodiment) Configuration and Processing of Image Processing Device Corresponding to Configuration B+C Next, the configuration and processing of an image processing device with the configuration (B+C) described with reference to FIG. 8, i.e., an image processing device configured, with the configuration B as a basic configuration, to further calculate the degree of reliability of a filter (blur) estimation result to perform blur removing processing according to the degree of reliability, will be described as a fourth embodiment of the image processing device of the present disclosure.

The configuration B is the configuration described earlier with reference to FIGS. 15 to 21, the configuration B being a configuration in which image-based blur estimation using a visible light image and a far-infrared image and camera motion-based blur estimation based on camera motion information are executed in combination to execute integrated blur estimation.

The configuration B+C as the fourth embodiment described below is a configuration in which the degree of reliability of an image-based filter (Etf) or a camera motion-based filter (Ecf) estimated in the configuration B is calculated to perform the blur removing processing according to the degree of reliability.

Note that as described earlier with reference to FIGS. 15 to 21, in the processing of generating an integrated blur (Eall) in the configuration B, any of the following two types of processing is executed:

(B1) the processing of selecting a filter to be applied to the far-infrared image, i.e., a filter for generating a blur (defocusing), on the basis of a camera motion-based blur (Ec) (FIG. 15); and (B2) the processing of correcting a correlation value between a filter-applied far-infrared image and the blurred visible light image on the basis of the camera motion-based blur (Ec) (FIG. 17).

Hereinafter, the configuration C, i.e., the configuration and processing of the image processing device configured to calculate the degree of reliability of the filter (blur) estimation result to perform the blur removing processing according to the degree of reliability, will be described in association with each of these configurations B1, B2.

Configuration B1+C; and

Configuration B2+C:

these two configuration examples and these two types of processing will be, in other words, described with reference to FIG. 27 and a subsequent figure.

First, the configuration B1+C, i.e., the configuration of the image processing device configured to calculate the degree of reliability of the filter (blur) estimation result to perform the blur removing processing according to the degree of reliability in (B1) the device configured to select the filter to be applied to the far-infrared image, i.e., the filter for generating the blur (defocusing), on the basis of the camera motion-based blur (Ec) will be described with reference to FIG. 27.

Figure 27:
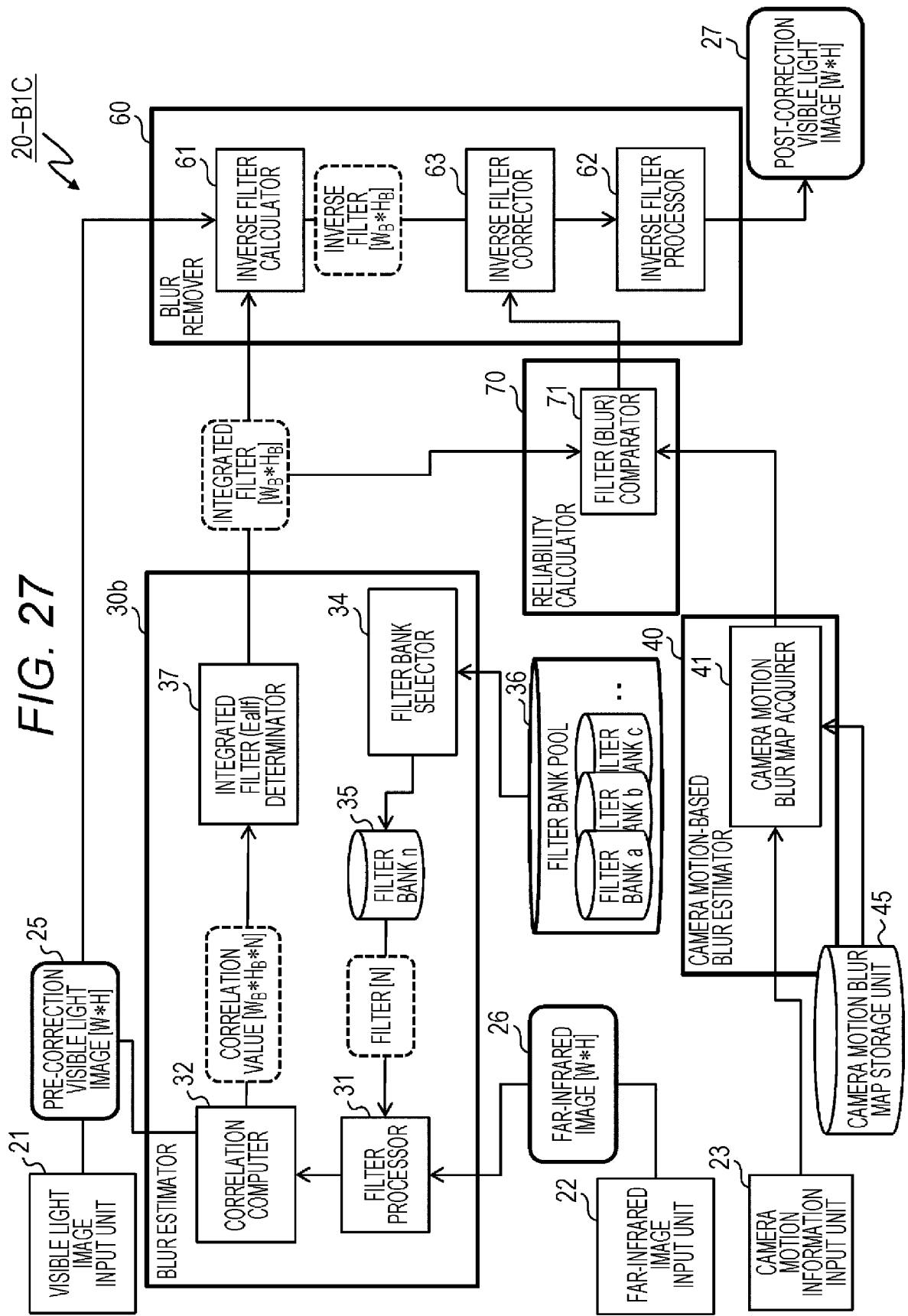
FIG. 27 illustrates a diagram for describing an example of processing executed by an image processing device of a fourth embodiment of the present disclosure.

The image processing device B1+C, 20-B1C illustrated in FIG. 27 is configured such that a reliability calculator 70 is added to the configuration of the image processing device B1, 20-B1 described earlier with reference to FIG. 15 and an inverse filter corrector 63 is further added to a blur remover 60.

Other configurations are the same as those of the image processing device B1, 20-B1 illustrated in FIG. 15.

Processing executed by the reliability calculator 70 and the inverse filter corrector 63 is processing substantially similar to the processing executed by the image processing device A1+C, 20-A1C described earlier with reference to FIGS. 22 and 23.

Note that the reliability calculator 70 of the image processing device A1+C, 20-A1C described earlier with reference to FIGS. 22 and 23 executes the processing of comparing the image-based filter (blur) and the camera motion-based filter (blur), but the reliability calculator 70 of the image processing device B1+C, 20-B1C illustrated in FIG. 27 executes the processing of comparing an integrated filter (blur) and the camera motion-based filter (blur).

As illustrated in FIG. 27, the reliability calculator 70 receives the integrated filter generated by a blur estimator 30b and a camera motion blur map output from a camera motion-based blur estimator 40, thereby determining the degree of similarity between these filters (blurs).

That is, the reliability calculator 70 performs, between corresponding blocks positioned at the same position on the image, the processing of comparing the integrated filter (blur) and the camera motion-based filter (blur).

In a case where the degree of similarity between the two filters (blurs) as the result of such comparison processing is high, the value of the degree of reliability is set high. In a case where the degree of similarity is low, the value of the degree of reliability is set low.

A filter (blur) comparator 71 of the reliability calculator 70 outputs the calculated degree of reliability to the inverse filter corrector 63 of the blur remover 60.

The inverse filter corrector 63 adjusts, according to the degree of reliability input from the reliability calculator 70, the strength of an inverse filter applied in an inverse filter processor 62.

For example, in the case of a high degree of reliability input from the reliability calculator 70, a coefficient set to the inverse filter calculated by an inverse filter calculator 61 is directly utilized without a decrease in the strength of the inverse filter applied in the inverse filter processor 62. That is, the inverse filter calculated by the inverse filter calculator 61 is directly applied to a processing target block of a pre-correction visible light image 25.

On the other hand, in the case of a low degree of reliability input from the reliability calculator 70, the strength of the inverse filter applied in the inverse filter processor 62 is decreased. That is, the coefficient set to the inverse filter calculated by the inverse filter calculator 61 is adjusted to lower an inverse filter application effect.

As described above, in the present embodiment, the inverse filter application processing according to the degree of reliability of the estimated filter (blur) is also implemented. The inverse filter application effect can be enhanced for the block with a high degree of reliability, and can be suppressed low for the block with a low degree of reliability. Effective blur elimination processing can be performed according to the degree of reliability.

Next, the configuration B2+C, i.e., the configuration of the image processing device configured to calculate the degree of reliability of the filter (blur) estimation result to perform the blur removing processing according to the degree of reliability in (B2) the device configured to correct the correlation value between the filter-applied far-infrared image and the blurred visible light image on the basis of the camera motion-based blur (Ec) will be described with reference to FIG. 28.

Figure 28:
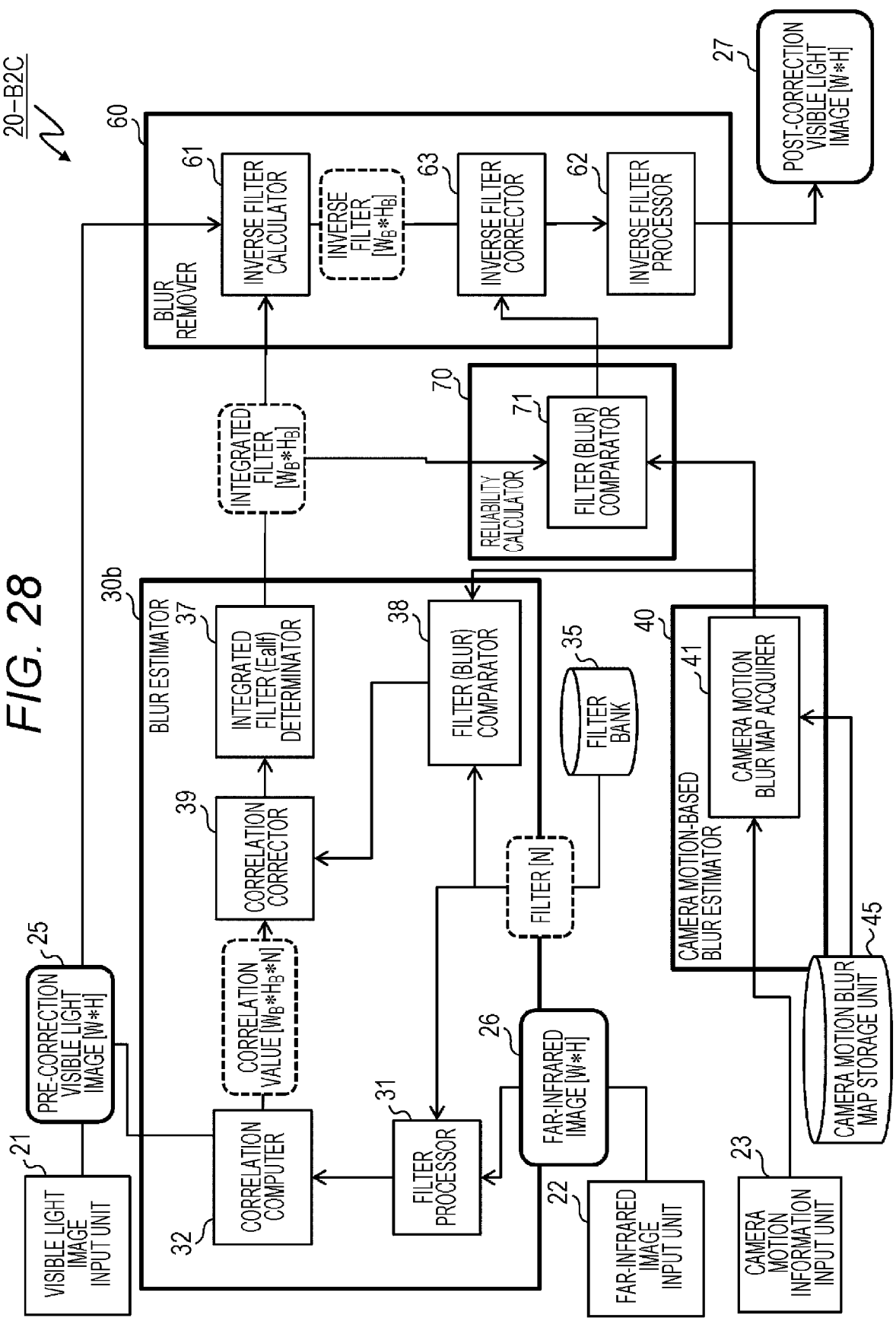
FIG. 28 illustrates a diagram for describing an example of the processing executed by the image processing device of the fourth embodiment of the present disclosure.

The image processing device B2+C, 20-B2C illustrated in FIG. 28 is configured such that the reliability calculator 70 is added to the configuration of the image processing device B2, 20-B2 described earlier with reference to FIG. 17 and the inverse filter corrector 63 is further added to the blur remover 60.

Other configurations are the same as those of the image processing device B2, 20-B2 illustrated in FIG. 17.

The processing executed by the reliability calculator 70 and the inverse filter corrector 63 is processing similar to the processing executed by the image processing device B1+C, 20-B1C described earlier with reference to FIG. 27.

That is, the reliability calculator 70 of the image processing device B2+C, 20-B2C illustrated in FIG. 28 performs, between the corresponding blocks positioned at the same position on the image, the processing of comparing the integrated filter (blur) and the camera motion-based filter (blur).

In a case where the degree of similarity between the two filters (blurs) as the result of such comparison processing is high, the value of the degree of reliability is set high. In a case where the degree of similarity is low, the value of the degree of reliability is set low.

The filter (blur) comparator 71 of the reliability calculator 70 illustrated in FIG. 28 outputs the calculated degree of reliability to the inverse filter corrector 63 of the blur remover 60.

The inverse filter corrector 63 adjusts, according to the degree of reliability input from the reliability calculator 70, the strength of the inverse filter applied in the inverse filter processor 62.

For example, in the case of a high degree of reliability input from the reliability calculator 70, the coefficient set to the inverse filter calculated by the inverse filter calculator 61 is directly utilized without a decrease in the strength of the inverse filter applied in the inverse filter processor 62. That is, the inverse filter calculated by the inverse filter calculator 61 is directly applied to the processing target block of the pre-correction visible light image 25.

On the other hand, in the case of a low degree of reliability input from the reliability calculator 70, the strength of the inverse filter applied in the inverse filter processor 62 is decreased. That is, the coefficient set to the inverse filter calculated by the inverse filter calculator 61 is adjusted to lower the inverse filter application effect.

As described above, in the present embodiment, the inverse filter application processing according to the degree of reliability of the estimated filter (blur) is also implemented. The inverse filter application effect can be enhanced for the block with a high degree of reliability, and can be suppressed low for the block with a low degree of reliability. The effective blur elimination processing can be performed according to the degree of reliability.

Next, a sequence of the processing in the fourth embodiment described with reference to FIGS. 27 to 28, i.e., the image processing device with the configuration (B1+C) and the configuration (B2+C), will be described with reference to flowcharts illustrated in FIG. 29 and a subsequent figure.

Figure 29:
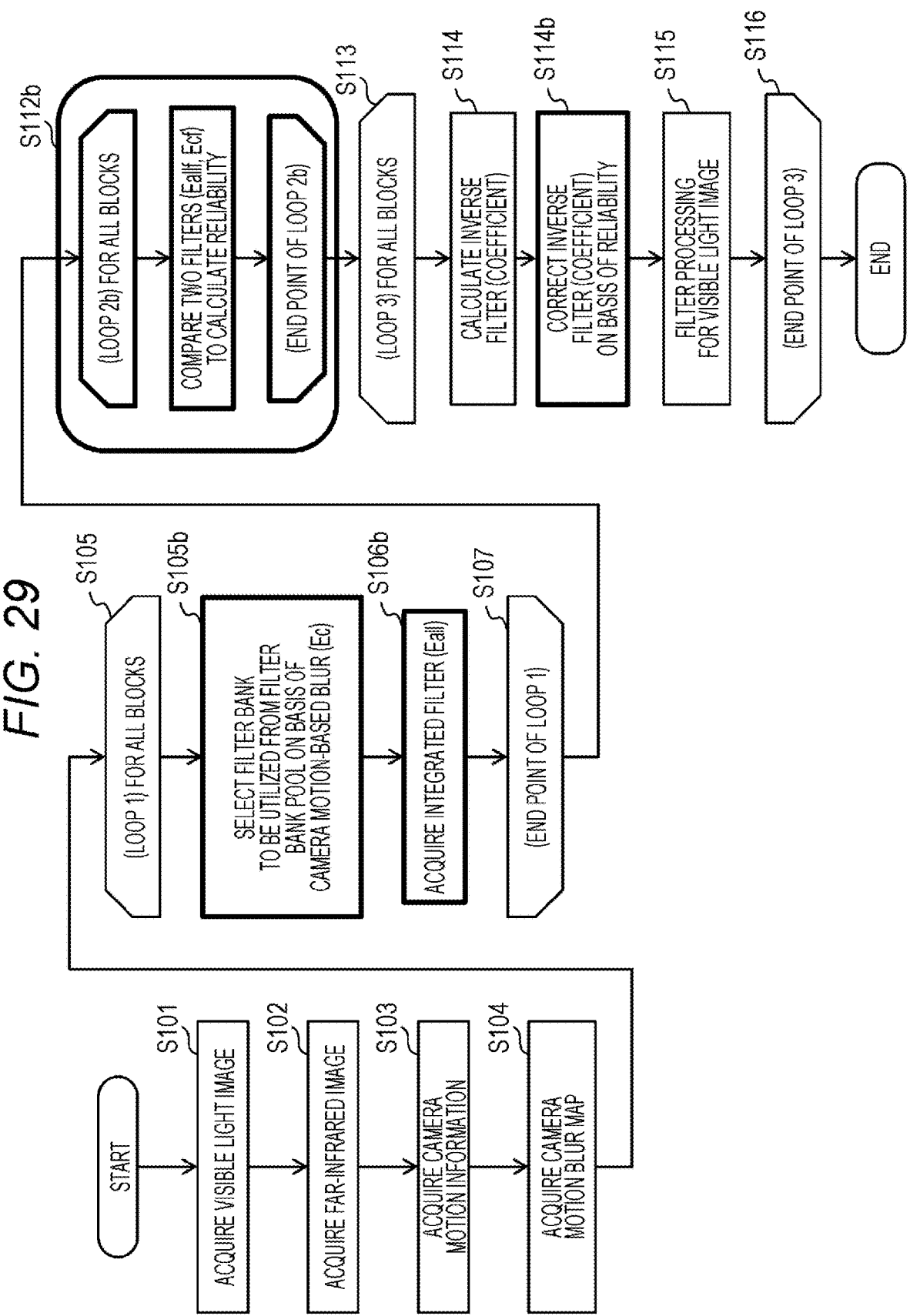
FIG. 29 illustrates a flowchart for describing a sequence of the processing executed by the image processing device of the fourth embodiment of the present disclosure.

The flowchart illustrated in FIG. 29 is a flowchart for describing a sequence of the processing executed by the configuration B1+C described earlier with reference to FIG. 27, i.e., the image processing device configured to calculate the degree of reliability of the filter (blur) estimation result to perform the blur removing processing according to the degree of reliability in (B1) the device configured to select the filter to be applied to the far-infrared image, i.e., the filter for generating the blur (defocusing), on the basis of the camera motion-based blur (Ec).

The flowchart illustrated in FIG. 29 is a flowchart that processing of a step S112*b* and a step S114*b* is added to the processing of the steps S101 to S116 of the processing flow executed by the image processing device corresponding to the "configuration B1" of FIG. 15 as described earlier with reference to FIG. 19.

Other processing than the step S112*b* and the step S114*b* as additional processing is similar to the processing of the steps S101 to S116 of the flow described with reference to FIG. 19.

Moreover, the processing of the step S112*b* and the step S114*b* as the additional processing is processing similar to the processing of the step S112*b* and the step S114*b* as the processing of the image processing device of the configuration A1+C as described with reference to the flowchart of FIG. 25.

Note that data as a comparison target upon calculation of the degree of reliability is the image-based filter (blur) and the camera motion-based filter (blur) at the step S112*b* as the processing of the image processing device with the configuration A1+C as described with reference to the flowchart of FIG. 25, but in the configuration B1+C, the data as the comparison target upon calculation of the degree of reliability at the step S112*b* is the integrated filter (blur) and the camera motion-based filter (blur).

A difference is only the above-described point.

At the step S112*b* in a flow illustrated in FIG. 29, the processing of comparing the integrated filter (blur) and the camera motion-based filter (blur) is performed between the corresponding blocks at the same position on the image.

In a case where the degree of similarity between the two filters (blurs) as the result of such comparison processing is high, the value of the degree of reliability is set high. In a case where the degree of similarity is low, the value of the degree of reliability is set low.

The filter (blur) comparator 71 of the reliability calculator 70 outputs the calculated degree of reliability to the inverse filter corrector 63 of the blur remover 60.

The inverse filter corrector 63 adjusts, according to the degree of reliability input from the reliability calculator 70, the strength of the inverse filter applied in the inverse filter processor 62.

For example, in the case of a high degree of reliability input from the reliability calculator 70, the coefficient set to the inverse filter calculated by the inverse filter calculator 61 is directly utilized without a decrease in the strength of the inverse filter applied in the inverse filter processor 62. That is, the inverse filter calculated by the inverse filter calculator 61 is directly applied to the processing target block of the pre-correction visible light image 25.

On the other hand, in the case of a low degree of reliability input from the reliability calculator 70, the strength of the inverse filter applied in the inverse filter processor 62 is decreased. That is, the coefficient set to the inverse filter calculated by the inverse filter calculator 61 is adjusted to lower the inverse filter application effect.

As described above, in the present embodiment, the inverse filter application processing according to the degree of reliability of the estimated filter (blur) is also implemented. The inverse filter application effect can be enhanced for the block with a high degree of reliability, and can be suppressed low for the block with a low degree of reliability. The effective blur elimination processing can be performed according to the degree of reliability.

Next, a sequence of the processing executed by the configuration B2+C described with reference to FIG. 28, i.e., the image processing device configured to calculate the degree of reliability of the filter (blur) estimation result to perform the blur removing processing according to the degree of reliability in (B2) the device configured to correct the correlation value between the filter-applied far-infrared image and the blurred visible light image on the basis of the camera motion-based blur (Ec), will be described with reference to the flowchart illustrated in FIG. 30.

Figure 30:
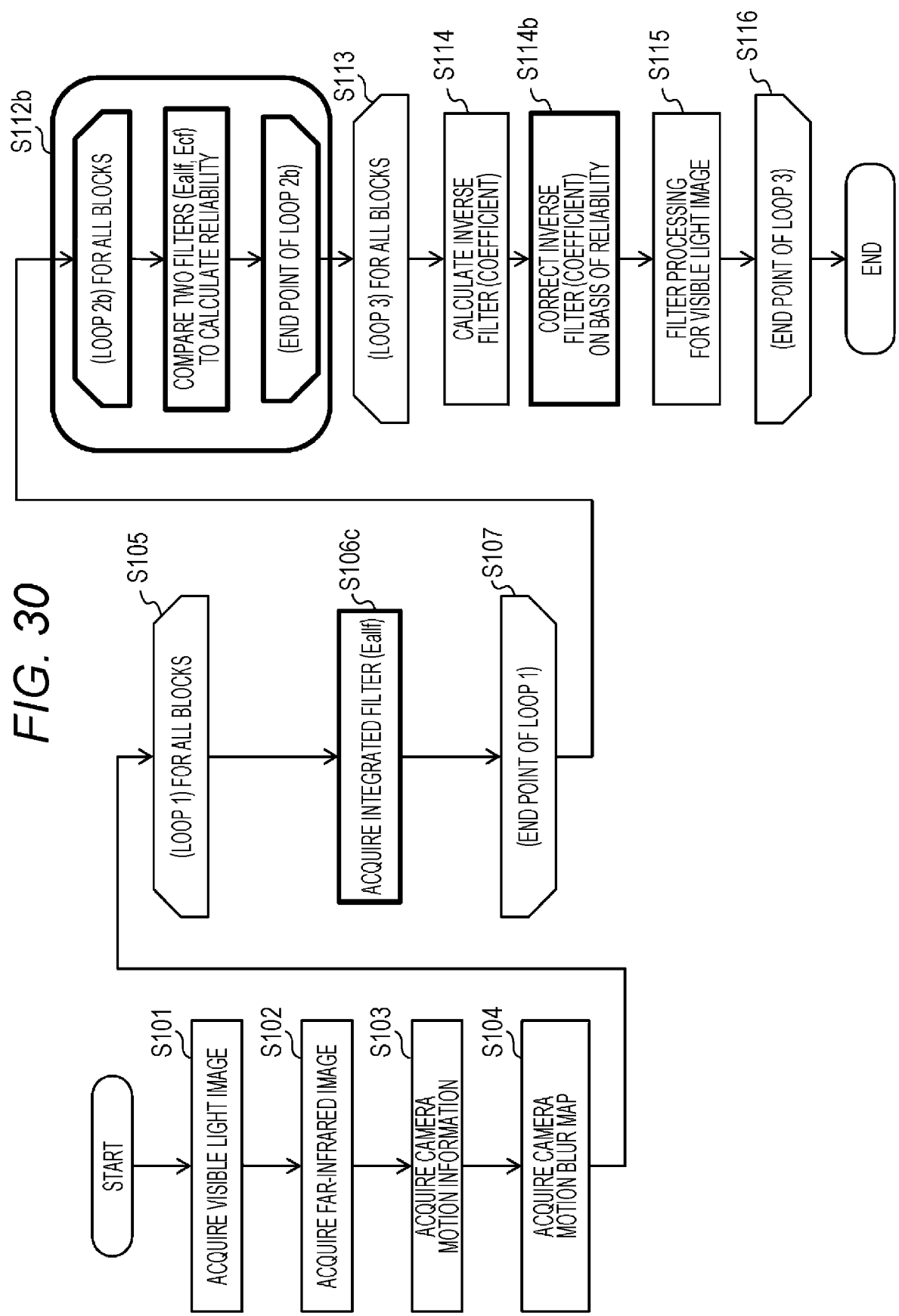
FIG. 30 illustrates a flowchart for describing a sequence of the processing executed by the image processing device of the fourth embodiment of the present disclosure.

The flowchart illustrated in FIG. 30 is a flowchart that the processing of the step S112*b* and the step S114*b* is added to the processing of the steps S101 to S116 of the processing flow executed by the image processing device corresponding to the "configuration B2" of FIG. 17 as described earlier with reference to FIG. 20.

Other processing than the step S112*b* and the step S114*b* as the additional processing is similar to the processing of the steps S101 to S116 of the flow described with reference to FIG. 20.

Moreover, the processing of the step S112*b* and the step S114*b* as the additional processing is processing similar to the processing of the step S112*b* and the step S114*b* as the processing of the image processing device of the configuration B1+C as described above with reference to FIG. 29.

At the step S112*b* in a flow illustrated in FIG. 30, the processing of comparing the integrated filter (blur) and the camera motion-based filter (blur) is performed between the corresponding blocks at the same position on the image.

In a case where the degree of similarity between the two filters (blurs) as the result of such comparison processing is high, the value of the degree of reliability is set high. In a case where the degree of similarity is low, the value of the degree of reliability is set low.

The filter (blur) comparator 71 of the reliability calculator 70 outputs the calculated degree of reliability to the inverse filter corrector 63 of the blur remover 60.

The inverse filter corrector 63 adjusts, according to the degree of reliability input from the reliability calculator 70, the strength of the inverse filter applied in the inverse filter processor 62.

For example, in the case of a high degree of reliability input from the reliability calculator 70, the coefficient set to the inverse filter calculated by the inverse filter calculator 61 is directly utilized without a decrease in the strength of the inverse filter applied in the inverse filter processor 62. That is, the inverse filter calculated by the inverse filter calculator 61 is directly applied to the processing target block of the pre-correction visible light image 25.

On the other hand, in the case of a low degree of reliability input from the reliability calculator 70, the strength of the inverse filter applied in the inverse filter processor 62 is decreased. That is, the coefficient set to the inverse filter calculated by the inverse filter calculator 61 is adjusted to lower the inverse filter application effect.

As described above, in the present embodiment, the inverse filter application processing according to the degree of reliability of the estimated filter (blur) is also implemented. The inverse filter application effect can be enhanced for the block with a high degree of reliability, and can be suppressed low for the block with a low degree of reliability. The effective blur elimination processing can be performed according to the degree of reliability.

9. Hardware Configuration Example of Image Processing Device

Figure 31:
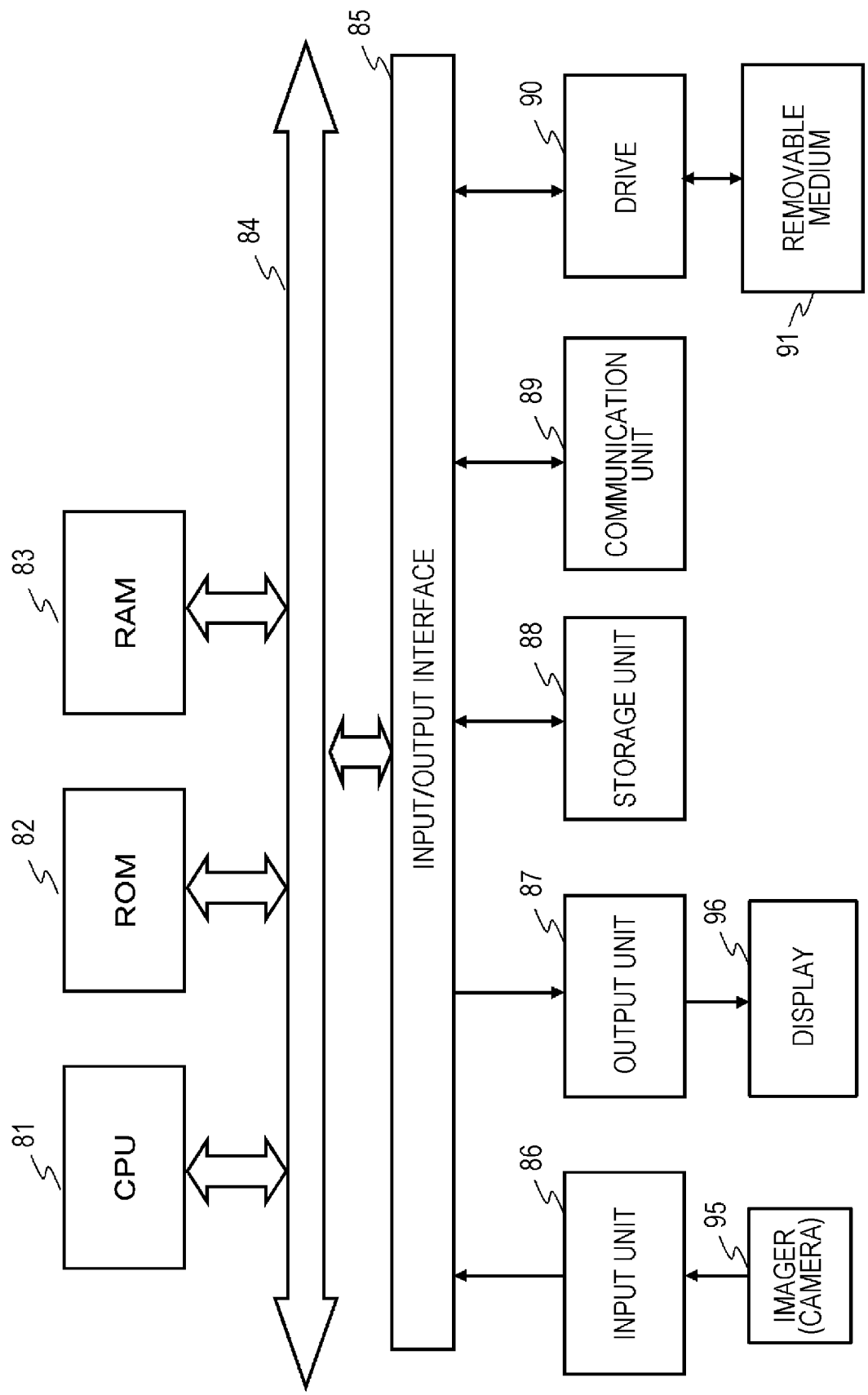
FIG. 31 illustrates a diagram for describing a hardware configuration example of the image processing device.

Next, a hardware configuration example of the image processing device will be described with reference to FIG. 31. FIG. 31 is a diagram of the hardware configuration example of the image processing device configured to execute the processing of the present disclosure.

A central processing unit (CPU) 81 functions as a controller or a data processor configured to execute various types of processing according to a program stored in a read only memory (ROM) 82 or a storage unit 88. For example, the CPU 81 executes the processing according to the sequence described in the above-described embodiments. In a random access memory (RAM) 83, e.g., the program or data to be executed by the CPU 81 is stored. The CPU 81, the ROM 82, and the RAM 83 are connected together via a bus 84.

The CPU 81 is connected to an input/output interface 85 via the bus 84. An input unit 86 configured to input an image captured by an imager 95 including a visible light camera, an infrared (far-infrared) camera, and the like, and including various user imputable switches, a keyboard, a mouse, a microphone, and the like, and an output unit 87 configured to execute data output to a display 96, a speaker, and the like are connected to the input/output interface 85. The CPU 81 executes various types of processing in response to an instruction input from the input unit 86, and outputs a processing result to, e.g., the output unit 87.

The storage unit 88 connected to the input/output interface 85 includes a hard drive and the like, for example, and stores the program or various types of data to be executed by the CPU 81. A communication unit 89 functions as a transmitter/receiver for data communication via Wi-Fi communication, the Bluetooth (registered trademark) (BT) communication, or other networks such as the Internet and a local area network, thereby communicating with an external device.

A drive 90 connected to the input/output interface 85 drives a removable medium 91 such as a magnetic disc, an optical disc, a magneto-optical disc, or a semiconductor memory such as a memory card, thereby executing data recording or reading.

10. Configuration Example of Vehicle Control System Including Image Processing Device of Present Disclosure in Vehicle Next, one configuration example of a vehicle control system including, in a vehicle, the above-described image processing device of the present disclosure will be described.

Figure 32:
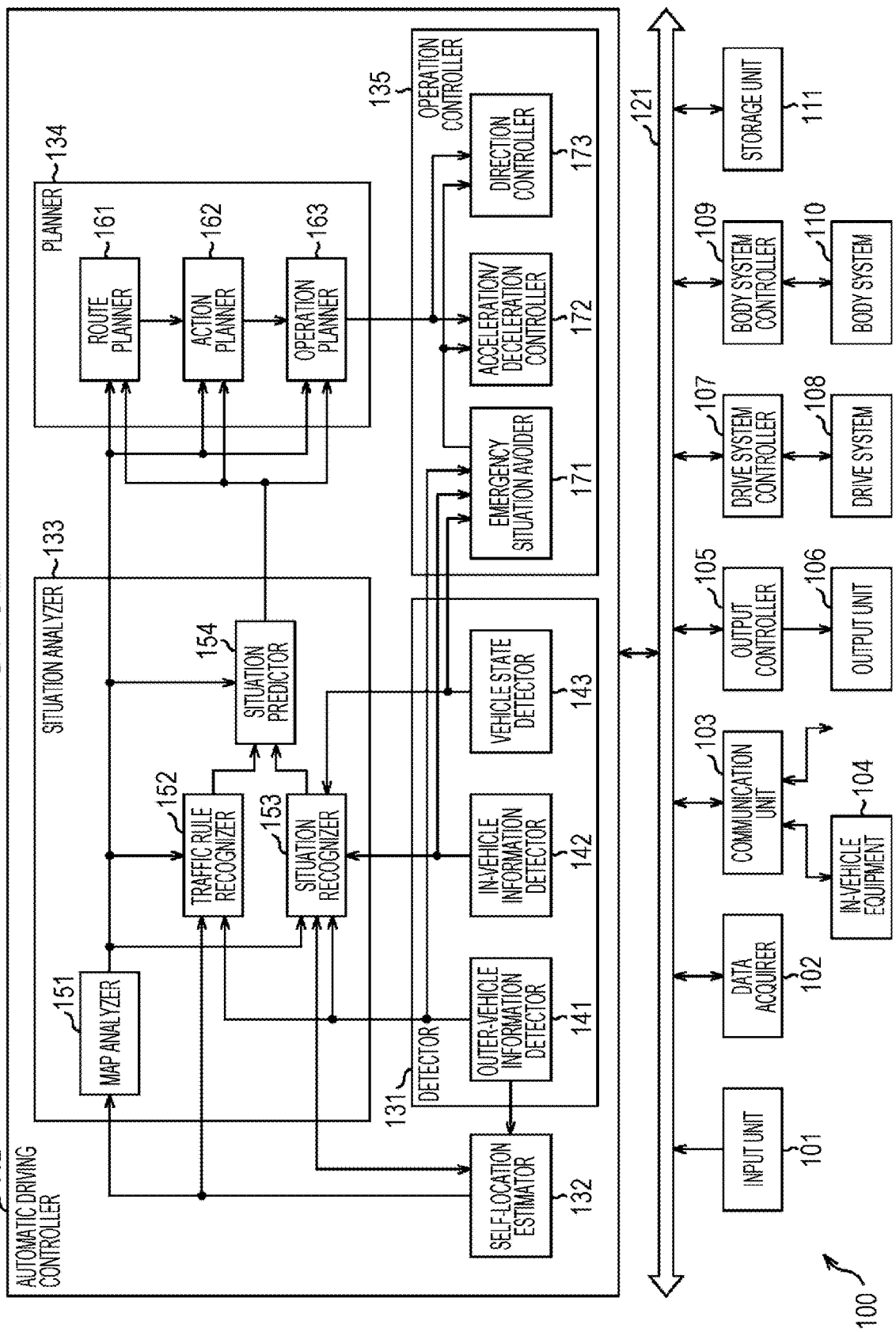
FIG. 32 illustrates a diagram for describing a configuration example of a vehicle control system having the function of the image processing device of the present disclosure.

FIG. 32 is a schematic block diagram of a functional configuration example of a vehicle control system 100 including the image processing device configured to execute the above-described processing.

Note that the above-described image processing device of the present disclosure corresponds to part of configurations of a detector 131, a data acquirer 102, an output controller 105, and an output unit 106 of the vehicle control system 100 illustrated in FIG. 32.

The processing executed by the above-described image processing device of the present disclosure is mainly executed by an outer-vehicle information detector 141 of the detector 131 of the vehicle control system 100 illustrated in FIG. 32.

The data acquirer 102 of the vehicle control system 100 illustrated in FIG. 32 includes a visible light camera, an infrared (far-infrared) camera, and a sensor such as an IMU, and the detector 131 receives images captured by these cameras and vehicle motion information (=the camera motion information) to execute the above-described processing.

Note that a processing result is, for example, displayed on a display forming the output unit 106 of the vehicle control system 100 illustrated in FIG. 32, and is checked by a user (a driver).

Hereinafter, the configuration of the vehicle control system 100 illustrated in FIG. 32 will be described.

Note that in a case where the vehicle provided with the vehicle control system 100 is distinguished from other vehicles, such a vehicle will be hereinafter described as a subject car or a subject vehicle.

The vehicle control system 100 includes an input unit 101, the data acquirer 102, a communication unit 103, in-vehicle equipment 104, the output controller 105, the output unit 106, a drive system controller 107, a drive system 108, a body system controller 109, a body system 110, a storage unit 111, and an automatic driving controller 112. The input unit 101, the data acquirer 102, the communication unit 103, the output controller 105, the drive system controller 107, the body system controller 109, the storage unit 111, and the automatic driving controller 112 are connected together via a communication network 121. The communication network 121 includes, for example, an in-vehicle communication network, a bus, or the like in accordance with an optional standard such as a controller area network (CAN), a local interconnect network (LIN), a local area network (LAN), or FlexRay (registered trademark). Note that each unit of the vehicle control system 100 may be directly connected without the communication network 121.

Note that in a case where each unit of the vehicle control system 100 performs communication via the communication network 121, the communication network 121 will not be described hereinafter. For example, in a case where the input unit 101 and the automatic driving controller 112 communicate with each other via the communication network 121, it is merely described as the input unit 101 and the automatic driving controller 112 communicating with each other.

The input unit 101 includes a device used for inputting various types of data, instructions, and the like by a passenger. For example, the input unit 101 includes an operation device such as a touch panel, a button, a microphone, a switch, and a lever; and an operation device allowing input by other methods than manual operation, such as audio or gesture, for example. Moreover, the input unit 101 may be, for example, a remote control device utilizing infrared light or other radio waves, or external connection equipment such as mobile equipment or wearable equipment compatible with operation of the vehicle control system 100. The input unit 101 generates an input signal on the basis of, e.g., the data or instruction input by the passenger, and supplies the input signal to each unit of the vehicle control system 100.

The data acquirer 102 includes, for example, various sensors configured to acquire data used for the processing of the vehicle control system 100, and supplies the acquired data to each unit of the vehicle control system 100.

For example, the data acquirer 102 includes various sensors for detecting the state of the subject car and the like. Specifically, the data acquirer 102 includes, for example, a gyro sensor, an acceleration sensor, inertial measurement unit (IMU), and a sensor for detecting an accelerator pedal operation amount, a brake pedal operation amount, a steering wheel steering angle, the number of rotations of an engine, the number of rotations of a motor, wheel rotation speed, and the like.

Moreover, the data acquirer 102 includes, for example, various sensors for detecting information regarding the outside of the subject car. Specifically, the data acquirer 102 includes, for example, an imaging device such as a time-of-flight (ToF) camera, a visible light camera, a stereo camera, a monocular camera, an infrared (far-infrared) camera, and other cameras. Further, the data acquirer 102 includes, for example, an environment sensor for detecting, e.g., weather or meteorological phenomena, and a peripheral information detection sensor for detecting an object around the subject car. The environment sensor includes, for example, a raindrop sensor, a fog sensor, a solar irradiation sensor, a snow sensor, and the like. The peripheral information detection sensor includes, for example, an ultrasonic sensor, a radar, light detection and ranging, laser imaging detection and ranging (LiDAR), a sonar, and the like.

In addition, the data acquirer 102 includes, for example, various sensors for detecting the current position of the subject car. Specifically, the data acquirer 102 includes, for example, a global navigation satellite system (GNSS) receiver configured to receive a GNSS signal from a GNSS satellite and the like.

Moreover, the data acquirer 102 includes, for example, various sensors for detecting in-vehicle information. Specifically, the data acquirer 102 includes, for example, an imaging device configured to image the driver, a biological sensor configured to detect driver's biological information, a microphone configured to collect audio in a vehicle interior, and the like. The biological sensor is, for example, provided at a seating surface, a steering wheel, or the like, thereby detecting the biological information of the passenger seated on a seat or the driver holding the steering wheel.

The communication unit 103 communicates with, e.g., the in-vehicle equipment 104 and various types of equipment, servers, and base stations outside the vehicle, thereby transmitting the data supplied from each unit of the vehicle control system 100 or supplying the received data to each unit of the vehicle control system 100. Note that a communication protocol supported by the communication unit 103 is not specifically limited, and the communication unit 103 can support multiple types of communication protocols.

For example, the communication unit 103 performs wireless communication with the in-vehicle equipment 104 via a wireless LAN, the Bluetooth (registered trademark), near field communication (NFC), a wireless USB (WUSB), or the like. Moreover, the communication unit 103 performs, for example, wired communication with the in-vehicle equipment 104 via a not-shown connection terminal (and a cable as necessary) by a universal serial bus (USB), a high-definition multimedia interface (HDMI) (registered trademark), a mobile high-definition link (MHL), or the like.

Further, the communication unit 103 communicates, for example, with equipment (e.g., an application server or a control server) present on an external network (e.g., the Internet, a cloud network, or a network unique to a business operator) via a base station or an access point. Moreover, the communication unit 103 uses, for example, a peer-to-peer (P2P) technology to communicate with a terminal (e.g., a terminal of a pedestrian or a store or a machine type communication (MTC) terminal) present near the subject car. Further, the communication unit 103 performs, for example, V2X communication such as vehicle-to-vehicle communication, vehicle-to-infrastructure communication, vehicle-to-home communication, or vehicle-to-pedestrian communication. Moreover, the communication unit 103 includes, for example, a beacon receiver to receive a radio wave or an electromagnetic wave transmitted from, e.g., a wireless station placed on a road, thereby acquiring information such as a current position, traffic jam, traffic regulation, or required time.

The in-vehicle equipment 104 includes, for example, mobile equipment or wearable equipment of the passenger, information equipment installed or attached to the subject car, a navigation device configured to search a path to an optional destination, and the like.

The output controller 105 controls output of various types of information to the passenger of the subject car or the outside of the subject car. For example, the output controller 105 generates an output signal containing at least one of visual information (e.g., image data) or audio information (e.g., audio data), and supplies the output signal to the output unit 106. In this manner, the output controller 105 controls output of the visual information and the audio information from the output unit 106. Specifically, the output controller 105 synthesizes, for example, image data captured by different imaging devices of the data acquirer 102 to generate, e.g., a bird's-eye image or a panoramic image, thereby supplying the output signal containing the generated image to the output unit 106. Moreover, the output controller 105 generates, for example, generates audio data containing, e.g., a warning tone or a warning message against a risk such as collision, contact, and entrance into a danger area, thereby supplying the output signal containing the generated audio data to the output unit 106.

The output unit 106 includes a device configured to output the visual information or the audio information to the passenger of the subject car or the outside of the subject car. For example, the output unit 106 includes, for example, a display device, an instrument panel, an audio speaker, headphones, a wearable device such as a spectacle display attached to the passenger, a projector, and a lamp. The display device provided at the output unit 106 may be not only a device having a typical display, but also a device configured to display the visual information in the field of view of the driver, such as a head-up display, a transmissive display, and a device with an augmented reality (AR) display function, for example.

The drive system controller 107 generates various control signals and supplies these signals to the drive system 108, thereby controlling the drive system 108. Moreover, the drive system controller 107 supplies, as necessary, the control signal to each unit other than the drive system 108, thereby notifying a control state of the drive system 108, for example.

The drive system 108 includes various devices in connection with a drive system of the subject car. For example, the drive system 108 includes a drive force generation device for generating drive force of an internal-combustion engine, a drive motor, or the like, a drive force transmission mechanism for transmitting drive force to a wheel, a steering mechanism configured to adjust a rudder angle, a braking device configured to generate braking force, an antilock brake system (ABS), an electronic stability control (ESC), an electrically-assisted power steering device, and the like.

The body system controller 109 generates various control signals and supplies these signals to the body system 110, thereby controlling the body system 110. Moreover, the body system controller 109 supplies, as necessary, the control signal to each unit other than body system 110, thereby notifying a control state of the body system 110, for example.

The body system 110 includes various devices of a body system installed on a vehicle body. For example, the body system 110 includes a keyless entry system, a smart key system, a power window device, a power seat, a steering wheel, an air-conditioning device, various lamps (e.g., a head lamp, a back lamp, a brake lamp, an indicator, a fog lamp, and the like), and the like.

For example, the storage unit 111 includes a magnetic storage device, a semiconductor storage device, an optical storage device, and a magneto-optical storage device, such as a read only memory (ROM), a random access memory (RAM), a hard disc drive (HDD), and the like. The storage unit 111 stores, e.g., various programs or data used by each unit of the vehicle control system 100. For example, the storage unit 111 stores map data including, e.g., a three-dimensional high-accuracy map such as a dynamic map, a global map having lower accuracy than the high-accuracy map and covering a broad area, and a local map containing information around the subject car.

The automatic driving controller 112 performs control regarding automatic driving such as autonomous running or drive assist. Specifically, the automatic driving controller 112 performs, for example, cooperative control for the purpose of implementing an advanced driver assistance system (ADAS) function including, e.g., collision avoidance or impact attenuation of the subject car, follow-up running based on an inter-vehicular distance, vehicle speed maintaining running, subject car collision warning, or subject car lane deviation warning. Moreover, the automatic driving controller 112 performs, for example, cooperative control for the purpose of, e.g., automatic driving for autonomous running regardless of operation of the driver. The automatic driving controller 112 includes the detector 131, a self-location estimator 132, a situation analyzer 133, a planner 134, and an operation controller 135.

The detector 131 detects various types of information necessary for control of automatic driving. The detector 131 includes the outer-vehicle information detector 141, an in-vehicle information detector 142, and a vehicle state detector 143.

The outer-vehicle information detector 141 performs the processing of detecting information outside the subject car on the basis of the data or signal from each unit of the vehicle control system 100. For example, the outer-vehicle information detector 141 performs the processing of detecting, recognizing, and tracking the object around the subject car and the processing of detecting a distance to the object. The object as a detection target includes, for example, a vehicle, a person, an obstacle, a structure, a road, a traffic light, a traffic sign, a road indication, and the like. Moreover, the outer-vehicle information detector 141 performs, for example, the processing of detecting environment around the subject car. The surrounding environment as the detection target includes, for example, weather, an air temperature, a humidity, brightness, a road condition, and the like. The outer-vehicle information detector 141 supplies data indicating a detection processing result to the self-location estimator 132, a map analyzer 151, a traffic rule recognizer 152, and a situation recognizer 153 of the situation analyzer 133, and an emergency situation avoider 171 of the operation controller 135, for example.

The in-vehicle information detector 142 performs the processing of detecting information in the vehicle on the basis of the data or signal from each unit of the vehicle control system 100. For example, the in-vehicle information detector 142 performs the processing of authenticating and recognizing the driver, the processing of detecting the state of the driver, the processing of detecting the passenger, the processing of detecting environment in the vehicle, and the like. The state of the driver as the detection target includes, for example, a physical condition, the degree of consciousness, the degree of concentration, the degree of fatigue, the line of sight, and the like. The in-vehicle environment as the detection target includes, for example, an air temperature, a humidity, brightness, smell, and the like. The in-vehicle information detector 142 supplies data indicating a detection processing result to the situation recognizer 153 of the situation analyzer 133 and the emergency situation avoider 171 of the operation controller 135, for example.

The vehicle state detector 143 performs the processing of detecting the state of the subject car on the basis of the data or signal from each unit of the vehicle control system 100. The state of the subject car as the detection state includes, for example, a speed, an acceleration, a rudder angle, the presence/absence and contents of an abnormality, a driving operation state, the position and inclination of the power seat, a door locking state, other in-vehicle equipment states, and the like. The vehicle state detector 143 supplies data indicating a detection processing result to the situation recognizer 153 of the situation analyzer 133 and the emergency situation avoider 171 of the operation controller 135, for example.

The self-location estimator 132 performs the processing of estimating the position, posture, and the like of the subject car on the basis of the data or signal from each unit of the vehicle control system 100, such as the outer-vehicle information detector 141 and the situation recognizer 153 of the situation analyzer 133. Moreover, the self-location estimator 132 generates, as necessary, a local map (hereinafter referred to as a self-location estimation map) used for estimation of the self-location. The self-location estimation map is, for example, a high-accuracy map using a technology such as simultaneous localization and mapping (SLAM). The self-location estimator 132 supplies data indicating an estimation processing result to the map analyzer 151, the traffic rule recognizer 152, and the situation recognizer 153 of the situation analyzer 133, for example. Moreover, the self-location estimator 132 stores the self-location estimation map in the storage unit 111.

The situation analyzer 133 performs the processing of analyzing a subject car situation or a surrounding situation. The situation analyzer 133 includes the map analyzer 151, the traffic rule recognizer 152, the situation recognizer 153, and a situation predictor 154.

As necessary, the map analyzer 151 uses the data or signal from each unit of the vehicle control system 100, such as the self-location estimator 132 and the outer-vehicle information detector 141, to perform the processing of analyzing various maps stored in the storage unit 111, thereby building a map containing information necessary for automatic driving processing. The map analyzer 151 supplies the built map to the traffic rule recognizer 152, the situation recognizer 153, the situation predictor 154, and a route planner 161, an action planner 162, an operation planner 163 of the planner 134, for example.

The traffic rule recognizer 152 performs the processing of recognizing a traffic rule around the subject car on the basis of the data or signal from each unit of the vehicle control system 100, such as the self-location estimator 132, the outer-vehicle information detector 141, and the map analyzer 151. By such recognition processing, the position and state of the traffic light around the subject car, the contents of the traffic regulation around the subject car, a drivable lane, and the like are recognized, for example. The traffic rule recognizer 152 supplies data indicating a recognition processing result to the situation predictor 154, for example.

The situation recognizer 153 performs the processing of recognizing a situation regarding the subject car on the basis of the data or signal from each unit of the vehicle control system 100, such as the self-location estimator 132, the outer-vehicle information detector 141, the in-vehicle information detector 142, the vehicle state detector 143, and the map analyzer 151. For example, the situation recognizer 153 performs the processing of recognizing, e.g., a subject car situation, a subject car surrounding situation, and a subject car driver situation. Moreover, the situation recognizer 153 generates, as necessary, a local map (hereinafter referred to as a "situation recognition map") used for recognition of the subject car surrounding situation. The situation recognition map is, for example, an occupancy grid map.

The subject car situation as a recognition target includes, for example, the position, posture, and motion (e.g., a speed, an acceleration, a movement direction, and the like) of the subject car and the presence/absence and contents of an abnormality, for example. The subject car surrounding situation as the recognition target includes, for example, the type and position of a surrounding stationary object, the type, position, and motion (e.g., a speed, an acceleration, a movement direction, and the like) of a surrounding animal body, a surrounding road configuration, a surrounding road surface condition, surrounding weather, a surrounding air temperature, a surrounding humidity, surrounding brightness, and the like. The state of driver as the recognition target includes, for example, a physical condition, the degree of consciousness, the degree of concentration, the degree of fatigue, eye movement, and driving operation.

The situation recognizer 153 supplies data (as necessary, containing the situation recognition map) indicating a recognition processing result to the self-location estimator 132 and the situation predictor 154, for example. Moreover, the situation recognizer 153 stores the situation recognition map in the storage unit 111.

The situation predictor 154 performs the processing of predicting the situation regarding the subject car on the basis of the data or signal from each unit of the vehicle control system 100, such as the map analyzer 151, the traffic rule recognizer 152, and the situation recognizer 153. For example, the situation predictor 154 performs the processing of predicting the subject car situation, the subject car surrounding situation, the driver situation, and the like.

The subject car situation as a prediction target includes, for example, subject car behavior, occurrence of an abnormality, a drivable distance, and the like. The subject car surrounding situation as the prediction target includes, for example, behavior of an animal body around the subject car, a change in the state of the traffic light, a change in environment such as weather, and the like. The driver situation as the prediction target includes, for example, behavior, a physical condition, and the like of the driver.

The situation predictor 154 supplies, together with data from the traffic rule recognizer 152 and the situation recognizer 153, data indicating a prediction processing result to the route planner 161, the action planner 162, and the operation planner 163 of the planner 134, for example.

The route planner 161 plans the route to the destination on the basis of the data or signal from each unit of the vehicle control system 100, such as the map analyzer 151 and the situation predictor 154. For example, the route planner 161 sets a route to a destination specified from a current position on the basis of the global map. Moreover, for example, the route planner 161 changes the route as necessary on the basis of a situation such as traffic jam, an accident, traffic regulation, and construction, the physical condition of the driver, and the like. The route planner 161 supplies data indicating the planned route to the action planner 162, for example.

On the basis of the data or signal from each unit of the vehicle control system 100, such as the map analyzer 151 and the situation predictor 154, the action planner 162 plans subject car action for safe running within planned time along the route planned by the route planner 161. For example, the action planner 162 performs planning for starting, stopping, a travelling direction (e.g., advancing, retreating, left turn, right turn, a direction change, and the like), a running lane, a running speed, and overtaking. The action planner 162 supplies data indicating the planned subject car action to the operation planner 163, for example.

The operation planner 163 plans subject car operation for implementing the action planned by the action planner 162 on the basis of the data or signal from each unit of the vehicle control system 100, such as the map analyzer 151 and the situation predictor 154. For example, the operation planner 163 performs planning for acceleration, deceleration, a running path, and the like. The operation planner 163 supplies data indicating the planned subject car operation to an acceleration/deceleration controller 172 and a direction controller 173 of the operation controller 135, for example.

The operation controller 135 performs control of the subject car operation. The operation controller 135 includes the emergency situation avoider 171, the acceleration/deceleration controller 172, and the direction controller 173.

On the basis of detection results of the outer-vehicle information detector 141, the in-vehicle information detector 142, and the vehicle state detector 143, the emergency situation avoider 171 performs the processing of detecting an emergency situation such as collision, contact, entrance into a danger area, a driver abnormality, and a vehicle abnormality. In the case of detecting occurrence of the emergency situation, the emergency situation avoider 171 plans the subject car operation for avoiding the emergency situation, such as sudden stop and sharp turn. The emergency situation avoider 171 supplies data indicating the planned subject car operation to the acceleration/deceleration controller 172 and the direction controller 173, for example.

The acceleration/deceleration controller 172 performs acceleration/deceleration control for implementing the subject car operation planned by the operation planner 163 or the emergency situation avoider 171. For example, the acceleration/deceleration controller 172 computes a control target value of the drive force generation device or the braking device for implementing planned acceleration, deceleration, or sudden stop, thereby supplying a control instruction indicating the computed control target value to the drive system controller 107.

The direction controller 173 performs direction control for implementing the subject car operation planned by the operation planner 163 or the emergency situation avoider 171. For example, the direction controller 173 computes a control target value of the steering mechanism for implementing the running path or sharp turn planned by the operation planner 163 or the emergency situation avoider 171, thereby supplying a control instruction indicating the computer control target value to the drive system controller 107.

11. Summary of Configuration of Present Disclosure

The embodiments of the present disclosure have been described above in detail with reference to specific examples. However, it is obvious that modification or substitution can be made to the embodiments by those skilled in the art without departing from the gist of the present disclosure. That is, the present disclosure has been disclosed in the form of examples, and shall not be interpreted in a limited way. For determining the gist of the present disclosure, the claims needs to be referred.

Note that the technology disclosed in the present specification can employ the following configurations.

(1)
An image processing device, comprising:
image processing circuitry configured to:
receive input of a visible-ray image and an infrared-ray image obtained by photographing a same subject;
estimate, based on the visible-ray image, the infrared-ray image and motion information, a blur estimate associated with the visible-ray image; and
generate, based on the estimated blur estimate, a corrected visible-ray image.

(2)
The image processing device of (1), wherein the infrared-ray image is a far-infrared-ray image.

(3)
The image processing device of (1), wherein estimating the blur estimate associated with the visible-ray image comprises:
estimating, based on the visible-ray image and the infrared-ray image, an image-based blur estimate;
estimating, based on the motion information, a motion-based blur estimate; and
estimating the blur estimate associated with the visible-ray image based on the image-based blur estimate and the motion-based blur estimate.

(4)
The image processing device of (3), wherein estimating the image-based blur estimate comprises:
applying each of a plurality of filters having different blurring characteristics to the infrared-ray image to produce a plurality of blurred infrared-ray images;
comparing the visible-ray image to the plurality of blurred infrared-ray images; and
selecting a filter from among the plurality of filters that produced a blurred infrared-ray image having blurring most similar to the visible-ray image.

(5)
The image processing device of (4), wherein the different blurring characteristics correspond to different point-spread functions.

(6)
The image processing device of (4), wherein comparing the visible-ray image to the plurality of blurred infrared images comprises:
calculating correlation values between the visible-ray image and each of the plurality of blurred infrared-ray images, and
wherein selecting a filter from among the plurality of filters comprises selecting the filter that produced the blurred infrared-ray image having a highest correlation value from among the calculated correlation values.

(7)
The image processing device of (3), wherein estimating the motion-based blur estimate comprises:
determining, based on the motion information, a direction and magnitude of blur in the visible-ray image.

(8)
The image processing device of (7), wherein estimating the motion-based blur estimate further comprises:
specifying, within the visible-ray image, a plurality of image blocks, each of which corresponds to a portion of the visible-ray image, and
wherein determining the direction and magnitude of blur in the visible-ray image comprises determining the direction and magnitude of blur in the visible-ray image for each image block of the plurality of image blocks.

(9)
The image processing device of (3), wherein estimating the blur estimate associated with the visible-ray image based on the image-based blur estimate and the motion-based blur estimate comprises selecting as the blur estimate associated with the visible-ray image the image-based blur estimate or the motion-based blur estimate.

(100
The image processing device of (9), wherein selecting as the blur estimate associated with the visible-ray image the image-based blur estimate or the motion-based blur estimate comprises:
determining an amount of object motion for an object in the visible-ray image;
selecting the image-based blur estimate as the blur estimate associated with the visible-ray image when the determined amount of object motion is greater than a threshold value; and
selecting the motion-based blur estimate as the blur estimate associated with the visible-ray image when the determined amount of object motion is less than the threshold value.

(11)
The image processing device of (10), wherein determining the amount of object motion comprises determining the amount of object motion based on environment information, wherein the environment information includes one or more of map information, time information, and traffic information.

(12)

The image processing device of (10), wherein determining the amount of object motion comprises determining the amount of object motion for one or more portions of the visible-ray image.

(13)

The image processing device of (3), wherein estimating the blur estimate associated with the visible-ray image based on the image-based blur estimate and the motion-based blur estimate comprises combining the image-based blur estimate and the motion-based blur estimate.

(14)

The image processing device of (1), wherein estimating the blur estimate associated with the visible-ray image comprises:

estimating, based on the motion information, a motion-based blur estimate; and estimating the blur estimate associated with the visible-ray image based on the visible-ray image, the infrared-ray image, and the motion-based blur estimate.

(15)

The image processing device of (14), wherein estimating the blur estimate associated with the visible-ray image based on the visible-ray image, the infrared-ray image, and the motion-based blur estimate comprises:

selecting, based on the motion-based blur estimate, a filter from among a plurality of filters having different blurring characteristics.

(16)

The image processing device of (14), wherein estimating the blur estimate associated with the visible-ray image comprises:

applying each of a plurality of filters having different blurring characteristics to the infrared-ray image to produce a plurality of blurred infrared-ray images;

calculating correlation values between the visible-ray image and each of the plurality of blurred infrared-ray images; and selecting a filter from among the plurality of filters, wherein the selection of the filter is based on the calculated correlation values and the motion-based blur estimate.

(17)

The image processing device of (1), wherein estimating the blur estimate associated with the visible-ray image comprises selecting a filter from among a plurality of filters having different blurring characteristics, and wherein generating the corrected visible-ray image comprises applying to the visible-ray image an inverse characteristic to a characteristic of the selected filter.

(18)

An image processing method that is performed in an image processing device, the image processing method comprising:

receiving input of a visible-ray image and an infrared-ray image obtained by photographing a same subject;

estimating, based on the visible-ray image, the infrared-ray image and motion information, a blur estimate associated with the visible-ray image; and generating, based on the estimated blur estimate, a corrected visible-ray image.

(19)

A non-transitory computer readable medium encoded with a plurality of instructions that, when executed by image processing circuitry of an image processing device, perform an image processing method, the image processing method comprising:

receiving input of a visible-ray image and an infrared-ray image obtained by photographing a same subject;

estimating, based on the visible-ray image, the infrared-ray image and motion information, a blur estimate associated with the visible-ray image; and generating, based on the estimated blur estimate, a corrected visible-ray image.

Moreover, a series of processing described in the specification can be executed by hardware, software, or a combined configuration thereof. In the case of executing the processing by the software, a program recording a processing sequence can be installed and executed in a memory in a computer incorporated in dedicated hardware, or a program can be installed and executed in a versatile computer configured to execute various types of processing. For example, the program can be recorded in advance in a recording medium. The program can be not only installed in the computer from the recording medium, but also can be received via a network such as a local area network (LAN) or the Internet. Then, the program can be installed in a recording medium such as a built-in hard drive.

Note that various types of processing described in the specification may be not only executed in chronological order as described, but also may be executed in parallel or separately according to a processing capacity of a device configured to execute the processing or as necessary. Moreover, the system in the present specification is a logical configuration set of multiple devices, and is not limited to each device configuration in the same housing.

INDUSTRIAL APPLICABILITY

As described above, according to the configuration of one embodiment of the present disclosure, the device and method for executing the image quality improvement processing of removing or reducing a blur (defocusing) on a visible light image are implemented.

Specifically, a visible light image and a far-infrared image captured by simultaneous photographing of the same object and camera motion information are input; a camera motion-based blur as a blur (defocusing) on the visible light image due to camera motion is estimated; the visible light image, the far-infrared image, and the camera motion-based blur are utilized to estimate an integrated filter as a filter for generating a blur corresponding to an integrated blur of a visible light image-based blur and the camera motion-based blur; and an opposite characteristic filter with characteristics opposite to those of the estimated integrated filter is applied to the visible light image to generate a corrected visible light image whose blur has been removed or reduced.

By these types of processing, the device and method for executing the image quality improvement processing of removing or reducing the blur (defocusing) on the visible light image are implemented.

REFERENCE SIGNS LIST

11 Blurred visible light image
12 Blur-less far-infrared image
13 Camera motion information
15 Blur-reduced visible light image
21 Visible light image input unit
22 Far-infrared image input unit
23 Camera motion information input unit
25 Pre-correction visible light image
26 Far-infrared image
27 Post-correction visible light image
30 Image-based blur estimator
30$b$ Blur estimator 31 Filter processor
32 Correlation computer
33 Image-based filter determinator
34 Filter bank selector
35 Filter bank
37 Integrated filter determinator
38 Filter (blur) comparator
39 Correlation corrector
40 Camera motion-based blur estimator
41 Camera motion blur map acquirer
45 Camera motion blur map storage unit
50 Integrated blur estimator
51 Object motion determinator
52 Integrated filter determinator
55 Environment information storage unit/input unit
60 Blur remover
61 Inverse filter calculator
62 Inverse filter processor
63 Inverse filter corrector
70 Reliability calculator
71 Filter (blur) comparator
81 CPU
82 ROM
83 RAM
84 Bus
85 Input/output interface
86 Input unit
87 Output unit
88 Storage unit
89 Communication unit
90 Drive
91 Removable medium
95 Imager (camera)
96 Display
100 Vehicle control system
101 Input unit
102 Data acquirer
103 Communication unit
104 In-vehicle equipment
105 Output controller
106 Output unit
107 Drive system controller
108 Drive system
109 Body system controller
110 Body system
111 Storage unit
112 Automatic driving controller
131 Detector
132 Self-location estimator
133 Situation analyzer
134 Planner
135 Operation controller
141 Outer-vehicle information detector
142 In-vehicle information detector
143 Vehicle state detector
151 Map analyzer
152 Traffic rule recognizer
153 Situation recognizer
154 Situation predictor
161 Route planner
162 Action planner
163 Operation planner
171 Emergency situation avoider
172 Acceleration/deceleration controller
173 Direction controller
201 Display

The invention claimed is:

1. An image processing device, comprising:
image processing circuitry configured to:
receive input of a visible-ray image and an infrared-ray image obtained by photographing a same subject, wherein the infrared-ray image is a far-infrared-ray image;
estimate, based on the visible-ray image, the infrared-ray image and motion information, a blur estimate associated with the visible-ray image; and
generate, based on the estimated blur estimate, a corrected visible-ray image.

2. An image processing device, comprising:
image processing circuitry configured to:
receive input of a visible-ray image and an infrared-ray image obtained by photographing a same subject;
estimate, based on the visible-ray image, the infrared-ray image and motion information, a blur estimate associated with the visible-ray image; and
generate, based on the estimated blur estimate, a corrected visible-ray image,
wherein estimating the blur estimate associated with the visible-ray image comprises:
estimating, based on the visible-ray image and the infrared-ray image, an image-based blur estimate;
estimating, based on the motion information, a motion-based blur estimate; and
estimating the blur estimate associated with the visible-ray image based on the image-based blur estimate and the motion-based blur estimate.

3. The image processing device of claim 2, wherein estimating the image-based blur estimate comprises:
applying each of a plurality of filters having different blurring characteristics to the infrared-ray image to produce a plurality of blurred infrared-ray images;
comparing the visible-ray image to the plurality of blurred infrared-ray images; and
selecting a filter from among the plurality of filters that produced a blurred infrared-ray image having blurring most similar to the visible-ray image.

4. The image processing device of claim 3, wherein the different blurring characteristics correspond to different point-spread functions.

5. The image processing device of claim 3, wherein comparing the visible-ray image to the plurality of blurred infrared images comprises:
calculating correlation values between the visible-ray image and each of the plurality of blurred infrared-ray images, and
wherein selecting a filter from among the plurality of filters comprises selecting the filter that produced the blurred infrared-ray image having a highest correlation value from among the calculated correlation values.

6. The image processing device of claim 2, wherein estimating the motion-based blur estimate comprises:
determining, based on the motion information, a direction and magnitude of blur in the visible-ray image.

7. The image processing device of claim 6, wherein estimating the motion-based blur estimate further comprises:
specifying, within the visible-ray image, a plurality of image blocks, each of which corresponds to a portion of the visible-ray image, and
wherein determining the direction and magnitude of blur in the visible-ray image comprises determining the direction and magnitude of blur in the visible-ray image for each image block of the plurality of image blocks.

8. The image processing device of claim 2, wherein estimating the blur estimate associated with the visible-ray image based on the image-based blur estimate and the motion-based blur estimate comprises selecting as the blur estimate associated with the visible-ray image the image-based blur estimate or the motion-based blur estimate.

9. The image processing device of claim 8, wherein selecting as the blur estimate associated with the visible-ray image the image-based blur estimate or the motion-based blur estimate comprises:
  determining an amount of object motion for an object in the visible-ray image;
  selecting the image-based blur estimate as the blur estimate associated with the visible-ray image when the determined amount of object motion is greater than a threshold value; and
  selecting the motion-based blur estimate as the blur estimate associated with the visible-ray image when the determined amount of object motion is less than the threshold value.

10. The image processing device of claim 9, wherein determining the amount of object motion comprises determining the amount of object motion based on environment information, wherein the environment information includes one or more of map information, time information, and traffic information.

11. The image processing device of claim 9, wherein determining the amount of object motion comprises determining the amount of object motion for one or more portions of the visible-ray image.

12. The image processing device of claim 2, wherein estimating the blur estimate associated with the visible-ray image based on the image-based blur estimate and the motion-based blur estimate comprises combining the image-based blur estimate and the motion-based blur estimate.

13. An image processing device, comprising:
  image processing circuitry configured to:
    receive input of a visible-ray image and an infrared-ray image obtained by photographing a same subject;
    estimate, based on the visible-ray image, the infrared-ray image and motion information, a blur estimate associated with the visible-ray image; and
    generate, based on the estimated blur estimate, a corrected visible-ray image,
    wherein estimating the blur estimate associated with the visible-ray image comprises:
      estimating, based on the motion information, a motion-based blur estimate; and
      estimating the blur estimate associated with the visible-ray image based on the visible-ray image, the infrared-ray image, and the motion-based blur estimate.

14. The image processing device of claim 13, wherein estimating the blur estimate associated with the visible-ray image based on the visible-ray image, the infrared-ray image, and the motion-based blur estimate comprises:
  selecting, based on the motion-based blur estimate, a filter from among a plurality of filters having different blurring characteristics.

15. The image processing device of claim 13, wherein estimating the blur estimate associated with the visible-ray image comprises:
  applying each of a plurality of filters having different blurring characteristics to the infrared-ray image to produce a plurality of blurred infrared-ray images;
  calculating correlation values between the visible-ray image and each of the plurality of blurred infrared-ray images; and
  selecting a filter from among the plurality of filters, wherein the selection of the filter is based on the calculated correlation values and the motion-based blur estimate.

16. An image processing device, comprising:
  image processing circuitry configured to:
    receive input of a visible-ray image and an infrared-ray image obtained by photographing a same subject;
    estimate, based on the visible-ray image, the infrared-ray image and motion information, a blur estimate associated with the visible-ray image; and
    generate, based on the estimated blur estimate, a corrected visible-ray image,
    wherein estimating the blur estimate associated with the visible-ray image comprises selecting a filter from among a plurality of filters having different blurring characteristics, and
    wherein generating the corrected visible-ray image comprises applying to the visible-ray image an inverse characteristic to a characteristic of the selected filter.

17. An image processing method that is performed in an image processing device, the image processing method comprising:
  receiving input of a visible-ray image and an infrared-ray image obtained by photographing a same subject, wherein the infrared-ray image is a far-infrared-ray image;
  estimating, based on the visible-ray image, the infrared-ray image and motion information, a blur estimate associated with the visible-ray image; and
  generating, based on the estimated blur estimate, a corrected visible-ray image.

18. A non-transitory computer readable medium encoded with a plurality of instructions that, when executed by image processing circuitry of an image processing device, perform an image processing method, the image processing method comprising:
  receiving input of a visible-ray image and an infrared-ray image obtained by photographing a same subject, wherein the infrared-ray image is a far-infrared-ray image;
  estimating, based on the visible-ray image, the infrared-ray image and motion information, a blur estimate associated with the visible-ray image; and
  generating, based on the estimated blur estimate, a corrected visible-ray image.

* * * * *